(12) United States Patent
Smits

(10) Patent No.: US 9,753,126 B2
(45) Date of Patent: Sep. 5, 2017

(54) REAL TIME POSITION SENSING OF OBJECTS

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 15/384,227

(22) Filed: Dec. 19, 2016

(65) Prior Publication Data

US 2017/0176575 A1    Jun. 22, 2017

Related U.S. Application Data

(60) Provisional application No. 62/386,991, filed on Dec. 18, 2015, provisional application No. 62/391,637, filed on May 3, 2016, provisional application No. 62/495,667, filed on Sep. 19, 2016.

(51) Int. Cl.
*G01S 7/484* (2006.01)
*G01S 17/10* (2006.01)
*G01S 7/48* (2006.01)

(52) U.S. Cl.
CPC .......... *G01S 7/484* (2013.01); *G01S 7/4808* (2013.01); *G01S 17/10* (2013.01)

(58) Field of Classification Search
CPC ................................................... G01B 11/24
See application file for complete search history.

(56) References Cited

U.S. PATENT DOCUMENTS

| 4,019,262 | A | 4/1977 | Breglia et al. |
| 4,340,274 | A | 7/1982 | Spooner |
| 5,052,820 | A | 10/1991 | McGinniss et al. |
| 5,107,122 | A | 4/1992 | Barkan et al. |
| 5,115,230 | A | 5/1992 | Smoot |

(Continued)

FOREIGN PATENT DOCUMENTS

| EP | 0722109 A1 | 7/1996 |
| JP | 11119184 A | 4/1999 |

(Continued)

OTHER PUBLICATIONS

F. Blais, J.-A. Beraldin, S. F. Hakim, "Range Error Analysis of an Integrated Time-of-Flight, Triangulation, and Photogrammetry 3D Laser Scanning System," SPIE Proceedings of AeroSense, Orlando, Fla., Apr. 24-28, 2000, vol. 4035.*

(Continued)

*Primary Examiner* — Luke Ratcliffe
(74) *Attorney, Agent, or Firm* — John W. Branch; Lowe Graham Jones PLLC

(57) ABSTRACT

Embodiments are directed toward measuring a three dimensional range to a target. A transmitter emits light toward the target. An aperture may receive light reflections from the target. The aperture may direct the reflections toward a sensor that comprises rows of pixels that have columns. The sensor is offset a predetermined distance from the transmitter. Anticipated arrival times of the reflections on the sensor are based on the departure times and the predetermined offset distance. A portion of the pixels are sequentially activated based on the anticipated arrival times. The target's three dimensional range measurement is based on the reflections detected by the portion of the pixels.

18 Claims, 38 Drawing Sheets

(56) References Cited

U.S. PATENT DOCUMENTS

| | | |
|---|---|---|
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,812,664 A | 9/1998 | Bernobich et al. |
| 5,914,783 A | 6/1999 | Barrus |
| 6,115,022 A | 9/2000 | Mayer, III et al. |
| 6,195,446 B1 | 2/2001 | Skoog |
| 6,307,526 B1 | 10/2001 | Mann |
| 6,404,416 B1 | 6/2002 | Kahn et al. |
| 6,545,670 B1 | 4/2003 | Pryor |
| 6,670,603 B2 | 12/2003 | Shimada et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,982,683 B2 | 1/2006 | Stanton |
| 7,119,965 B1 | 10/2006 | Rolland et al. |
| 7,144,117 B2 | 12/2006 | Kojima |
| 7,182,465 B2 | 2/2007 | Fuchs et al. |
| 7,232,229 B2 | 6/2007 | Peeters et al. |
| 7,262,765 B2 | 8/2007 | Brown et al. |
| 7,289,110 B2 | 10/2007 | Hansson |
| 7,303,289 B2 | 12/2007 | Fujiwara |
| 7,511,847 B2 | 3/2009 | Silverbrook et al. |
| 7,787,134 B2 | 8/2010 | Kohnen et al. |
| 7,911,444 B2 | 3/2011 | Yee |
| 8,170,329 B2 | 5/2012 | Seko et al. |
| 8,282,222 B2 | 10/2012 | Smits |
| 8,297,758 B2 | 10/2012 | Choi et al. |
| 8,430,512 B2 | 4/2013 | Smits |
| 8,493,573 B2 | 7/2013 | Chinn et al. |
| 8,573,783 B2 | 11/2013 | Smits |
| 8,696,141 B2 | 4/2014 | Smits |
| 8,711,370 B1 | 4/2014 | Smits |
| 8,773,512 B1 | 7/2014 | Rafii |
| 8,957,847 B1 | 2/2015 | Karakotsios et al. |
| 8,994,780 B2 | 3/2015 | Moore |
| 9,151,607 B2 | 10/2015 | Davies et al. |
| 2001/0043165 A1 | 11/2001 | Stanton |
| 2002/0036765 A1 | 3/2002 | McCaffrey et al. |
| 2002/0067466 A1 | 6/2002 | Covannon et al. |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0006424 A1 | 1/2004 | Joyce et al. |
| 2004/0054359 A1 | 3/2004 | Ruiz et al. |
| 2004/0114834 A1 | 6/2004 | Fisher |
| 2004/0218155 A1 | 11/2004 | Schenk et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0195387 A1 | 9/2005 | Zhang et al. |
| 2005/0219530 A1 | 10/2005 | Horibe et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1* | 9/2006 | Liebman ............... G01S 7/4818 356/5.01 |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0138371 A1 | 6/2007 | Marshall |
| 2007/0182949 A1 | 8/2007 | Niclass |
| 2007/0273610 A1 | 11/2007 | Baillot |
| 2008/0266169 A1 | 10/2008 | Akita |
| 2008/0291213 A1 | 11/2008 | Bhogal |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0142856 A1 | 6/2010 | Takeuchi et al. |
| 2010/0149518 A1 | 6/2010 | Nordenfelt et al. |
| 2011/0001793 A1 | 1/2011 | Moriyama et al. |
| 2011/0211243 A1 | 9/2011 | Smits |
| 2011/0304842 A1 | 12/2011 | Kao et al. |
| 2012/0017147 A1 | 1/2012 | Mark |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0250152 A1 | 10/2012 | Larson et al. |
| 2012/0320013 A1 | 12/2012 | Perez et al. |
| 2013/0003081 A1 | 1/2013 | Smits |
| 2013/0021271 A1 | 1/2013 | Guo |
| 2013/0088465 A1 | 4/2013 | Geller et al. |
| 2013/0176561 A1 | 7/2013 | Hidaka |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0098179 A1 | 4/2014 | Moore |
| 2014/0146243 A1 | 5/2014 | Liu et al. |
| 2014/0176954 A1 | 6/2014 | Scott et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2015/0066196 A1 | 3/2015 | Wooldridge et al. |
| 2015/0091815 A1 | 4/2015 | Michaelis |
| 2015/0279114 A1 | 10/2015 | Yonekubo |
| 2015/0286293 A1 | 10/2015 | Gruhlke et al. |
| 2016/0014403 A1 | 1/2016 | Stroetmann |
| 2016/0041266 A1 | 2/2016 | Smits |

FOREIGN PATENT DOCUMENTS

| | | |
|---|---|---|
| JP | 2001045381 A | 2/2001 |
| JP | 2003029201 A | 1/2003 |
| JP | 2004132914 A | 4/2004 |
| JP | 2011197674 A | 10/2011 |
| KR | 10-2011-0115752 A | 10/2011 |
| WO | 92/18971 A1 | 10/1992 |
| WO | 00/34818 A1 | 6/2000 |
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |
| WO | 2014141115 A2 | 9/2014 |

OTHER PUBLICATIONS

Office Communication for U.S. Appl. No. 15/194,502 dated Mar. 9, 2017, 7 pages.

International Search Report and Written Opinion for International Application No. PCT/US2016/067626 dated Mar. 16, 2017, 12 pages.

Savage, P., "GDC 2013: Valv's Michael Abrash on the challenges of VR—'a new world is emerging'," PCGamer, Apr. 2, 2013, 6 pages.

European Search Report for European Patent Application No. 08837063.0 dated Nov. 19, 2010, 8 pages.

Communication Pursuant to Article 94(3) EPC in European Patent Application No. 08837063.0 dated Dec. 27, 2011, 5 pages.

Communication Pursuant to Article 94(3) EPC in European Patent Application No. 08837063.0 dated Oct. 22, 2012, 6 pages.

International Search Report and Written Opinion in International Patent Application No. PCT/US2008/079663 dated Apr. 30, 2009, 5 pages.

International Search Report and Written Opinion in International Patent Application No. PCT/US2011/026691 dated Oct. 24, 2011, 7 pages.

International Search Report in International Patent Application No. PCT/US2011/054751 dated Jan. 30, 2012, 1 page.

(56) References Cited

OTHER PUBLICATIONS

International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S. Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/858,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Communication for U.S. Appl. No. 14/636,062 dated Sep. 25, 2015, 8 pages.
Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, 10 pages.
Official Communication for U.S. Appl. No. 14/218,643 dated Jun. 23, 2016, 11 pages.
Official Communication for U.S. Appl. No. 13/877,652 dated Aug. 12, 2016, (22 pages).
Official Communication for U.S. Appl. No. 15/194,502 dated Aug. 19, 2016, (12 pages).
Official Communication for U.S. Appl. No. 14/636,062 dated Aug. 24, 2016, (9 pages).
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. 14/218,643 dated Nov. 1, 2016, 10 pages.
Kanzawa, Y., et al., "Human Skin Detection by Visible and Near Infrared Imaging," IAPR Conference on Machine Vision Applications, Jun. 13-15, 2011, Nara Japan, 5 pages.
Office Communication for U.S. Appl. No. 14/671,904 dated May 5, 2017, 11 pages.
Office Communication for U.S. Appl. No. 15/411,959 dated May 11, 2017, 9 pages.
International Search Report and Written Opinion for International Application No. PCT/US2017/014616 dated May 1, 2017, 11 pages.
Office Communication for U.S. Appl. No. 13/877,652 dated May 31, 2017, 23 pages.

* cited by examiner

REAL TIME POSITION SENSING OF OBJECTS

CROSS-REFERENCE TO RELATED APPLICATIONS

This application is a Utility Patent application based on a previously filed U.S. Provisional Patent Application U.S. Ser. No. 62/386,991 filed on Dec. 18, 2015, the benefit of the filing date of which is hereby claimed under 35 U.S.C. §119(e) and which is further incorporated by reference in its entirety. This Utility Patent application is further based on a previously filed U.S. Provisional Patent Application U.S. Ser. No. 62/391,637 filed on May 3, 2016, the benefit of the filing date of which is hereby claimed under 35 U.S.C. §119(e) and which is further incorporated by reference in its entirety. This Utility Patent application is also based on a previously filed U.S. Provisional Patent Application U.S. Ser. No. 62/495,667 filed on Sep. 19, 2016, the benefit of the filing date of which is hereby claimed under 35 U.S.C. §119(e) and which is further incorporated by reference in its entirety.

TECHNICAL FIELD

The present invention relates generally to three-dimensional tracking systems and, more particularly, but not exclusively, to employing sequential pixel beam scans in highly compact laser-based projection systems.

BACKGROUND

Tracking systems may be employed to track a position and/or a trajectory of a remote object, such as an aircraft, a missile, a drone, a projectile, a baseball, a vehicle, or the like. The systems may track the remote object based on detection of photons, or other signals, emitted and/or reflected by the remote object. The tracking systems may illuminate the remote object with electromagnetic waves, or light beams, emitted by the tracking systems. The tracking systems may detect a portion of light beams that are reflected, or scattered, by the remote object. The tracking systems may suffer from one or more of undesirable speed, undesirable accuracy, or undesirable susceptibility to noise.

DETAILED DESCRIPTION OF THE EMBODIMENTS

Figure 1:
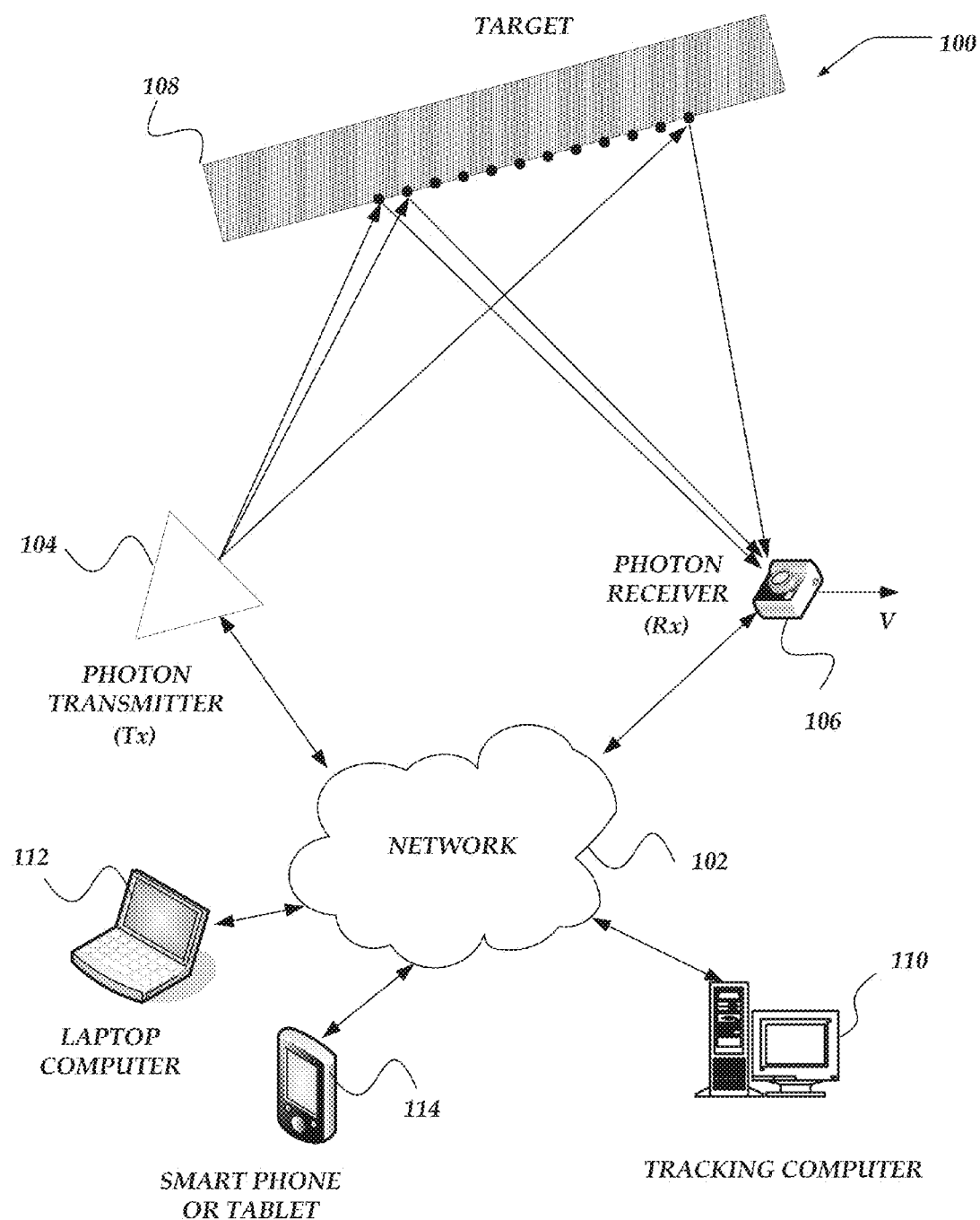
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of at least one photon. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. For instance, a target may scatter or reflect an outgoing light beam that is transmitted by various ones of the various embodiments disclosed herein. In the various embodiments described herein, one or more photon sources may be in relative motion to one or more of photon detectors and/or one or more targets. Similarly, one or more photon detectors may be in relative motion to one or more of photon sources and/or one or more targets. One or more targets may be in relative motion to one or more of photon sources and/or one or more photon detectors.

As used herein, the term "disparity" represents a positional offset of one or more pixels in a sensor relative to a predetermined position in the sensor. For example, horizontal and vertical disparities of a given pixel in a sensor may represent horizontal and vertical offsets (e.g., as indicated by row or column number, units of distance, or the like) of the given pixel from a predetermined position in the sensor (or another sensor). The disparities may be measured from a center, one or more edges, one or more other pixels, or the like in the sensor (or another sensor). In other embodiments, disparity may represent an angle. For example, a transmitter may emit a beam at an angle $\alpha$, and the sensor may receive a reflection of the beam at an angle $\beta$ through an aperture. The disparity may be measured as the difference between 180° and the sum of the angles $\alpha$ and $\beta$.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to measuring a distance to a target that reflects light from a transmitter to a receiver. The receiver may be offset from the transmitter by a predetermined distance and may include a sensor that has one or more rows of pixels. The predetermined offset distance between the transmitter and the receiver enables speculatively activating, in sequence, pixels in a row of the sensor. The sequential speculative activation may be based on anticipating, for each instance of time following emission of the light from the transmitter, which one or more pixels would receive a reflection if the target were at a corresponding distance from the transmitter. In one or more of the various embodiments, if one or more speculatively activated pixels do not capture a reflection of the light from the transmitter, the sequence of speculative activation continues in anticipation of the target being at a further distance. In some of the various embodiments, responsive to one or more speculatively activated pixels capturing a reflection of the light from the transmitter, the distance to the target may be determined based on the position of the one or more speculatively activated pixels.

In one or more of the various embodiments, each speculatively activated pixel is activated for a duration that is based on the offset distance, an angle at which the transmitter emitted the light, and an amount of time that has passed since the transmitter emitted the light. An anticipated path of reflection to a speculatively activated pixel from the distance that corresponds to the speculatively activated pixel may define an angle with the sensor. The sequence of speculative activation may progress such that, over time, the defined angle approaches the difference between 180° and the angle at which the transmitter emitted the light. In some of the various embodiments, as the anticipated path of reflection becomes more parallel to the path along which the transmitter emitted the light, each speculatively activated pixel may correspond to a greater range of potential distances to the target (e.g., the duration of activation of each speculatively activated pixel may increase as the sequence of speculative activation progresses).

In one or more of the various embodiments, the light emitted by the transmitter may be a continuous beam that is scanned across a field of view of the sensor. In some of the various embodiments, the light emitted by the transmitter may form a blade that has a longitudinal dimension that is perpendicular (or more perpendicular than parallel) to the one or more rows of the sensor and also perpendicular (or more perpendicular than parallel) to the path along which the transmitter emitted the light. Speculatively activated pixels in multiple rows in the sensor may each capture a reflection of the blade from the target. In some embodiments, each column of pixels in the sensor may report to the same column sense line.

In one or more of the various embodiments, responsive to the sequence of speculative activation progressing to a point where each speculatively activated pixel corresponds to a range of potential distances that exceeds a threshold value, one or more different distance measuring modes may be employed instead of speculative sequential activation. In some of the various embodiments, where multiple sensors are employed and one or more of the multiple sensors reports capture of a reflection from the target, the one or more different distance measuring modes may be employed responsive to one or more of the multiple sensors failing to capture a reflection from the target. In some embodiments, responsive to repeating the sequence of sequential activation a certain number of times without capturing a reflection from the target, the one or more different distance measuring modes may be employed.

In one or more of the various embodiments, the one or more different distance measuring modes may employ an intense (e.g., compared to an amplitude of the light emitted for the speculative activation sequence) pulsed beam emitted by the transmitter. In some of the various embodiments, each pulse of the pulsed beam may include a distinct color compared to that of an immediately prior and an immediately subsequent pulse. In some embodiments, the one or more different distance measuring modes may employ fast amplitude or frequency modulation of the pulses. In one or more of the various embodiments, the one or more different distance measuring modes may include determining the distance to the target based on time of flight of a burst of light emitted by the transmitter. In some of the various embodiments, the one or more different distance measuring modes may employ one or more different sensors (e.g., LIDAR or radar sensors).

In one or more of the various embodiments, the pixels in the sensor may include Single Photon Avalanche Diodes (SPADs). In some of the various embodiments, the pixels in the sensor may report capture of a reflection via one or more of a high sensitivity sensing amplifier or a source follower connected to a photodiode in each of the pixels (e.g., "twitchy pixels").

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 100 of FIG. 1 includes network 102, photon transmitter 104, photon receiver 106, target 108, and tracking computer device 110. In some embodiments, system 100 may include one or more other computers, such as but not limited to laptop computer 112 and/or mobile computer, such as but not limited to a smartphone or tablet 114. In some embodiments, photon transmitter 104 and/or photon receiver 106 may include one or more components included in a computer, such as but not limited to various ones of computers 110, 112, or 114.

System 100, as well as other systems discussed herein, may be a sequential-pixel photon projection system. In at least one embodiment system 100 is a sequential-pixel laser projection system that includes visible and/or non-visible photon sources. Various embodiments of such systems are described in detail in at least U.S. Pat. No. 8,282,222, U.S. Pat. No. 8,430,512, U.S. Pat. No. 8,696,141, U.S. Pat. No. 8,711,370, U.S. Patent Publication No. 2013/0300,637, and U.S. Patent Publication No. 2016/0041266. Note that each of the U.S. patents and U.S. patent publications listed above are herein incorporated by reference in the entirety.

Target 108 may be a three-dimensional target. Target 108 is not an idealized black body, i.e. it reflects or scatters at least a portion of incident photons. As shown by the velocity vector associated with photon receiver 106, in some embodiments, photon receiver 106 is in relative motion to at least one of photon transmitter 104 and/or target 108. For the embodiment of FIG. 1, photon transmitter 104 and target 108 are stationary with respect to one another. However, in other embodiments, photon transmitter 104 and target 108 are in relative motion. In at least one embodiment, photon receiver 106 may be stationary with respect to one or more of photon transmitter 104 and/or target 108. Accordingly, each of photon transmitter 104, target 108, and photon receiver 106 may be stationary or in relative motion to various other ones of photon transmitter 104, target 108, and photon receiver 106. Furthermore, as used herein, the term "motion" may refer to translational motion along one or more of three orthogonal special dimensions and/or rotational motion about one or more corresponding rotational axis.

Photon transmitter 104 is described in more detail below. Briefly, however, photon transmitter 104 may include one or more photon sources for transmitting light or photon beams. A photon source may include photo-diodes. A photon source may provide continuous or pulsed light beams of a predetermined frequency, or range of frequencies. The provided light beams may be coherent light beams. A photon source may be a laser. For instance, photon transmitter 104 may include one or more visible and/or non-visible laser source. In one embodiment, photon transmitter 104 includes at least one of a red (R), a green (G), and a blue (B) laser source to produce a RGB image. In some embodiment, photon transmitter includes at least one non-visible laser source, such as a near-infrared (NIR) laser. Photon transmitter 104 may be a projector. Photon transmitter 104 may include various ones of the features, components, or functionality of a computer device, including but not limited to mobile computer 200 of FIG. 2 and/or network computer 300 of FIG. 3.

Photon transmitter 104 also includes an optical system that includes optical components to direct, focus, and scan the transmitted or outgoing light beams. The optical systems aim and shape the spatial and temporal beam profiles of outgoing light beams. The optical system may collimate, fan-out, or otherwise manipulate the outgoing light beams. At least a portion of the outgoing light beams are aimed at and are reflected by the target 108. In at least one embodiment, photon transmitter 104 includes one or more photon detectors for detecting incoming photons reflected from target 108, e.g., transmitter 104 is a transceiver.

Photon receiver 106 is described in more detail below. Briefly, however, photon receiver 106 may include one or more photon-sensitive, or photon-detecting, arrays of sensor pixels. An array of sensor pixels detects continuous or pulsed light beams reflected from target 108. The array of pixels may be a one dimensional-array or a two-dimensional array. The pixels may include SPAD pixels or other photosensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by photon transmitter 104 and relatively insensitive to other frequencies. Photon receiver 106 also includes an optical system that includes optical components to direct, focus, and scan the received, or incoming, beams, across the array of pixels. In at least one embodiment, photon receiver 106 includes one or more photon sources for emitting photons toward the target 108 (e.g., receiver 106 includes a transceiver). Photon receiver 106 may include a camera. Photon receiver 106 may include various ones of the features, components, or functionality of a computer device, including but not limited to mobile computer 200 of FIG. 2 and/or network computer 300 of FIG. 3.

Various embodiment of tracking computer device 110 are described in more detail below in conjunction with FIGS. 2-3 (e.g., tracking computer device 110 may be an embodiment of mobile computer 200 of FIG. 2 and/or network computer 300 of FIG. 3). Briefly, however, tracking computer device 110 includes virtually various computer devices enabled to perform the various tracking processes and/or methods discussed herein, based on the detection of photons reflected from one or more surfaces, including but not limited to surfaces of target 108. Based on the detected photons or light beams, tracking computer device 110 may alter or otherwise modify one or more configurations of photon transmitter 104 and photon receiver 106. It should be understood that the functionality of tracking computer device 110 may be performed by photon transmitter 104, photon receiver 106, or a combination thereof, without communicating to a separate device.

In some embodiments, at least some of the tracking functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including photon transmitter 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In at least one of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between photon transmitter 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

As discussed in detail below, photon transmitter 104 may provide an optical beacon signal. Accordingly, photon transmitter 104 may include a transmitter (Tx). Photon transmitter 104 may transmit a photon beam onto a projection surface of target 108. Thus, photon transmitter 104 may transmit and/or project an image onto the target 108. The image may include a sequential pixilation pattern. The discreet pixels shown on the surface of target 108 indicate the sequential scanning of pixels of the image via sequential scanning performed by photon transmitter 108. Photon receiver (Rx) 106 may include an observing system which receives the reflect image. As noted, photon receiver 106 may be in motion relative (as noted by the velocity vector) to the image being projected. The relative motion between photon receiver 106 and each of the photon transmitter 104 and target 108 may include a relative velocity in various directions and an arbitrary amplitude. In system 100, photon transmitter 104 and the image on the surface are not in relative motion. Rather, the image is held steady on the surface of target 108. However, other embodiments are not so constrained (e.g., the photon transmitter 104 may be in relative motion to target 108). The projected image may be anchored on the surface by compensating for the relative motion between the photon transmitter 104 and the target 108.

Illustrative Mobile Computer

Figure 2:
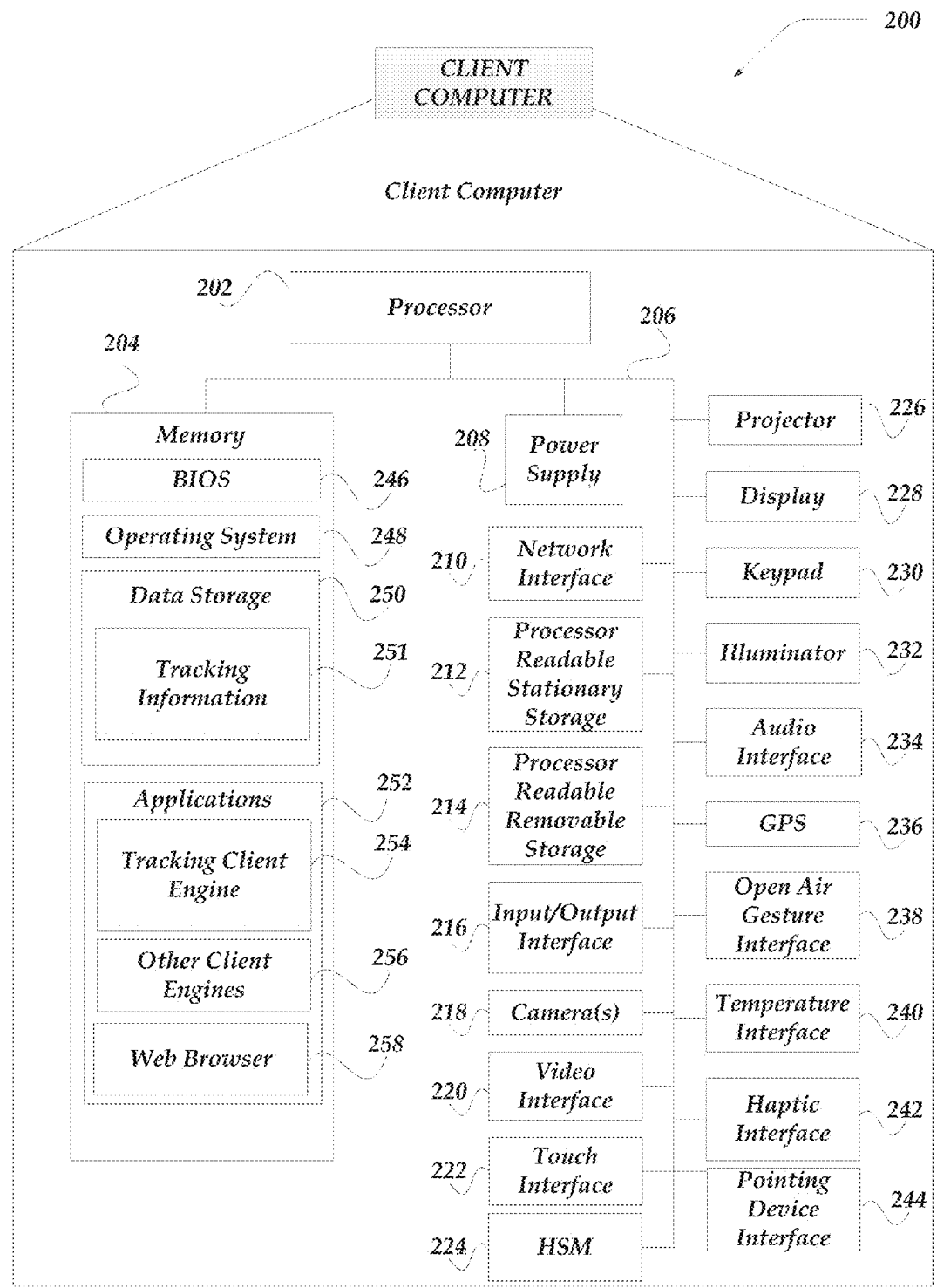
FIG. 2 illustrates an embodiment of an exemplary mobile computer that may be included in a system such as that shown in FIG. 1.

FIG. 2 shows one embodiment of an exemplary mobile computer 200 that may include many more or less components than those exemplary components shown. Mobile computer 200 may represent, for example, at least one embodiment of laptop computer 112, smartphone/tablet 114, and/or tracking computer 110 of system 100 of FIG. 1. Thus, mobile computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer. And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (MC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200. Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store tracking information 251. The information 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, tracking client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
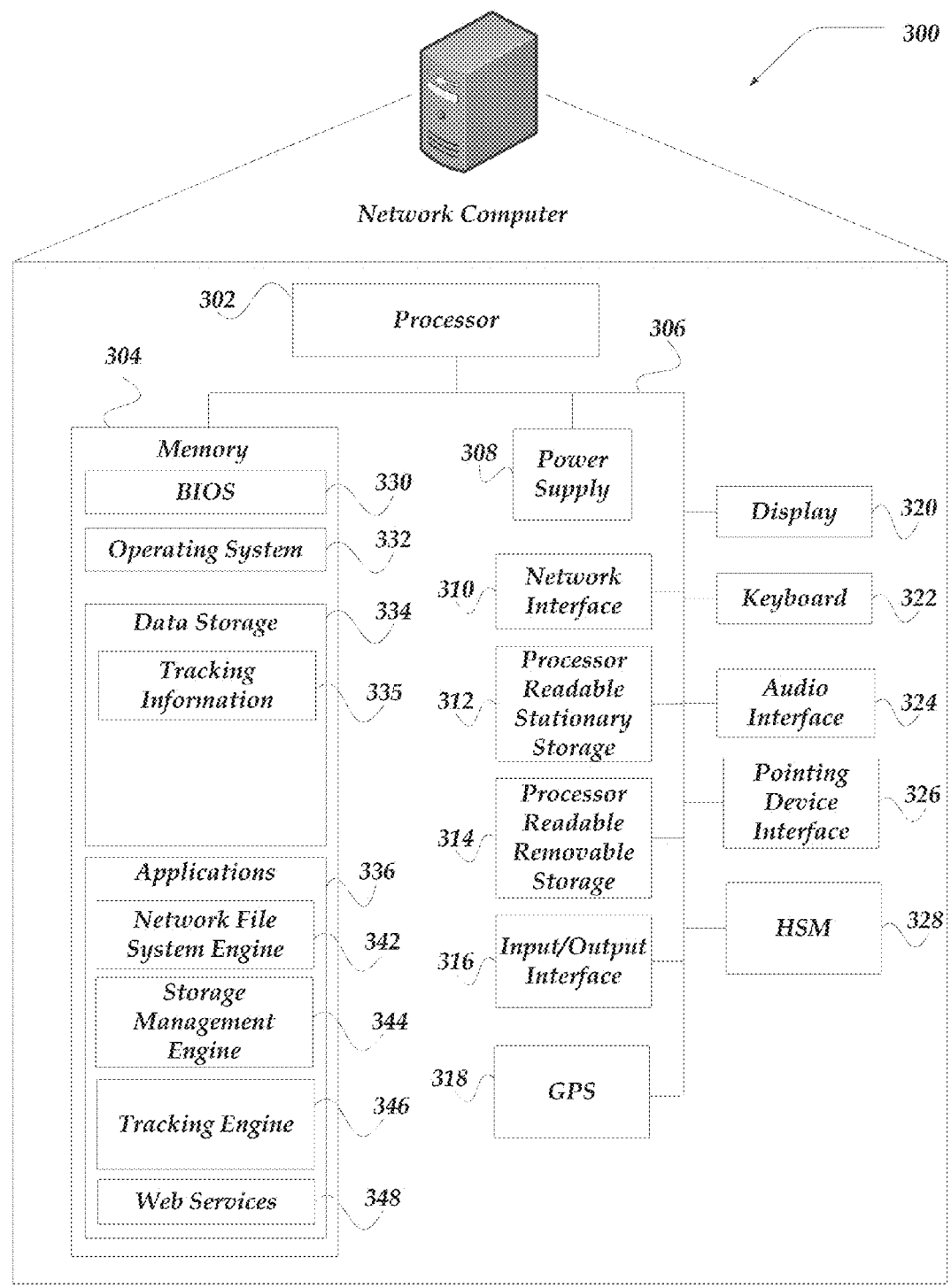
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or tracking computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MIMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store tracking information 335. The tracking information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include tracking engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, tracking engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to tracking engine 346 may be provisioned and de-commissioned automatically.

Also, in one or more of the various embodiments, tracking engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrated Sensing Systems

Figure 4:
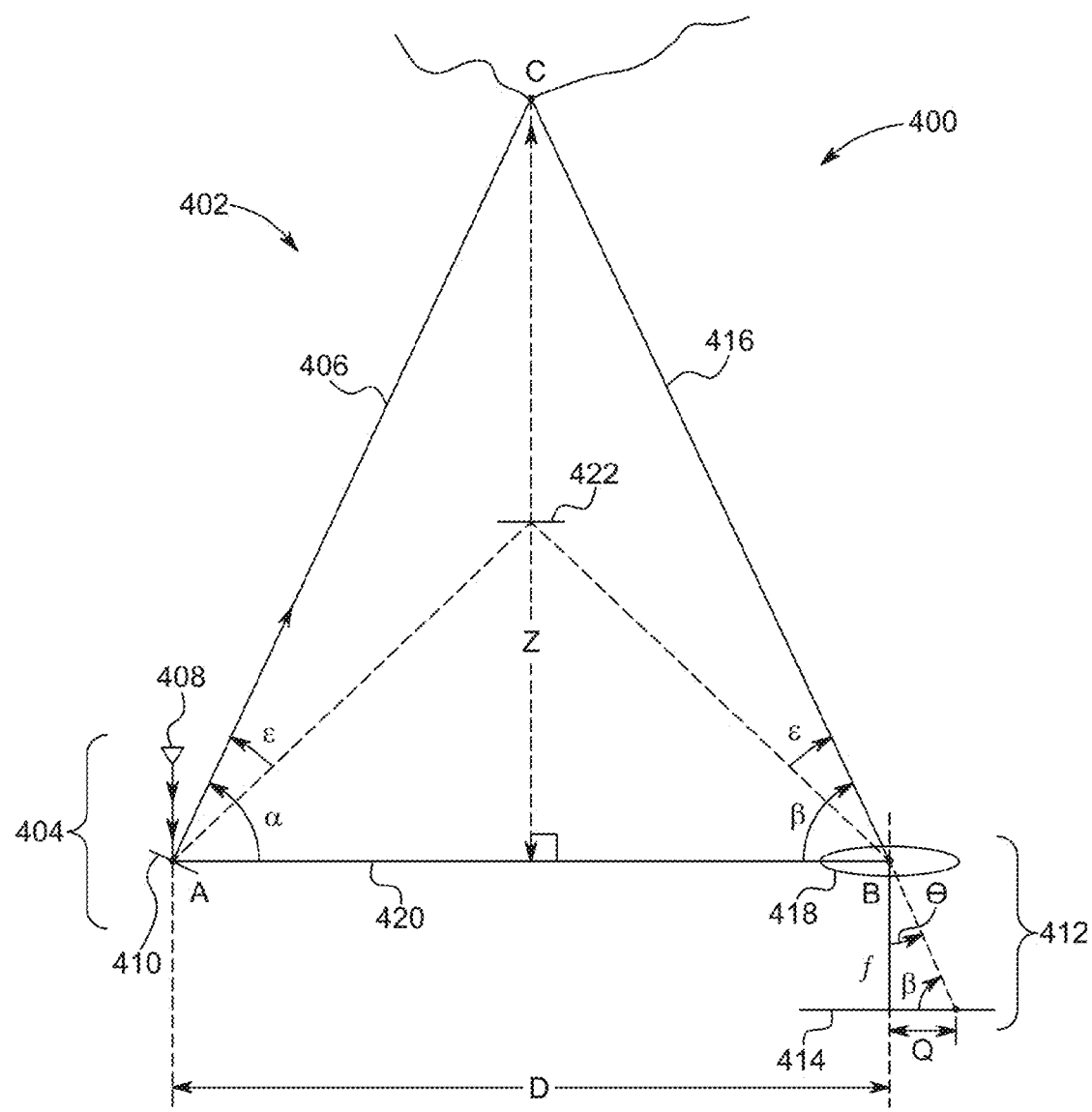
FIG. 4 illustrates an embodiment of a three-dimensional perspective view of an exemplary transmit and receive ($T_x$-$R_x$) system.

As shown in FIG. 4, an exemplary pixel sequential triangulated three-dimensional sensing system 400 may include an exemplary transmit and receive ($T_x$-$R_x$) system 402. In one or more of the various embodiments, the transmit and receive ($T_x$-$R_x$) system 402 may include a transmit system 404. The transmit system 404 may transmit a scanning beam 406. The transmit system 404 include one or more bright sources 408. For example, the one or more bright sources 408 may include one or more diode lasers. Light from the one or more bright sources 408 may be collimated into the scanning beam 406. The bright sources 408 may emit the scanning beam 406 toward a beam scanning mechanism 410. For example, the beam scanning mechanism 410 may include a microelectromechanical system (MEMS) mirror, a MEMS-ribbon-activated phased array, an Optical Phased Array (OPA), a galvanic mirror, or a polygonal rotating mirror. The beam scanning mechanism 410 may spatially rotate the scanning beam 406 through a field of view of the transmit system 404. For example, the transmit system 404 may project, via the scanning beam 406, one or more pixel sized spots onto one or more objects C in the field of view of the transmit system 404.

In one or more of the various embodiments, the transmit and receive ($T_x$-$R_x$) system 402 may include a receive system 412. The receive system 412 may include an optical receiver system that contains one or more position sensors 414 (e.g., a semiconductor sensor) (FIG. 4 shows one row of the one or more sensors 414, yet the one or more sensors 414 may include one or more rows) that detect light 416 from the collimated beam 406 that reflects off one or more surfaces of one or more objects C in a field of view of the receiver. An aperture 418 of the receive system 412 may capture a fraction of the reflected light 416. A lens or optical assembly (e.g., at the aperture 418) of the receive system 412 may focus captured light into a spot on a surface of the sensor 414. The position of the spot may be a geometric function of a scan angle α and a range distance Z between the object C and a base line 420 that extends between the transmit system 404 and the receive system 412.

The transmit and receive ($T_x$-$R_x$) system may employ an offset distance D between a portion of the transmit system 404 and a portion of the receive system 412. In some of the various embodiments, the offset distance D may extend between a scan axis of a scan mirror (e.g., the beam scanning mechanism 410) of the transmit system 404 and an optical center of receiving optics of the receive system 412 (e.g., a point where a chief ray, such as, for example, the reflected light 416, passes through a center of a lens system of the receive system 412). A horizontal offset may cause an azimuthal disparity Q (e.g., displacement along a horizontal offset direction). As illustrated more closely in FIG. 5, the azimuthal disparity Q may also depend on optics (e.g., a distance such as a focal length f between a center of the optics of the receive system 412 and a surface of the sensor 414 of the receive system 412).

Figure 5:
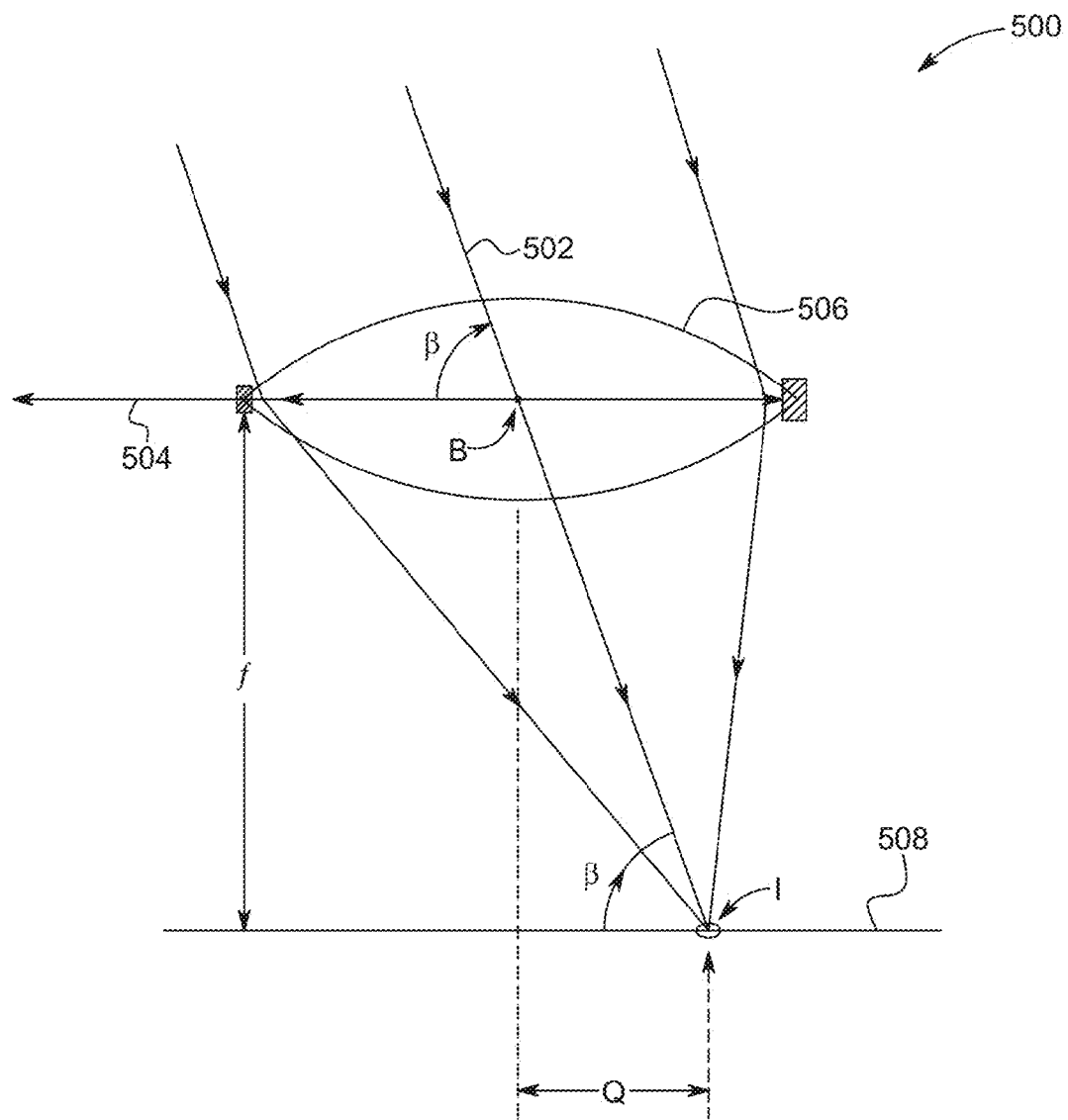
FIG. 5 shows an embodiment of a two-dimensional view of an exemplary receiving system.

FIG. 5 shows an exemplary receive system 500. For example, the receive system 500 may be the same as or similar to that of FIG. 4. In some of the various embodiments, an angle of beta β may be an angle formed by a chief ray 502 with a baseline 504. For example, the angle of beta β may be formed by the chief ray 502 at a center B of an aperture 506 and the baseline 504 (FIG. 5 shows a partial view of the baseline 504). In some embodiments, the receive system 502 may include optics that avoid magnification. For example, the receive system 500 may cause the chief ray 502 to impinge on a sensor 508 at point I, making the same angle of beta β. In one or more of the various embodiments, each pixel of the sensor 508 may have a column position that is proportional to the angle of beta β. For example, a pixel at point I may have a column position (e.g., a column number) that is proportional to the angle of beta β.

Returning to FIG. 4, the transmit and receive ($T_x$-$R_x$) system 402 may employ one or more transmit systems 404 and one or more receive systems 412. In one or more of the various embodiments, the transmit and receive ($T_x$-$R_x$) system 402 may employ more than one transmit system 404. For example, one or more of the multiple transmit systems 404 may share one or more scan mechanisms 410 (e.g., a shared scan mirror). In other embodiments, one or more of the multiple transmit systems 404 may each have separate scan mechanisms 410 (e.g., separate scan mirrors). In some of the various embodiments, the transmit and receive ($T_x$-$R_x$) system 402 may employ more than one receive system 412 (e.g., multiple receivers).

In one or more of the various embodiments, the transmit system 404 may determine (e.g., ex ante) a pointing direction of the scanning beam 406 in two dimensions. In some of the various embodiments, the transmit system 404 may determine two or more rotational angles of the scanning beam 406. For example, "at departure," the transmit system 404 may know a horizontal pointing angle (e.g., a fast scanning direction) alpha α and a vertical elevation pointing angle epsilon ε (e.g., an angle that extends from a horizon 422 to the scan beam 406 and/or the reflected beam 416).

In one or more of the various embodiments, the receive system 412 may sense an incoming angle of the chief ray 416 in one dimension. In some of the various embodiments, the receive system may determine a receiving horizontal reflection angle beta β (e.g., an incoming azimuthal angle of the portion of the reflected light 416 of the scanning beam 406 that was reflected by the surface of the object C and captured by the aperture 418 of the receive system 412). In some embodiments, the receive system 412 may measure an angle at which the chief ray 416 enters the center of the aperture 418, optics, or lens surface of the receive system 412. In some of the various embodiments, the receive system 412 may measure a second dimension (e.g., elevation according to the vertical deviation angle ε away from the horizon 422). In some of the various embodiments, the receive system 412 may measure the second dimension when the scanning beam 406 is pointing upwards (or downwards), above (or below) the horizon 422 of the system 400 (e.g., at angle ε). For example, the light of the scanning beam 406 may be reflected back down (or up) towards the receiver 412 from the same elevation. The light ray 416 may reflect back to the receiver 412 in the same plane (e.g., a plane formed by an outgoing central ray of the collimated laser beam 406 and the chief ray 416 of a returning ray bundle captured by the receiving optics).

In one or more of the various embodiments, the sensor 414 of the receive system 412 may sense the incoming direction of the reflected light 416 in two dimensions (e.g., horizontally (such as, for example, β) and vertically (such as, for example, ε)). In some of the various embodiments, the receive system 412 may determine the incoming direction of the reflected light 416 in two dimensions by determining both one or more instantaneous column positions and one or more instantaneous row positions for each activated pixel (as explained in further detail below with regard to FIG. 6). In some embodiments, the transmit system 406 may record one dimension (e.g., the horizontal pointing direction α) "at departure." The receive system 412 may determine the elevation angle E. While configuring the receive system 412 to determine the elevation angle ε may require slightly more complexity, this configuration may provide other advantages, as explained in further detail below.

Figure 6:
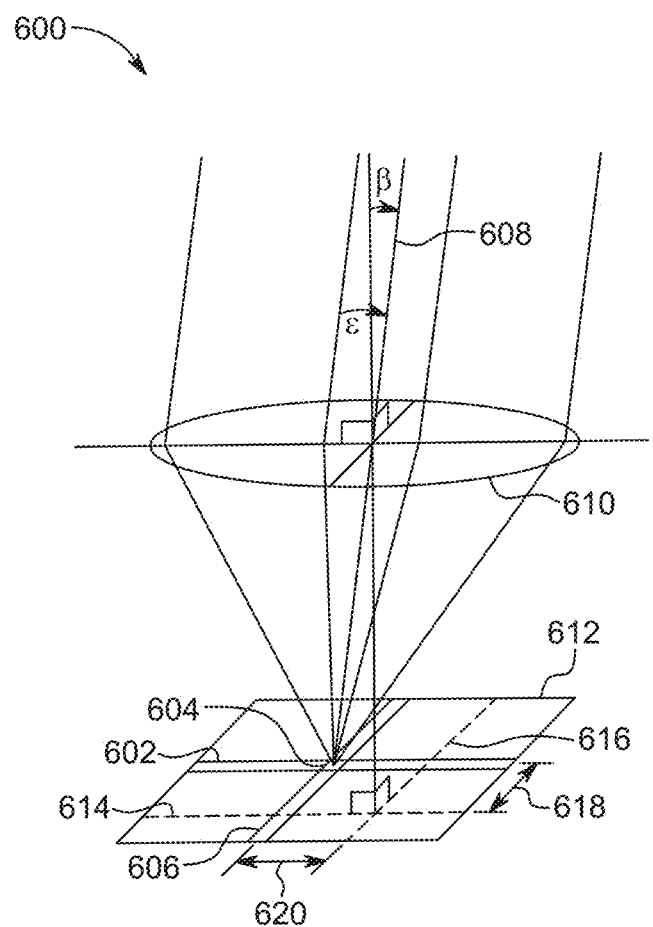
FIG. 6 illustrates an embodiment of a three-dimensional perspective view of an exemplary two-dimensional position tracking receiver system.

FIG. 6 illustrates an exemplary two-dimensional position tracking receiver 600. For example, the receiver 600 may be the same as or similar to one or more of those explained above. In one or more of the various embodiments, the receiver 600 may determine a row 602 of a pixel that detects a captured light spot 604 (e.g., a pixel that detects a center of the captured light spot 604). In some embodiments, the receiver 600 may determine an angle of epsilon ε based on the row 602 of the pixel. In one or more of the various embodiments, the receiver 600 may determine a column 606 of the pixel. In some of the various embodiments, the receiver 600 may determine an angle of beta β based on the column 606 of the pixel.

For example, a chief ray 608 may enter an aperture 610 of the receiver 600 that directs the chief ray 608 onto a sensor 612 of the receiver 600. In one or more of the various embodiments, the receiver 600 may store an identifier of a particular row 614. The particular row 614 may contain one or more pixels that may capture the light spot 604 in response to the chief ray 608 being perpendicular to a baseline of the receiver 600 from the perspective of the angle of epsilon ε (e.g., the angle of epsilon ε may be 90 degrees when measured from the baseline). In some of the various embodiments, the receiver 600 may store an identifier of a particular column. The particular column 616 may contain one or more pixels that may capture the light spot 604 in response to the chief ray 608 being perpendicular to a baseline of the receiver 600 from the perspective of the angle of alpha α (e.g., the angle of alpha α may be 90 degrees when measured from the baseline).

In one or more of the various embodiments, the receiver 600 may measure a first deviation 618 between the row 602 and the particular row 614. In some embodiments, the receiver 600 may calculate an incoming direction of the chief ray 608 (e.g., in terms of the angle of epsilon $\epsilon$) based on the first deviation 618. In some of the various embodiments, the receiver 600 may measure a second deviation 620 between the column 606 and the particular column 616. In some embodiments, the receiver 600 may calculate an incoming direction of the chief ray 608 (e.g., in terms of the angle of beta $\beta$) based on the second deviation 620.

Additionally, in this Specification and the corresponding figures, receiving (incoming) azimuthal angles are generally labeled beta, transmitted azimuthal angles are generally labeled alpha, and elevation angles are generally labeled epsilon (in either direction).

Returning to FIG. 4, in one or more of the various embodiments, the sensor 414 of the receive system 412 may be a dual-function sensor. The dual-function sensor may determine the spot's disparity instantaneously, thereby enabling a real-time calculation of voxel position by creating sequential voxel-by-voxel trajectories in three-dimensional space. The dual-function sensor may also capture red, green, and blue (RGB) light intensity values (e.g., "grey scale" values) of recorded primary colors). In some of the various embodiments, the receive system 412 may match captured color values with each voxel position (e.g., three-dimensional spatial coordinates), which the transmit and receive ($T_x$-$R_x$) system 402 calculates from sequentially recorded disparities. In one or more of the various embodiments, the receive system 412 may utilize diffuse low-intensity ambient light to record hues. In such case, the receive system 412 may implement longer exposure time periods. In some of the various embodiments, the transmit system 404 may utilize high intensity colored scanning beams 406. In such case, the receive system 412 may implement shorter exposure time periods. This dual-function version of the receive system 412 may include a more complex sensor as the sensor 414 (e.g., as explained in further detail below).

In some of the various embodiments, the receive system 412 may implement the RGB sensor function to employ and capture structured light codes (e.g., as explained in further detail below). The receive system 412 may locate the object C in three-dimensional space by taking sequential spatial-temporal measurements of RGB light intensities. In one or more of the various embodiments, by taking the sequential spatial-temporal measurements of RGB light intensities, the receive system 412 may determine color and grey scale pixel values and implement these values to locate the object C in three-dimensional space by establishing a direct color-coded correlation between each of the incoming light rays 416 and matching each of the incoming light rays 416 with one of a plurality of outgoing scan-projected light rays 406. For example, the transmit and receive ($T_x$-$R_x$) system 402 may implement De Bruijn coding.

In some of the various embodiments, the receive system 412 may implement the additional RGB sensor function to provide a robust system that may employ high-density multi-color structured light code sequences. For example, the receive system 412 may employ the high-density multi-color structured light code sequences to create an accurate and fine-grained three-dimensional surface contour map of the scanned object C.

In some of the various embodiments, the receive system 412 may implement analog color grey scale ability to detect and compensate for challenging ambient light conditions. For example, in response to the receive system 412 detecting strong non-uniform lighting, the receive system 412 may provide one or more signals to the transmit system 404. In one or more of the various embodiments, the transmit system 404 may adjust the projected light 406 to improve a signal-to-noise ratio in response to the one or more signals from the receive system 412, thereby enhancing robustness of the system 400. For example, in response to the adjustment to the projected light 406, the receive system 412 may identify specular reflections and thereby prevent errors.

In one or more of the various embodiments, the receive system 412 may detect one or more strong non-uniform, highly directional ambient light sources. In response to detecting the one or more strong non-uniform, highly directional ambient light sources, the receive system 412 may provide one or more signals to the transmit system 404. In some of the various embodiments, the one or more signals may indicate one or more characteristics of the detected ambient light sources. In response to the one or more signals from the receive system 412, the transmit system 404 may emit a specifically selected, dynamically adjusted mix of R, G & B intensities in or as the scanning beam 406. For example, the transmit system 404 may delay emitting the scanning beam 406 for a time period sufficient to allow the receive system 412 to record one or more images. During the time period, the receive system 412 may record one or more images in response to light received from the ambient light sources. In some of the various embodiments, the sensor 414 of the receive system 412 may be a dual-mode sensor. The dual-mode sensor of the receive system 412 may employ milliseconds-long exposure during the time period. The receive system 412 may provide one or more signals indicative of one or more characteristics of the ambient light to the transmit system 404. Based on the one or more characteristics of the ambient light, the transmit system 404 may dynamically adjust the mix and intensities of color sources that feed into the scanning beam 406. In some embodiments, the transmit system 404 may strobe the scanning beam 406. In some of the various embodiments, the receive system 412 may accurately measure surface contrast (e.g., hue, color, contrast) of the scanned object C by synchronizing measurements by the receive system 412 with the strobed beam 406. In one or more of the various embodiments, the dual mode sensor may enter a scanned synchronous mode to record observations using the strobed beam 406. In this mode, an intense-spot illumination source is synchronized line-by-line (e.g., the receive system 412 may set an exposure time of the sensor 414 to a time period, such as, for example, microseconds, of exposure that the receive system 412 spatially and temporally synchronizes with the scan beam 406). In this mode the reflection 416 of the synchronized light 406 may have a 500-to-1 (or greater) advantage over the ambient light. Thus, the transmit and receive ($T_x$-$R_x$) system 402 may overcome a challenging ambient light condition that could otherwise inhibit either accurate voxel location tracking or high-dynamic range surface color contrast detection. In particular, the transmit and receive ($T_x$-$R_x$) system 402 may improve dynamic system performance.

In one or more of the various embodiments, the transmit system 404 may determine elevation of the spot ex-ante. In some of the various embodiments, transmitting optics (e.g., the beam scanning mechanism 410) may determine the elevation of the spot. For example, a known deflection angle of the scanning optics, one or more MEMS scan mirrors, or an OPA system may indicate the elevation of the spot. Therefore, for each pixel recorded by a receiving camera (e.g., the sensor 414), a corresponding voxel position in the field of view can be calculated. As described previously, both three-dimensional surface structures, as well as high-resolution image details (contrast functions), can be motion-captured with fine-grained temporal resolution, resulting in un-blurred high velocity images with fine image details individually time-stamped in microseconds and, in some cases, even in nanoseconds. One advantage is that using this more precise intra-frame time (a precise time interval that the spot was illuminated in a particular sub-frame area) can significantly increase precision of estimations of an object's position, velocity, and acceleration.

In conventional cameras a typical frame exposure time is measured in tens of milliseconds. For example, a 30 FPS camera may have a frame exposure time as long as 33 milliseconds, thereby introducing significant motion blur and temporal position ambiguity. This time ambiguity result in velocity ambiguity. For example, this time ambiguity may result in velocity ambiguity with regard to an observed edge of an object or structure critical to collision avoidance or with regard to path planning in a fast flying autonomous drone. In contrast, in one or more of the various embodiments, the transmit and receive ($T_x$-$R_x$) system 402 may provide superior collision avoidance. For example, by providing fast and accurate measurements and calculations, the transmit and receive ($T_x$-$R_x$) system 402 may provide fast and/or agile navigation. Narrowing down the observation time window, from whole frames to individual lines and pixels, reduces the uncertainty of an observed event to a significantly smaller time window (the spot illumination strobe moment). It thereby greatly improves the accuracy of such observations and the accuracy of the predictions based on them. This critically improves real-time trajectory estimations and high-speed, low-latency calculations for collision avoidance and enables just-in-time, split-second "dodging" of high-speed projectiles.

In one or more of the various embodiments, the highly collimated trigger beam 406 may have an extent of one pixel. For example, the extent of the trigger beam 406 may include approximately 1 millionth of the field of view. In some of the various embodiments, in a high definition (HD) resolution, one pixel scans approximately one million sequential positions across the field of view.

In some of the various embodiments, the transmit and receive ($T_x$-$R_x$) system 402 may employ a strobed search light with a voxel-sized three-dimensional trigger beam as the scanning beam 406. In one or more of the various embodiments, a broad-spectrum illumination beam may be arranged to be co-centric with the trigger beam 406. In other embodiments, the broad-spectrum illumination beam may be arranged to be in fast pursuit of the trigger beam 406. In some of the various embodiments, the broad-spectrum illumination beam may have a broader spot, up to 1,000 times bigger in solid angle than the trigger beam 406. The transmit system 404 may utilize a diffusing effect of a phosphor to convert, for example, a high intensity, monochromatic coherent laser source (e.g., 445 nm laser diode) into a broad spectrum, more diffuse light source. By using this more diffuse, incoherent light, and with greater illumination power, the speed, accuracy, and range of the transmit and receive ($T_x$-$R_x$) system 402 can be extended.

Figure 7:
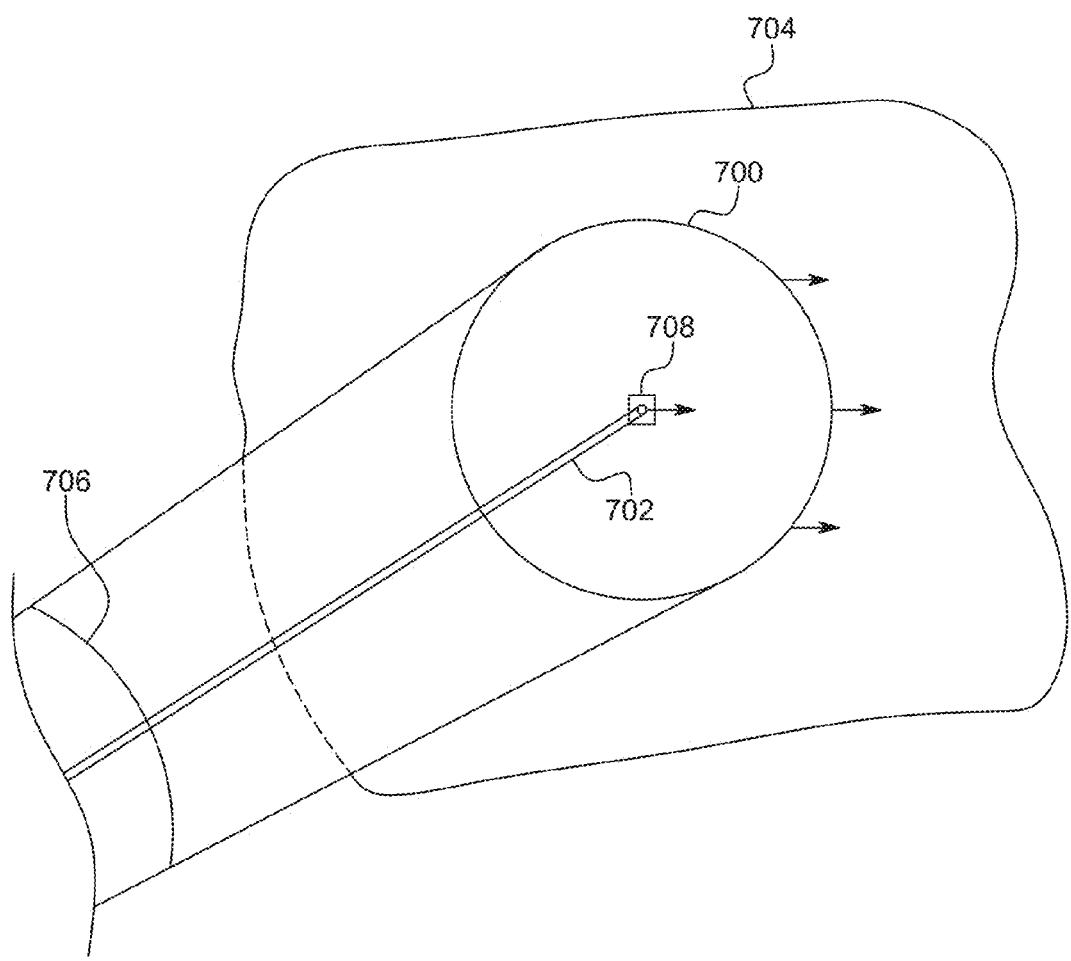
FIG. 7 shows an embodiment of an exemplary strobed search light (SSL) with voxel-sized trigger beam (TB) that is scanning across a three-dimensional surface.

FIG. 7 shows an exemplary strobed search light (SSL) that an exemplary transmit and receive ($T_x$-$R_x$) system may employ to scan an exemplary scan area 700. For example, the transmit and receive ($T_x$-$R_x$) system may be the same as or similar to one or more of those explained above. In one or more of the various embodiments, the strobed search light (SSL) may have a voxel-sized trigger beam (TB) 702 that scans across a portion of a three-dimensional surface 704 that falls within the scan area 700. In some of the various embodiments, the transmit and receive ($T_x$-$R_x$) system may cause the SSL to have a wave front 706 that splashes against the search area 700. The voxel-sized trigger beam 702 may impact that three-dimensional surface 704 at a voxel-sized point 708 within the scan area 700.

Figure 8:
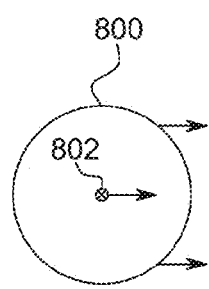
FIG. 8 illustrates an embodiment of an exemplary narrowly-collimated voxel-sized trigger beam that is surrounded by an exemplary flying spot style SSL.

FIG. 8 illustrates an exemplary flying spot style strobed search light (SSL) 800 that an exemplary transmit and receive ($T_x$-$R_x$) system may employ to scan an exemplary scan area. For example, the transmit and receive ($T_x$-$R_x$) system may be the same as or similar to one or more of those explained above. In one or more of the various embodiments, the flying spot style strobed search light (SSL) 800 may surround a narrowly-collimated voxel-sized (e.g., single pixel sized) trigger beam 802.

Figure 9:
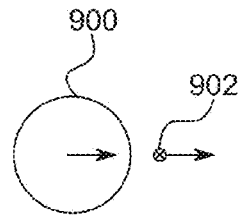
FIG. 9 shows an embodiment of an exemplary narrowly-collimated voxel-sized trigger beam that is trailed by an exemplary flying spot style SSL.

FIG. 9 shows an exemplary flying spot style strobed search light (SSL) 900 that an exemplary transmit and receive ($T_x$-$R_x$) system may employ to scan an exemplary scan area. For example, the transmit and receive ($T_x$-$R_x$) system may be the same as or similar to one or more of those explained above. In one or more of the various embodiments, the flying spot style strobed search light (SSL) 900 may trail a narrowly-collimated voxel-sized trigger beam 902. In some of the various embodiments, the trigger beam 902 may ensure that there is a small, yet sufficient, amount of time (after a target reflects the trigger beam 902) for newly activated pixels to detect the SSL 900. For example, activation of the newly activated pixels may be driven by, and follow, detection of the reflected light of the trigger beam 902.

Returning to FIG. 4, because the transmit and receive ($T_x$-$R_x$) system 402 may cause the spotlight to illuminate the pixels for a short time period (e.g., a few microseconds) and because the transmit and receive ($T_x$-$R_x$) system 402 can correlate an exposure period with one or more observed voxel times, the transmit and receive ($T_x$-$R_x$) system 402 may record an RGB image that is both substantially blur-free and time-constrained to a very narrow time window. For example, a traditional sensor mounted on a car going 20 meters per second (72 km/hr or 45 mph) and using a global shutter at 100 frames per second may see a pixel blur of 20 cm (approximately two-thirds of a foot) when looking down onto pavement, rendering camera resolution meaningless and rendering image reconstruction impossible. The smart spot illumination of one or more of the various embodiments may reduce this motion blur by, for example, orders of magnitude (e.g., to 20 microns), well below various cameras' resolution limits. For example, in some of the various embodiments, the transmit and receive ($T_x$-$R_x$) system 402 may narrow down a conventional 33 millisecond window by a factor of, for example, 1000. In one or more of the various embodiments, the transmit and receive ($T_x$-$R_x$) system 402 may narrow down the conventional 33 millisecond window to achieve an exposure time as short as, for example, 33 microseconds.

In one or more of the various embodiments, the transmit and receive ($T_x$-$R_x$) system 402 may, in employing the smart spot illumination, select a transition period that dictates delay of emission of the strobed search light from time of emission of the trigger beam. In some of the various embodiments, the transition period predetermines the exact time of illumination of the pixels by the strobed search light relative to the time of illumination of the pixels by the trigger beam. In some embodiments, because the exact time of illumination by the strobed search light is predetermined relative to the time of illumination by the trigger beam, the transmit and receive ($T_x$-$R_x$) system 402 may activate pixels at the correct time without fast pixel gating, without additional logic in a camera sensor plane itself (e.g., a plane of the sensor 414). In contrast, conventional three-dimensional capture systems (e.g., those produced by Canesta™, SwissRanger™, Softkinetic™, or others) require complex logic in each pixel and require additional transistors that increase minimum pixel size, which negatively impacts resolution, size, system power, and cost.

Optionally, in one or more of the various embodiments, individual pixels (or a separate high sensitivity receiver, e.g., a SPAD) of the receive system 412 may detect the reflected beam 416. In response to this detection, the receive system 412 may trigger successive individual exposure on and off circuits (e.g., as explained in further detail below).

In some of the various embodiments, transmit and receive ($T_x$-$R_x$) system 402 may employ three-dimensional voxel matched, laser time-of-flight triggered, RGB flash and corresponding pixel-by-pixel auto-exposure. In one or more of the various embodiments, the triggered dual-function sensor of the transmit and receive ($T_x$-$R_x$) system 402 may detect light emitted by one or more intense blue lasers and one or more phosphors of the transmit system 404. In some of the various embodiments, the one or more intense blue lasers may emit one or more strong flashes of intense blue laser light. In some embodiments, the one or more strong flashes of intense blue laser light may excite one or more phosphors. For example, in response to the intense blue laser light, a phosphor may convert most of the blue photon energy of the intense blue laser light into a more diffuse white illumination spot. Such phosphor down-conversion (e.g., from shorter to a longer wavelength) may respond at a certain latency (e.g., a phase shift). For example, the phosphor may cause a white broad spectrum light wave front to follow a narrow band blue laser flash light wave front after a short delay. In some of the various embodiments, a phosphor natural lag of various phosphors can be selected to spread out in time various wavelengths of iridescence response of the phosphors. For example, the various phosphors may provide a phosphor lag time that varies based on the various wavelengths (e.g., from bluish green to red, wherein longer wavelengths may have longer phosphor lag times).

In some of the various embodiments, transmit system 404 may emit a sharp ultraviolet (UV) or blue laser pulse induced iridescence wave front travelling at the speed of light. In one or more of the various embodiments, the first light to arrive at the sensor 414 (after the time-of-flight delay) may include bluish light. The last photons to arrive may provide reddish light. A similar time delay in displays may cause phenomena referred to as "PlainBow." In one or more of the various embodiments, fast pixels may detect the front-running blue light (e.g., originating directly from the blue laser source). The lag in the arrival of the trailing phosphor light enables a novel trigger function. For example, a trigger pixel may first record an origin of light rays that are first received by that pixel (e.g., a voxel location on a surface where that ray of blue light was reflected (column identifier and/or row identifier)) and may also trigger a second integration sensing function by, for example, unlatching or opening a new path for photodiode generated photo current to be captured (e.g., in a floating diffusion). In one or more of the various embodiments, a pulsed laser may directly generate a narrow band blue light that is first to arrive at the pixel. In response to the narrow band blue light, the pixel may open a path for soon-to-arrive light to be spectrally recorded. By employing this triggered pixel function, pixels may discriminate between having or not having light in them. For example, in response to a given pixel having light in it, the given pixel may capture color information.

In some of the various embodiments, the transmit and receive ($T_x$-$R_x$) system 402 may employ filter-less color strobe triggered time-sequential smart pixels. In one or more of the various embodiments, the receive system 412 may capture triggered pixel photocurrent of an incoming wave front at to. In some of the various embodiments, a row or column sense line may measure the triggered pixel photocurrent. In some of the embodiments, receive system 412 may cause an additional cascade triggered adjacent pixel to capture later, longer wavelength components of the incoming wave front at a slightly delayed exposure moment $t_1$. By using the cascaded delay, the receive system 412 may capture various sub bands of the spectrum in a pixel color time sequential method without, for example, requiring filters. In one or more of the various embodiments, the various cascaded photodiodes may include layered or stacked photodiodes with blue sensitivity closer to the surface and red sensitivity deeper below (e.g., four pinned photo diodes (PDD) of FIG. 27 might be one above the other).

Figure 28:
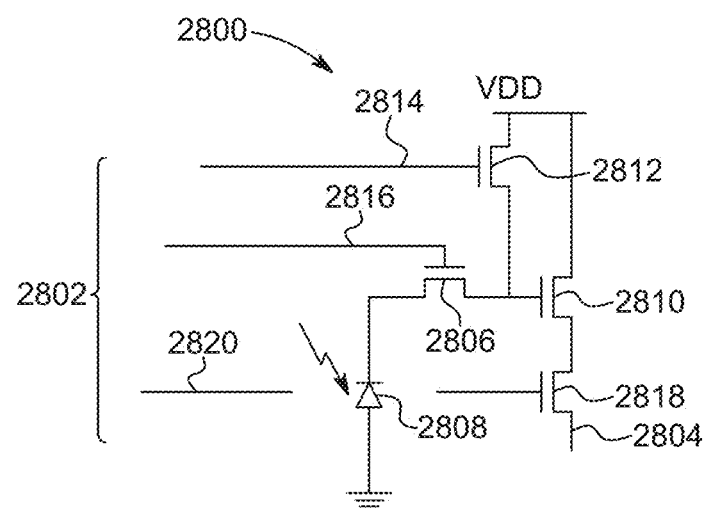
FIG. 28 shows an embodiment of an exemplary flash-triggered four-transistor photodiode pixel that employs an exemplary sense line to sequentially capture various exemplary color-separated and time-separated components.

For example, when there is a small object within range, the receive system 412 may automatically capture those RBG pixel values that the transmit system 404 includes with the scanning beam 406, while suppressing at the pixel and time (e.g., nanosecond) levels various ambient/background light. In this manner, the receive system 412 may create a strongly selective pixel function, cropping out the three-dimensional objects in the foreground, recording the briefest possible moment of exposure. As explained in further detail below, FIG. 28 shows an example of a very fast sequentially triggered and/or externally gated PDD.

Optionally, in one or more of the various embodiments, the pixel serving as a trigger may be a sub-pixel, with selective narrowband filters preferentially selective to the triggering blue light wavelength, gating or unlatching a second separate colored (e.g., RGB) pixel.

Both the transmit system 404 and the receive system 412 may include a fast real-time position spot location detector. Location detection of one or two dimensions and optionally a time-of-flight (time of flight) direct time and distance measurement by a sensor and view/camera perspective estimation is described in PhotonJet U.S. Pat. Nos. 8,282,222, 8,430,512, and 8,696,141 assigned to PhotonJet. Such location detection is also explained in further detail by later PhotonJet patent applications that name Gerard Dirk Smits as an inventor.

In some of the various embodiments, the transmit and receive ($T_x$-$R_x$) system 402 may employ assisted stereo. In one or more of the various embodiments, the receive system 412 may include two synchronized row scanning rolling shutter cameras (e.g., as the respective sensors 414 of each receiver) arranged in an epipolar stereo scan arrangement. For example, an offset distance D may separate two epipolar stereo receivers (e.g., a left receiver and a right receiver). The dual receivers may function as one-dimensional (1D) position detectors that may detect azimuthal disparity column values for a projected spot along a single row preselected by, for example, aiming the transmitted scan beam 406 along a certain elevation. In some of the various embodiments, the transmit system 404 may know an elevation angle $\epsilon$ of the certain elevation, for example, ex-ante. At each moment in time, the receive system 412 may read two values, one from each sensor 414 of the two epipolar stereo receivers.

Figure 10:
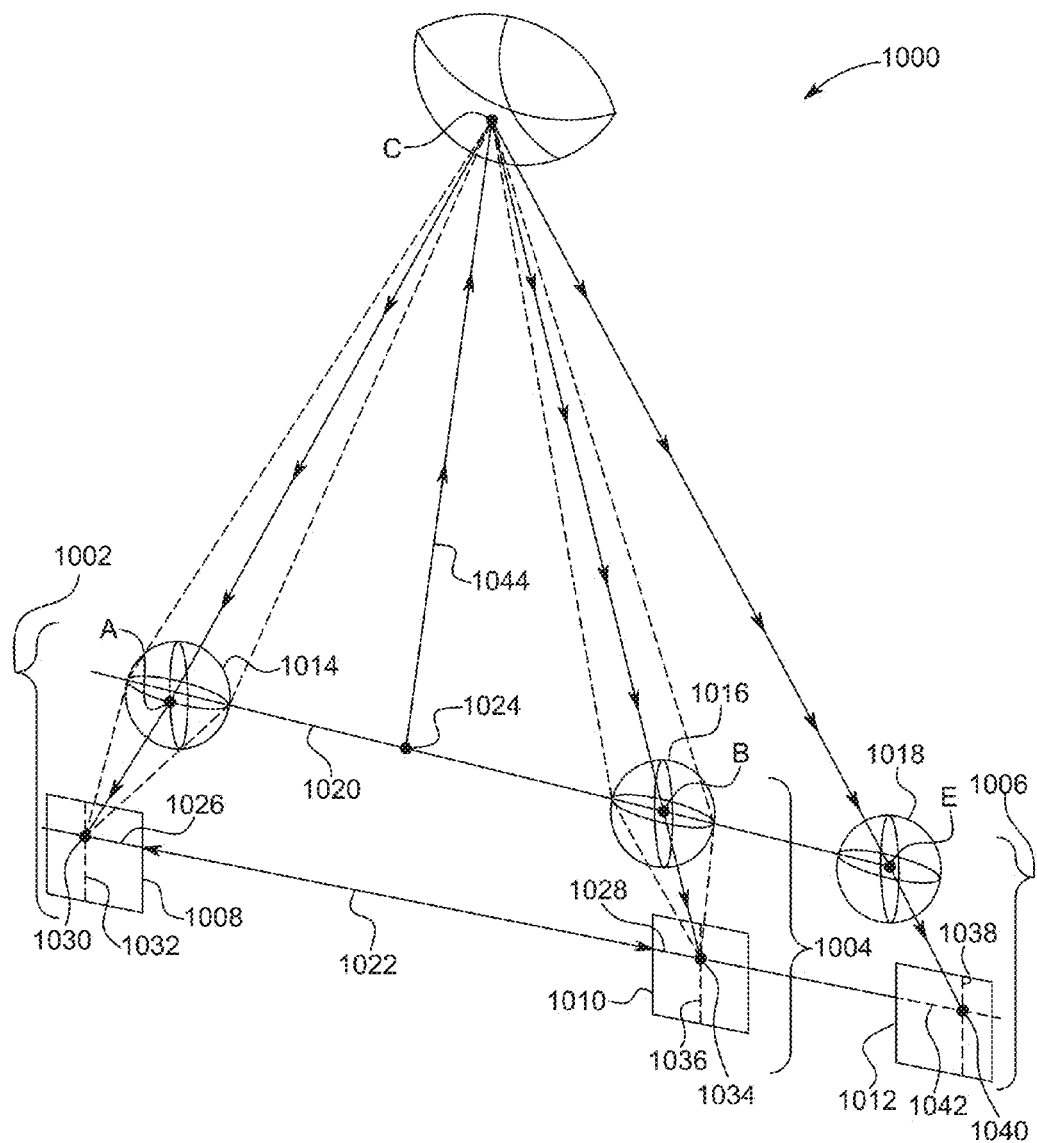
FIG. 10 illustrates an embodiment of an exemplary three-dimensional perspective view of a fast tracking system that employs three exemplary one-dimensional real time sensors to track an exemplary flying spot style SSL.

From the known elevation, one or more of the transmit system 404 or the receive system 412 may determine a Y dimension. From one or more of the dual azimuthal alpha or X values, one or more of the transmit system 404 or the receive system 412 may determine both X and Z coordinates (or range). In some of the various embodiments, for every moment, every position (e.g., measured to the nanosecond) that the scan beam 406 reflects off an object within the dual aperture stereo field of view, the transmit and receive ($T_x$-$R_x$) system 402 may calculate an instant (X, Y, Z, t) voxel position-time vector. In one or more of the various embodiments, the transmit and receive ($T_x$-$R_x$) system 402 may determine a voxel position trajectory. In some of the various embodiments, the transmit and receive ($T_x$-$R_x$) system 402 may determine a voxel position trajectory that includes a plurality of these position-time vectors. For example, the transmit and receive ($T_x$-$R_x$) system 402 may record and act upon 100 million or more of these position-time vectors every second with minimal (e.g., microsecond) latency FIG. 10 illustrates an exemplary fast tracking system 1000 that employs three exemplary one-dimensional real time sensors to track an exemplary flying spot style SSL. For example, the fast tracking system 1000 may be the same as or similar to one or more of the transmit and receive ($T_x$-$R_x$) systems explained above. In one or more of the various embodiments, the fast tracking system 1000 may include a first receiver 1002, a second receiver 1004, and, optionally, a third receiver 1006. In some of the various embodiments, the first receiver 1002 may include a first sensor 1008. The second receiver 1004 may include a second sensor 1010. The third receiver 1006 may include a third sensor 1012. In some embodiments, the first receiver 1002 may include a first aperture 1014 that has a center point at position A. The second receiver 1004 may include a second aperture 1016 that has a center point at position B. The third receiver 1006 may include a third aperture 1018 that has a center point at position E. In some embodiments, the first, second, and third apertures 1014, 1016, and 1018 may be directionally aligned along a baseline 1020.

In some embodiments, the two sensors 1008 and 1010 may record instantaneous pixel-by-pixel stereo disparity in a fast scanning azimuthal direction, directionally aligned along an optional row select line 1022. While FIG. 10 shows a transmit system 1024 positioned along the baseline 1020, the transmit system 1024 may reside in various locations other than on the baseline 1020 (e.g., as also applies to one or more other various embodiments explained herein).

In one or more of the various embodiments, the optional third sensor 1012 may be a one-dimensional sensor. In some of the various embodiments, the system 1000 may orient the third one-dimensional sensor 1012 to measure instantaneous elevation (c) of the flying spot. For example, the third one-dimensional sensor 1012 may have an orientation that is perpendicular to (e.g., rotated 90 degrees with respect to) orientations of the first sensor 1008 and the second sensor 1010 (e.g., as illustrated in FIG. 10). In some of the various embodiments, the third one-dimensional sensor 1012 may reside in line with the row select line 1022.

For example, the apertures 1014, 1016, and 1018 may direct a chief ray that reflects off an object C onto respective ones of the sensors 1008, 1010, and 1012. In one or more of the various embodiments, the row select line 1022 may activate a pixel row 1026 of the first sensor 1008. In some of the various embodiments, the row select line 1022 may activate a pixel row 1028 of the second sensor 1028. A pixel 1030 in the activated row 1026 may capture the chief ray. The first receiver 1002 may determine a column 1032 of the pixel 1030. A pixel 1034 in the activated row 1028 may capture the chief ray. The second receiver 1004 may determine a column 1036 of the pixel 1034. From these measurements, the system 1000 may determine a position of an object C in a first dimension.

In one or more of the various embodiments, the third receiver 1006 may activate a pixel column 1038 of the third sensor 1012 via, for example, a column select line (not shown). A pixel 1040 in the activated column 1038 may capture the chief ray. The third receiver 1006 may determine a row 1042 of the pixel 1040. From these measurements, the system 1000 may determine the position of the object C in a second dimension. In some of the various embodiments, the first and second dimensions may be dimensions in addition to range.

In some of the various embodiments, the system 1000 may include one or more dual receivers as one or more of the first sensor 1008 or the second sensor 1010. In some embodiments, the transmit system 1024 may track elevation of a scanning beam 1044. In some of the various embodiments, the third receiver 1006 may be co-located with the transmit system 1024.

Figure 11:
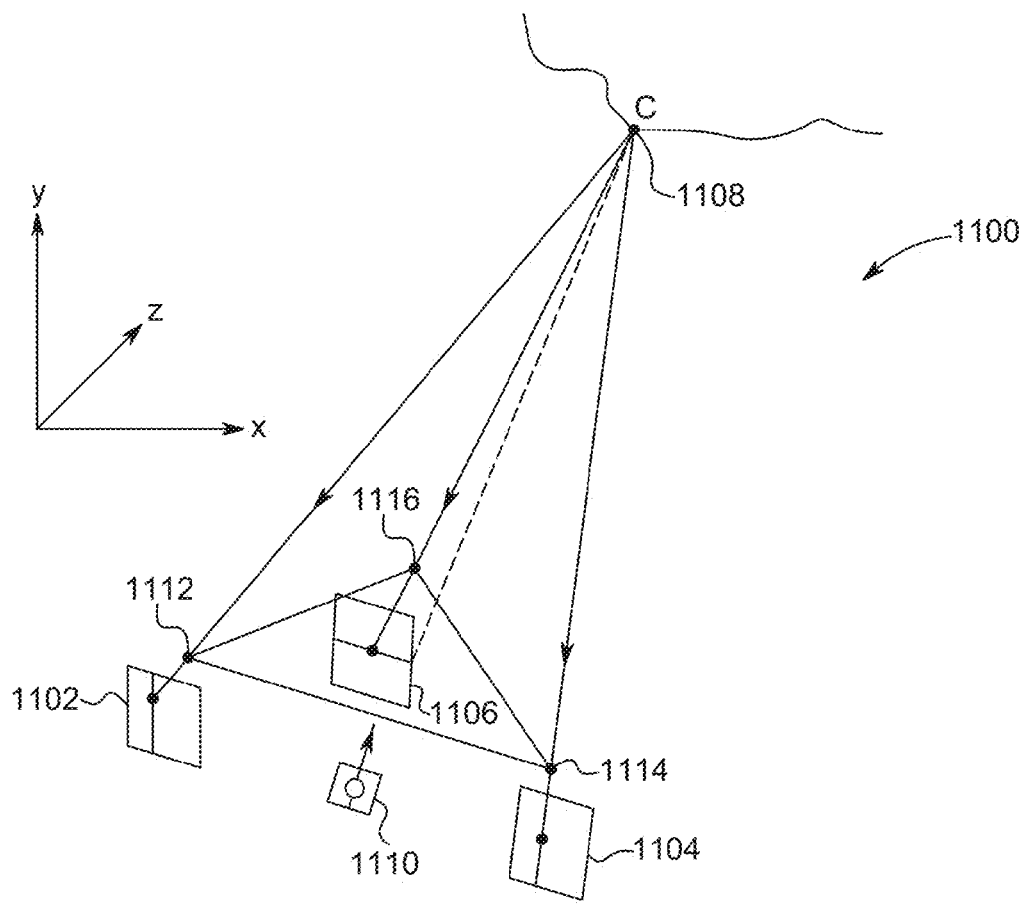
FIG. 11 shows another embodiment of a three-dimensional perspective view of an exemplary fast tracking system that employs three exemplary one-dimensional real time sensors to track an exemplary flying spot style SSL.

FIG. 11 shows an exemplary fast tracking system 1100 that employs three exemplary one-dimensional real time sensors to track an exemplary flying spot style SSL. For example, the fast tracking system 1100 may be the same as or similar to one or more of the transmit and receive ($T_x$-$R_x$) systems explained above. In one or more of the various embodiments, the fast tracking system 1100 may include a left receiver, a right receiver, and, optionally, an elevation receiver. The left receiver may include a first sensor 1102. The right receiver may include a second sensor 1104. The elevation receiver may include a third sensor 1106. In some embodiments, the third sensor 1106 may be a one-dimensional sensor. In some of the various embodiments, the system 1100 may orient the third sensor to measure instantaneous elevation (e.g., 6) of the flying spot 1108 on an object C. For example, the third sensor 1106 may have an orientation that is perpendicular to (e.g., rotated 90 degrees with respect to) orientations of the first sensor 1102 and the second sensor 1104 (e.g., as illustrated in FIG. 11). In some of the various embodiments, the system 1100 may mount the third sensor 1106 to create additional vertical disparity. For example, the system 1100 may mount the third sensor 1106 above a vertical position of the left receiver, a vertical position of the right receiver, and a vertical position of a transmitter 1110 of the system 1100. In some of the various embodiments, the left receiver may include a first aperture 1112 that directs reflected light onto the first sensor 1102. The right receiver may include a second aperture 1114 that directs reflected light onto the second sensor 1104. A baseline may extend between the first aperture 1112 and the second aperture 1114. The elevation receiver may include a third aperture 1116. The third aperture 1116 may be at a position that forms a triangle along a vertical plane with the baseline. In some embodiments, the system 1100 may mount the third sensor 1106 at above a vertical position of the baseline.

Figure 12:
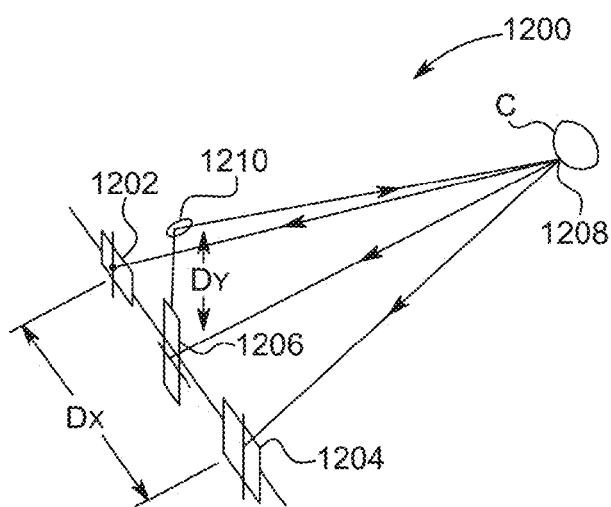
FIG. 12 illustrates another embodiment of a three-dimensional perspective view of an exemplary fast tracking system that employs three exemplary one-dimensional real time sensors to track an exemplary flying spot style SSL.

FIG. 12 illustrates an exemplary fast tracking system 1200 that employs three exemplary one-dimensional real time sensors to track an exemplary flying spot style SSL. For example, the fast tracking system 1200 may be the same as or similar to one or more of the transmit and receive ($T_x$-$R_x$) systems explained above. In one or more of the various embodiments, the fast tracking system 1200 may include a left sensor 1202, a right sensor 1204, and, optionally, an elevation sensor 1206. In some of the various embodiments, the elevation sensor 1206 may be a one-dimensional sensor. In some embodiments, the elevation sensor 1206 may be positioned between the left and right sensors 1202 and 1204. For example, the elevation sensor 1206 may be positioned on a baseline that extends between the left sensor 1202 and the right sensor 1204. In one or more of the various embodiments, the baseline may have a length of $D_x$. The elevation sensor 1206 may be positioned at a distance of half of $D_x$ from each of the left and right sensors 1202 and 1204.

In some of the various embodiments, the system 1200 may provide additional vertical disparity while illuminating a portion 1208 of an object C. In some of the various embodiments, a transmit system 1210 may be mounted at a position that causes a scanning collimated laser beam to be oriented high above the baseline and looking down at an obstacle (such as, for example, the object C) (e.g., mounted above the obstacle). This may be advantageous in vehicles. In some embodiments, the system 1200 may position the transmit system 1210 at a distance of $D_y$ above the baseline. The system 1200 may position the transmit system 1210 vertically above the elevation sensor 1206. For example, the system 1200 may provide a maximum horizontal baseline $D_x$ (e.g., 120 cm to 200 cm in vehicular headlights). The system 1200 may also provide a significant vertical baseline $D_y$ (e.g., 80 cm to 120 cm).

Figure 13:
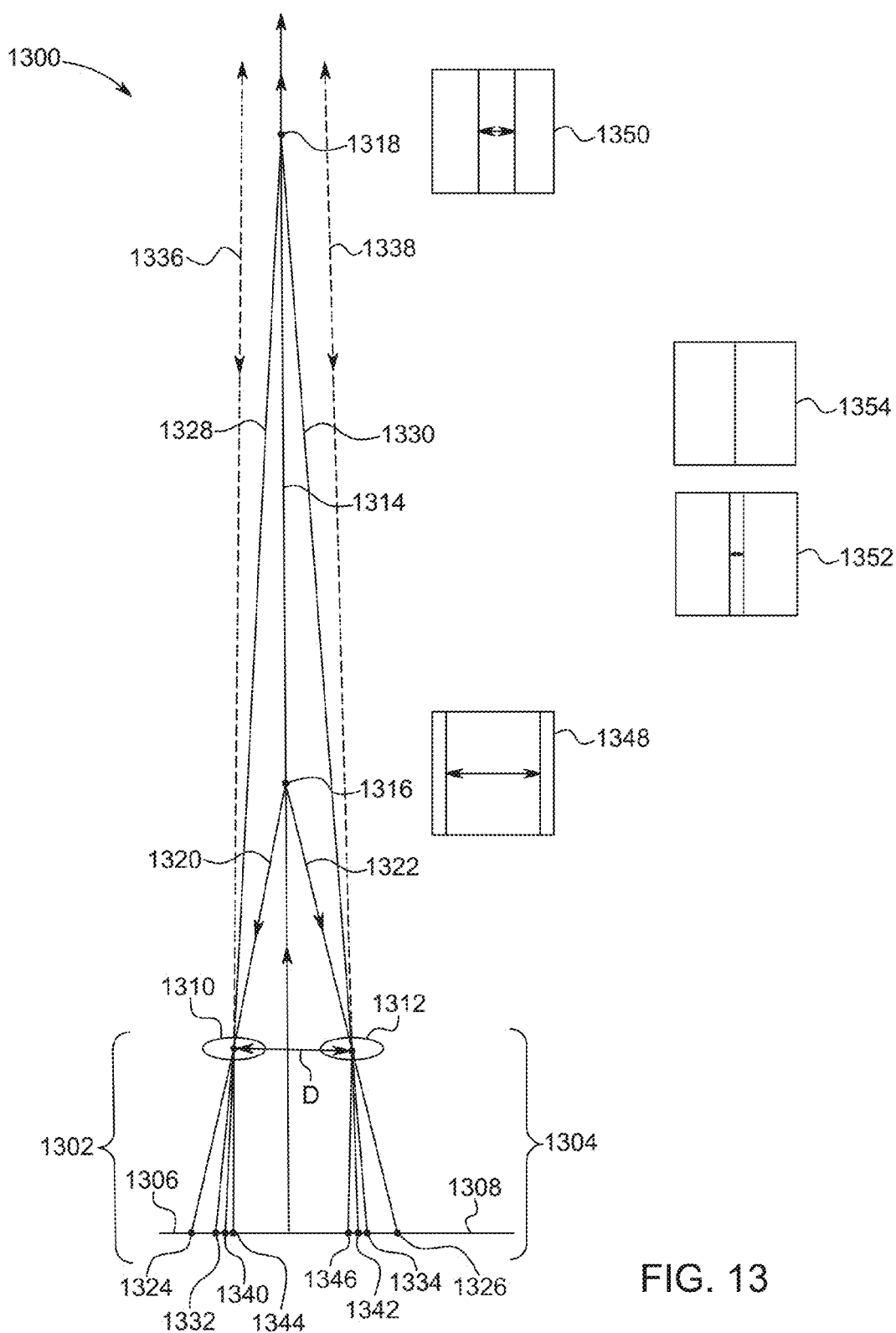
FIG. 13 shows an embodiment of an exemplary two-dimensional view of an exemplary stereo receiving system.

FIG. 13 shows an exemplary receive system 1300 that includes an exemplary stereo pair of receivers. For example, the receive system 1300 may be the same as or similar to one or more of those explained above. In one or more of the various embodiments, the receive system 1300 may include a left receiver 1302 and a right receiver 1304. The left receiver 1302 may include a first sensor 1306. The right receiver 1304 may include a second sensor 1308. The left receiver 1302 may include a first aperture 1310 that directs light onto the first sensor 1306. The right receiver 1304 may include a second aperture 1312 that directs light onto the second sensor 1308. A distance D may separate the first aperture 1310 and the second aperture 1312 from each other. The left receiver 1302 and the right receiver 1304 may capture reflections of a transmitted beam 1314.

In some of the various embodiments, the receive system 1300 may determine an observable disparity (e.g., an observable distinction between beam angles). For example, as a distance between a target and the receive system 1300 increases, the observable disparity may diminish. The receive system 1300 may reduce a potential Z-range error in response to determining that the observable disparity passes a threshold (e.g., falls below the threshold). For example, the receive system 1300 can automatically switch to ranging by time-of-flight methods (e.g., as explained in further detail below).

In some of the various embodiments, the transmitted beam 1314 may reflect off an object at a first position 1316 (e.g., at a close distance). In some embodiments, the transmitted beam 1314 may reflect off an object at a second position 1318 (e.g., at a medium distance). In some embodiments, the transmitted beam 1314 may reflect off an object a third position (e.g., at a far distance that resides out of FIG. 13). The left receiver 1302 may receive a light ray 1320 that reflects from the object at the first position 1316. The right receiver 1304 may receive a light ray 1322 that reflects from the object at the first position 1316. For example, a first pixel 1324 of the first sensor 1306 may capture the reflected light 1320. A second pixel 1326 of the second sensor 1308 may capture the reflected light 1322. The left receiver 1302 may receive a light ray 1328 that reflects from the object at the second position 1318. The right receiver 1304 may receive a light ray 1330 that reflects from the object at the second position 1318. For example, a third pixel 1332 of the first sensor 1306 may capture the reflected light 1328. A fourth pixel 1334 of the second sensor 1308 may capture the reflected light 1330. The left receiver 1302 may receive a light ray 1336 that reflects from the object at the third position. The right receiver 1304 may receive a light ray 1338 that reflects from the object at the third position. For example, a fifth pixel 1340 of the first sensor 1306 may capture the reflected light 1336. A sixth pixel 1342 of the second sensor 1308 may capture the reflected light 1338. In one or more of the various embodiments, a seventh pixel 1344 of the first sensor 1306 may capture light reflected from various objects that approach a distance of infinity from the first sensor 1306. An eighth pixel 1346 of the second sensor 1308 may capture light reflected from various objects that approach a distance of infinity from the second sensor 1308.

In one or more of the various embodiments, the system 1300 may have good disparity 1348 (e.g., between the first pixel 1324 and the second pixel 1326) as occurs when capturing light reflected from near objects. In some of the various embodiments, the system 1300 may have diminishing disparity 1350 (e.g., between the third pixel 1332 and the fourth pixel 1334) as occurs when capturing light reflected from objects at increased distances. For example, when capturing reflections from objects positioned at far distances (e.g., the third position) the system 1300 may have poor disparity 1352 (e.g., between the fifth pixel 1340 and the sixth pixel 1342). In some embodiments, the system 1300 may lack (or practically lack) disparity 1354 (e.g., between the seventh pixel 1344 and the eighth pixel 1346) as occurs when capturing reflections from objects positioned at distances that approach infinity.

Figure 14:
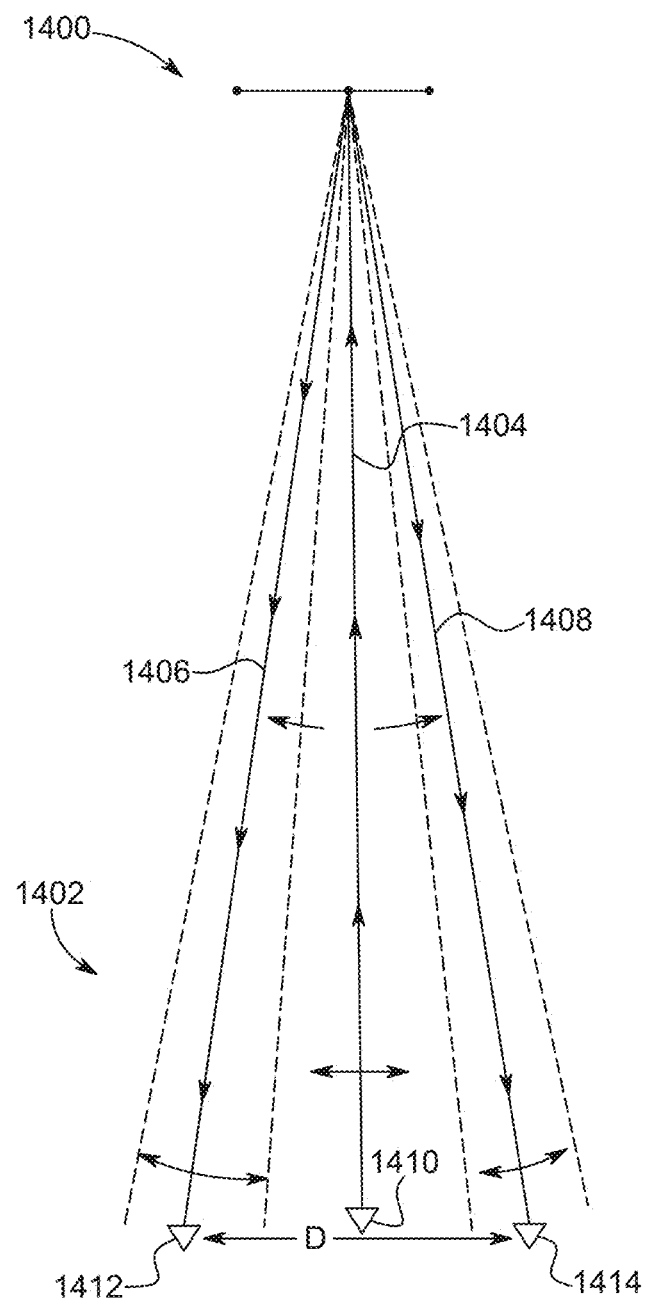
FIG. 14 illustrates an embodiment of an exemplary retro-reflective target that splits and reflects an exemplary scanning beam into two exemplary separate beams.

FIG. 14 illustrates an exemplary modified retro reflective (MRR) target 1400 that may enhance tracking for an exemplary transmit and receive ($T_x$-$R_x$) system 1402 (e.g., one or more of those explained above). In some of the various embodiments, the modified retro reflective target 1400 may provide a reflection of a scanning laser beam 1404. The modified retro reflective target 1400 may significantly increase a range for assisted stereo triangulation. The modified retro reflective target 1400 may significantly increase a range for using stereo receivers for long range time-of-flight measurements. For example, where triangulation may lack a sufficient baseline at great distances, the modified retro reflective target 1400 may provide the reflection in a manner that provides accurate three-dimensional detection.

In one or more of the various embodiments, the modified retro reflective target 1400 may cause the reflection to have a large signal strength. For example, the modified retro reflective target 1400 may cause the reflection to have a 100× gain as compared to a Lambertian or diffuse reflection. In some embodiments, the modified retro reflective target 1400 may reflect LIDAR mode pulses to provide reflections that may be strong enough for a receive system to detect at great ranges.

In some of the various embodiments, the modified retro reflective target 1400 may split the reflection into two retro-reflecting ray bundles 1406 and 1408. For example, the modified retro reflective target 1400 may aim the two retro-reflective ray bundles 1406 and 1408 at a stereo receiver pair of the receive system (e.g., each of the two retro-reflective ray bundles 1406 and 1408 may be aimed at a respective receiver 1412 and 1414 of the stereo receiver pair). In some embodiments, the modified retro reflective target 1400 may aim the two retro-reflecting ray bundles 1406 and 1408 at the stereo receiver pair with an epipolar (e.g., horizontal) diversion angle of ≈3α (e.g., as explained in further detail below). For example, the retro reflective target 1400 may split the reflection into a narrow spread angle reflection beam pair (e.g., with a beam spread angle that can be less than 1 degree). In one or more of the various embodiments, the modified retro reflective target 1400 may be decal adhesive MRR targets (e.g., attached at perimeters of vehicles to provide accurate perception of them by machine vision at great distances). By implementing the epipolar (e.g., horizontal) precise and deliberate 3α spreading by the MRR 1400, the modified retro reflective target 1400 may cause conventional retro-reflecting and other conspicuous surfaces (e.g., those commonly used in license plates, rear signals, highway signs, and "cat eye" lane markers) may appear less bright to the stereo receiver pair of the receive system (e.g., in the head light assembly). By reflecting light back precisely on target (and optionally while the transmit system 1410 pulses the light with known intervals), the modified retro reflective target 1400 may permit the transmit system 1410 to reduce a required magnitude of transmitted light. Also by reflecting light back precisely on target (and optionally while the transmit system 1410 pulses the light with known intervals), the modified retro reflective target 1400 may permit the receive system of a vehicle's machine vision guidance system to instantly (or practically instantly) recognized its own signal.

Figure 15:
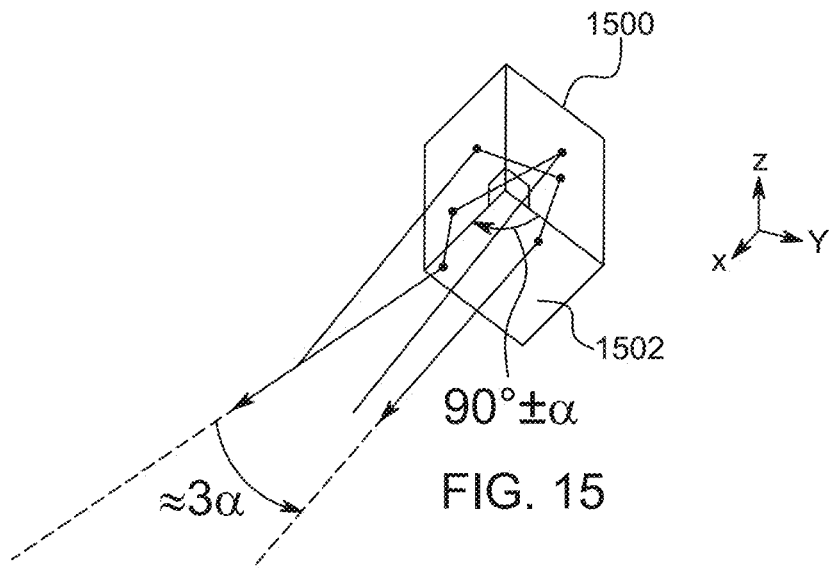
FIG. 15 shows an embodiment of a three-dimensional perspective view of an exemplary cubic retro-reflective facet that splits and reflects an exemplary scanning beam.

FIG. 15 shows an exemplary cubic retro-reflective target 1500 that may split and reflect an exemplary scanning beam. For example, the cubic retro-reflective target 1500 may be the same as or similar to the modified retro reflective target of FIG. 16. The cubic retro-reflective target may be a component of one or more of the above-explained systems. In one or more of the various embodiments, the cubic retro-reflective target 1500 may have a modified facet 1502 that provides a horizontal reflection split. In some of the various embodiments, the modified facet may have a small deviation angle α. For example, the angle α may represent an angle between the modified facet 1502 and a plane that is orthogonal to one or more of each other facet of the cubic retro-reflective target 1500 (e.g., an angle between the modified facet 1502 and one or more of each other facet is 90−/+ the small deviation angle α). As explained above with regard to FIG. 14, the cubic retro-reflective target 1500 may provide an angular separation between two reflected beams of three times the deviation angle α.

In some of the various embodiments, when stereo receivers of a transmit and receive ($T_x$-$R_x$) system each simultaneously receive equal amounts of light, the system may increase a degree of certainty that the received light is from a transmitter of the system, as opposed to spurious ambient rays (which are likely to arrive at the stereo receivers at different times or different magnitudes).

Figure 16:
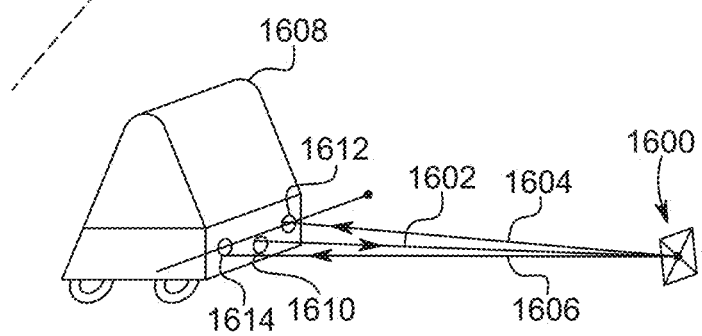
FIG. 16 illustrates an embodiment of three-dimensional perspective view of an exemplary retro-reflective target that splits and reflects an exemplary scanning beam into two exemplary separate beams toward exemplary receivers on an exemplary vehicle.

FIG. 16 illustrates an exemplary retro-reflective target 1600 that may split and reflect an exemplary scanning beam 1602 into two exemplary separate beams 1604 and 1606 toward an exemplary vehicle 1608. For example, the retro-reflective target 1600 may be the same as or similar to one or more of those explained above. In one or more of the various embodiments, the vehicle 1608 may include a transmit and receive ($T_x$-$R_x$) system. For example, the transmit and receive ($T_x$-$R_x$) system may be the same as or similar to one or more of those explained above. In some of the various embodiments, the transmit and receive ($T_x$-$R_x$) system may include a transmit system 1610. In some embodiments, the transmit and receive ($T_x$-$R_x$) system may include a first receive system 1612 and a second receive system 1614. In one or more of the various embodiments, the transmit system 1610 may emit the transmitting scanning beam 1602.

In one or more of the various embodiments, the vehicle 1608 may be an ultra-small vehicle (USV). In some of the various embodiments, the vehicle 1608 may keep accurate range of the retro-reflective target 1600 with stereo receivers (e.g., the receive systems 1612 and 1614) built into headlight assemblies of the vehicle 1608. The retro-reflective target, for example, may increase an ability of the receive systems 1612 and 1614 to detect the reflections 1604 and 1606 of the transmitted beam 1602, thereby permitting the transmit system 1610 to emit a very weak signal (e.g., laser safe) while the receive systems 1612 and 1614 provide the accurate range detection. In some of the various embodiments, due to the very narrow reflection, the transmit system 1610 and the retro-reflective target 1600 may avoid detection of reflection by receivers of other vehicles.

In one or more of the various embodiments, a system of highly direction-selective reflective targets placed on USVs such as described here (for example, especially when adopted as a standard for autonomous USVs in high-speed lanes) may permit very close and safe platooning at high speeds. In some of the various embodiments, the high degree of directional selectivity of such targets may minimize potential interference effects otherwise caused by direct illuminations or LIDAR systems of vehicles in opposite or adjacent lanes. In some embodiments, when a system simultaneously detects both a left reflection and a right reflection, the system may associate a resulting calculated distance or position estimate with a high confidence level because light from any source other than a retro-reflection of that system's own scanning illumination (for example, bi-directional retro-reflection with approximate separation angle of 3 alpha as shown in FIG. 15) is unlikely to result in simultaneously received left and right reflections (for example, a spurious reflection of another light source is unlikely to simultaneously arrive in both a left and a right receiver of the system).

Figure 17:
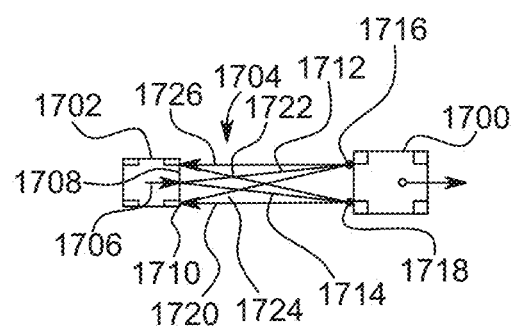
FIG. 17 shows another embodiment of a two-dimensional perspective view of an exemplary leading vehicle that employs exemplary retro-reflective targets that split and reflect an exemplary scanning beam into two separate exemplary beams toward exemplary receivers of an exemplary following vehicle.

FIG. 17 shows an exemplary leading vehicle 1700 and an exemplary following vehicle 1702. For example, one or more of the leading vehicle 1700 or the following vehicle 1702 may be the same as or similar to one or more of those explained above. In one or more of the various embodiments, the following vehicle 1702 may include a transmit and receive ($T_x$-$R_x$) system 1704 that is the same as or similar to one or more of those explained above. In some of the various embodiments, the transmit and receive ($T_x$-$R_x$) system 1704 may include a transmit system 1706. In some embodiments, the transmit and receive ($T_x$-$R_x$) system 1704 may include a first receive system 1708 and a second receive system 1710. For example, one or more of the first receive system 1708 or the second receive system 1710 may be positioned in headlights of the following vehicle 1702.

In one or more of the various embodiments, the transmit system 1706 may emit a scanning beam in a first direction 1712. In some of the various embodiments, the transmit system 1706 may emit the scanning beam in a second direction 1714. In one or more of the various embodiments, the leading vehicle 1700 may include one or more retro-reflectors 1716 and 1718. The one or more retro-reflectors 1716 and 1718 may be the same as or similar to one or more of those explained above. For example, the one or more retro-reflectors 1716 or 1718 may be positioned in one or more taillights of the leading vehicle 1700. In some of the various embodiments, the retro-reflector 1718 may split and reflect the scanning beam at the second position 1714 as first and second reflected beams 1720 and 1722 that the first and second receive systems 1708 and 1710 capture. In some embodiments, the retro-reflector 1718 may split and reflect the scanning beam at the first position 1712 as third and fourth reflected beams 1724 and 1726 that the first and second receive systems 1708 and 1710 capture.

In one or more of the various embodiments, the leading vehicle 1700 and the following vehicle 1702 may convoy and platoon in a precise line at great speed. In some of the various embodiments, the transmit and receive ($T_x$-$R_x$) system 1704 of the following vehicle 1702 may detect and track the retro-reflectors 1716 and 1718 of the leading vehicle 1700. In some embodiments, the transmit and receive ($T_x$-$R_x$) system 1704 may determine an orientation of the leading vehicle 1700. In some embodiments, the transmit and receive ($T_x$-$R_x$) system 1704 may determine an orientation of the following vehicle 1702. In some embodiments, the transmit and receive ($T_x$-$R_x$) system 1704 may determine one or more of the orientation of the leading vehicle 1700 or the orientation of the following vehicle 1702 relative to the other vehicle. For example, the transmit and receive ($T_x$-$R_x$) system 1704 may mark precise locations of a plurality of retro-reflectors of the leading vehicle 1700 (e.g., 3 or 4 targets on the rear of the leading vehicle 1700). The transmit and receive ($T_x$-$R_x$) system 1704 may fully, precisely, and instantaneously estimate distances or positions of these targets in six degrees of freedom (DOF) via one or more of time-of-flight, triangulation, or photogrammetry methods (for example, estimating relative position or velocity between two vehicles). For example, the transmit and receive ($T_x$-$R_x$) system 1704 may locate each of the three or four targets on the rear of the leading vehicle 1700 in six DOF after several repeated measurements (for example, providing information for an automated collision avoidance system).

Figure 18:
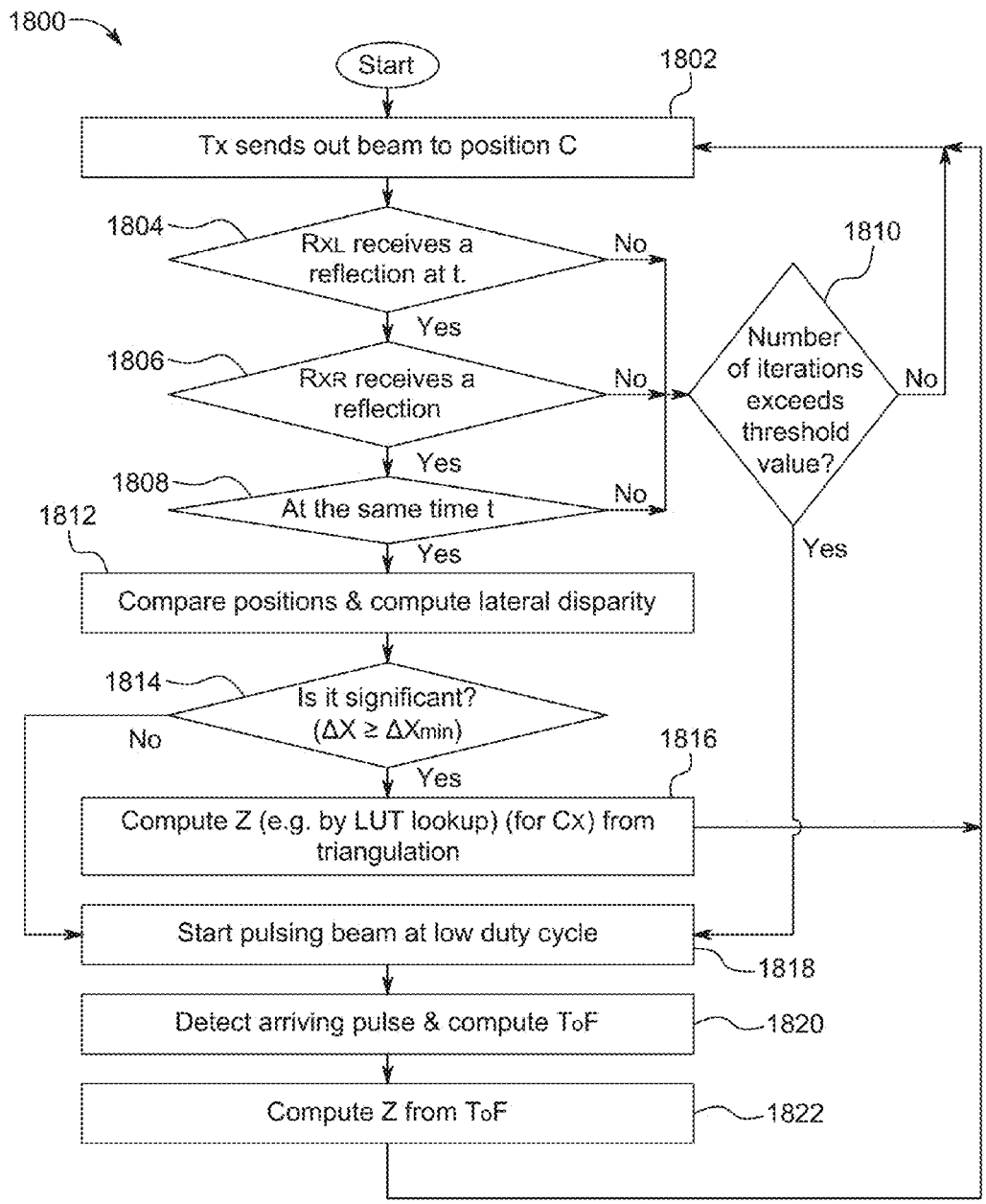
FIG. 18 illustrates a logical flow diagram showing an exemplary process for dynamically switching from an exemplary triangulation mode to an exemplary time of flight (TOF) mode.

FIG. 18 illustrates an exemplary logical flow diagram for exemplary process 1800 for dynamically switching from triangulation to time of flight. In one or more of the various embodiments, process 1800 may combine triangulation and time of flight. A transmit and receive ($T_x$-$R_x$) system may employ process 1800. For example, the transmit and receive ($T_x$-$R_x$) system may be the same as or similar to one or more of those explained above.

After a start block, at block 1802, a transmit system of the transmit and receive ($T_x$-$R_x$) system may send out one or more beams to a surface of an object at position C.

At block 1804, the transmit and receive ($T_x$-$R_x$) system may determine whether a receive system of the transmit and receive ($T_x$-$R_x$) system receives one or more reflections of the one or more beams from the surface at position C (e.g., if position C is within a certain range of the receive system). For example, one or more receivers of the receive system may detect the reflection. In one or more of the various embodiments, the transmit and receive system may determine whether a first receiver of the one or more receivers of the receive system receives one or more reflections of the one or more beams from the surface at position C. In response to a determination that the first receiver fails to receive one or more reflections of the one or more beams from the surface at position C, the transmit and receive ($T_x$-$R_x$) system may proceed to block 1810. In response to a determination that the first receiver receives one or more reflections of the one or more beams from the surface at position C, the transmit and receive ($T_x$-$R_x$) system may record a time t at which the first receiver receives one or more reflections of the one or more beams from the surface at position C and may continue to block 1806.

Additionally, in one or more embodiments, when the distance is too great for a continuous light beam, the one or more light beams may be pulsed as discussed below for block 1816. Furthermore, in one or more embodiments, for determining triangulation, e.g., assisted stereo style, both receivers could simultaneously detect the reflected block beam as discussed below for block 1808.

At block 1806, the transmit and receive ($T_x$-$R_x$) system may determine whether a second receiver of the one or more receivers of the receive system receives one or more reflections of the one or more beams from the surface at position C. In response to a determination that the second receiver fails to receive one or more reflections of the one or more beams from the surface at position C, the transmit and receive ($T_x$-$R_x$) system may proceed to block 1810. In response to a determination that the second receiver receives one or more reflections of the one or more beams from the surface at position C, the transmit and receive ($T_x$-$R_x$) system may record a time t at which the second receiver receives one or more reflections of the one or more beams from the surface at position C and may continue to block 1808. In one or more of the various embodiments, the transmit and receive ($T_x$-$R_x$) system may execute blocks 1804 and 1806 in parallel. For example, the transmit and receive ($T_x$-$R_x$) system may proceed to block 1810 in response to one or more of the first or second receivers failing to receive one or more reflections of the one or more beams from the surface at position C.

At block 1808, the transmit and receive ($T_x$-$R_x$) system may compare the time t recorded for the first receiver to the time t recorded for the second receiver. In one or more of the various embodiments, the transmit and receive ($T_x$-$R_x$) system may compare these times t to determine whether these times t indicate that the first and second receivers received one or more reflections of the same one or more beams. For example, the transmit and receive ($T_x$-$R_x$) system may calculate a difference between the time t recorded for the first receiver and the time t recorded for the second receiver. In some of the various embodiments, the transmit and receive ($T_x$-$R_x$) system may determine whether the difference falls within a predefined threshold. In some embodiments, the transmit and receive ($T_x$-$R_x$) system may select the predefined threshold based on a magnitude of one or more of these times t (e.g., the transmit and receive ($T_x$-$R_x$) system may select a low predefined threshold in response to one or more of these times t having low magnitude or may select a high predefined threshold in response to one or more of these times t having high magnitude). For example, the transmit and receive ($T_x$-$R_x$) system may select the predefined threshold based on contents of a lookup table. In response to the difference falling within the predefined threshold, the transmit and receive ($T_x$-$R_x$) system may determine that these times t indicate that the first and second receivers received one or more reflections of the same one or more beams. In response to a determination that these times t fail to indicate that the first and second receivers received one or more reflections of the same one or more beams, the transmit and receive ($T_x$-$R_x$) system may proceed to block 1810. In response to a determination that these times t indicate that the first and second receivers received one or more reflections of the same one or more beams, the transmit and receive ($T_x$-$R_x$) system may continue to block 1812.

At block 1810, the transmit and receive ($T_x$-$R_x$) system may compare the number of iterations of block 1802 to a threshold value. For example, the transmit and receive ($T_x$-$R_x$) system may increment a counter each time the transmit and receive ($T_x$-$R_x$) system executes block 1802. In one or more of the various embodiments, the transmit and receive ($T_x$-$R_x$) system may reset the number of iterations responsive to execution of one or more of blocks 1812-1822. In response to a determination that the number of iterations of block 1802 exceeds the threshold value, the transmit and receive ($T_x$-$R_x$) system may proceed to block 1818. For example, in the case where position C is too far from the transmit and receive ($T_x$-$R_x$) system for both receivers to simultaneously receive reflections of a continuous beam that may adhere to exposure limits to human eye safety such as, for example, defined by International Electrotechnical Commission (IEC) Document Nos. 60825 or 62471 or American National Standards Institute (ANSI) Z136 (or in the case where there is no object at position C), the transmit and receive ($T_x$-$R_x$) system may pulse a scanning beam at a higher intensity that may also adhere to exposure limits to human eye safety at block 1818. In response to a determination that the number of iterations of block 1802 fails to exceed the threshold value, the transmit and receive ($T_x$-$R_x$) system may return to and repeat block 1802.

At block 1812, the transmit and receive ($T_x$-$R_x$) system may calculate a value of a disparity $\Delta x$ from a stereo pair of pixel positions (e.g., positions of pixels of a stereo pair of receivers of the receive ($R_x$) system as illustrated, for example, in FIG. 13). In some of the various embodiments, the transmit and receive ($T_x$-$R_x$) system may have a large distance measurement error in response to a small disparity when the position C is far from the transmit and receive ($T_x$-$R_x$) system (e.g., as shown in FIG. 13).

At block 1814, the transmit and receive ($T_x$-$R_x$) system may determine whether a value of the disparity $\Delta x$ falls below a certain minimum value. In response to the disparity value $\Delta x$ failing to fall below the certain minimum value, $\Delta x_{min}$, the transmit and receive ($T_x$-$R_x$) system may continue to block 1816. In response to the disparity value $\Delta x$ falling below the certain minimum value, $\Delta x_{min}$, the transmit and receive ($T_x$-$R_x$) system may continue to block 1818.

At block 1816, the transmit and receive ($T_x$-$R_x$) system may attempt triangulation. In one or more of the various embodiments, the transmit and receive ($T_x$-$R_x$) system may compute a range (e.g., Cz) for a determined Cx. In some of the various embodiments, the transmit and receive ($T_x$-$R_x$) system may compute the range by a lookup table. In some embodiments, the transmit and receive ($T_x$-$R_x$) system may calculate the range via triangulation. The transmit and receive ($T_x$-$R_x$) system may provide the range to an external system (e.g., alert system or autopilot system) for further analysis or control over one or more systems (e.g., alert system or autopilot system). In response to one or more of determining or providing the range, the transmit and receive ($T_x$-$R_x$) system may return to block 1802.

At block 1818, the transmit system may pulse (or otherwise modulate) a scanning beam at low duty cycle. In one or more of the various embodiments, the transmit system may emit short sharp intense bursts of photons. Alternatively, the transmit and receive ($T_x$-$R_x$) system may switch to employ another form of ToF ranging. In some embodiments, the transmit system may employ fast amplitude or frequency modulation of light pulses. In one or more of the various embodiments, in response to the transmit and receive ($T_x$-$R_x$) system proceeding to block 1818 from block 1810, the transmit and receive ($T_x$-$R_x$) system may employ different sensors such as, for example, LIDAR or radar to detect the distance to the object at position C. For example, as discussed above, the distance to position C from the transmit and receive ($T_x$-$R_x$) system may be too far from the transmit and receive ($T_x$-$R_x$) system to perform triangulation based on a safe-amplitude continuous beam.

At block 1818, the receive system may detect these bursts. The transmit and receive ($T_x$-$R_x$) system may determine one or more observed time of flights of these bursts.

At block 1820, the transmit and receive ($T_x$-$R_x$) system may calculate a range value Z from the observed time of flight. The transmit and receive ($T_x$-$R_x$) system may provide the range to an external system (e.g., alert system or autopilot system) for further analysis or control over one or more systems (e.g., alert system or autopilot system). In response to one or more of determining or providing the range, the transmit and receive ($T_x$-$R_x$) system may return to block 1802.

In one or more of the various embodiments, the calculated range value Z from the observed time of flight may have a more accurate value as compared to a value that the transmit and receive ($T_x$-$R_x$) system would have calculated via triangulation (e.g., when the disparity value $\Delta x$ falls below the certain minimum value, $\Delta x_{min}$). For example, the transmit and receive ($T_x$-$R_x$) system may include a GHz clock timer. With the GHz clock timer, the transmit and receive ($T_x$-$R_x$) system may measure, for example, a 200 ft range with an accuracy of ½ foot (e.g., 0.25% error range), which is likely to be more accurate than a corresponding value calculated from stereo disparity.

In one or more of the various embodiments, the transmit and receive ($T_x$-$R_x$) system may provide the measured range with accuracy as a one-shot value available immediately (or practically immediately) after receiving a pulse. In some of the various embodiments, more than one receiver may simultaneously (or practically simultaneously) receive the pulse. In some embodiments, the transmit and receive ($T_x$-$R_x$) system may compare signals and times of flights of the multiple receivers for greater accuracy. In some of the various embodiments, the receivers may receive a modulated signal with slightly offset phase delays. In this case, the transmit and receive ($T_x$-$R_x$) system may use the phase difference to add precision to the ranging calculation.

Unlike calculation error of the triangulation measurements by the transmit and receive ($T_x$-$R_x$) system, calculation error of the time-of-flight measurements by the transmit and receive ($T_x$-$R_x$) system depends on having a sufficiently large reflected signal within a measurement time interval (e.g., one nanosecond). In one or more of the various embodiments, the transmit and receive ($T_x$-$R_x$) system may prevent the calculation error of the time-of-flight measurements from depending on resolution of a sensor or on a baseline separation of the stereo receivers. In some of the various embodiments, the transmit and receive ($T_x$-$R_x$) system may maintain XY resolution in time-of-flight mode. In some embodiments, XY resolution of the transmit and receive ($T_x$-$R_x$) system may be determined by one or more of the receivers, a pointing accuracy of a scan system of the transmit system, or beam tip quality.

Further, to precisely align an image of a laser illuminated spot along a row in a sensor at all distances (ranges), it may be necessary for a scan beam to have a planar fast scan trajectory (e.g., the scan beam rotates in only one direction at a time). A gimbaled two-dimensional MEMS mirror (e.g., a MEMS mirror produced by Microvision™) angled at significant elevations above or below a horizon ($\epsilon \gg 0$ degrees or $\epsilon \ll 0$ degrees) may trace a curved trajectory in space (e.g., as a projection the MEMS mirror may manifest a "pin-cushion" distortion). This type of scan distortion may be strong at significant elevations above or below the horizon (e.g., when $\epsilon \neq 0$, slow axis rotation—the gimbal frame—rotation may cause fast axis of rotation—inner axis on the gimbal—to be tilted significantly out of plane).

Second fast axis of rotation may be non-orthogonal to an incoming collimated laser projection beam, introducing an additional undesirable compound angle component. Optical rectification by a receiver of such a curved trajectory (e.g., making the curved trajectory appear flat) may be unavailable in a triangulation system because a perspective of the receiver is at a different angle from a transmitter in the triangulation system. Therefore, precise alignment (e.g., precise line-by-line correspondence) may be unavailable for fast resonant scanning at top and bottom areas of a receiver sensor in a conventional scanning system. In contrast, in a slow system where both axes of scanning can be controlled for every scan position, this pincushion distortion can be compensated for by adjusting an angle during the scan. This may, however, severely limit scanning frequency to a maximum speed that the slower axis adjustment can achieve. This may be difficult or impossible to realize in fast resonant scanning systems. Furthermore, this may require significantly more power to drive a mirror simultaneously in both directions in a forced non-resonant motion. In contrast, in some of the various embodiments, the transmit and receive ($T_x$-$R_x$) system 402 may prevent pin-cushion and barrel distortion that, for example, a MEMS scanning system of the transmit system 404 may otherwise induce.

Figure 19:
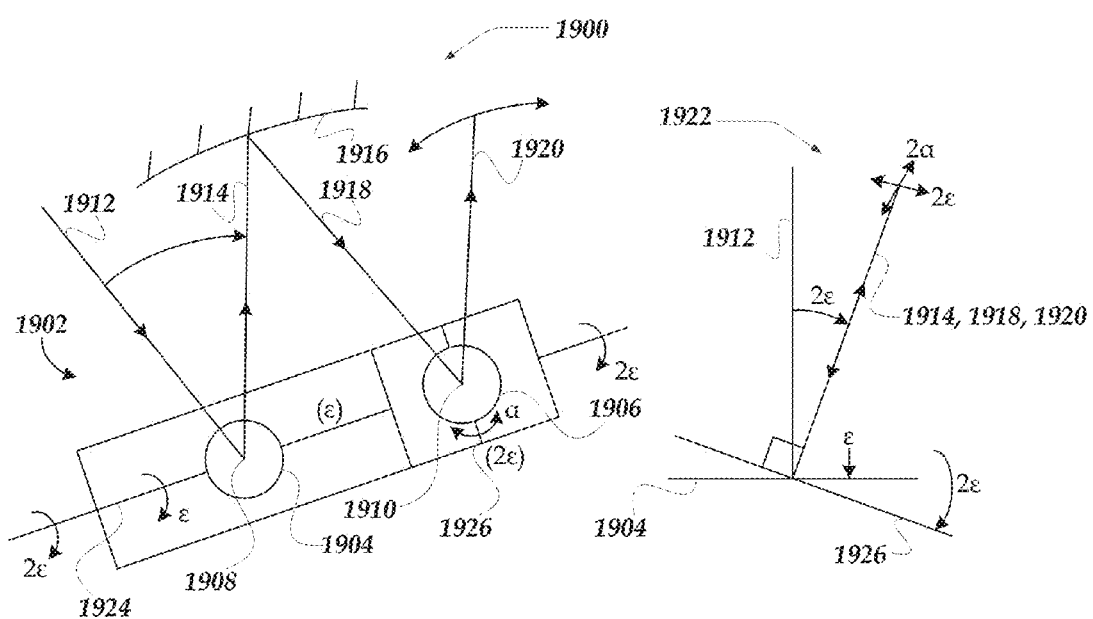
FIG. 19 illustrates an embodiment of a three-dimensional perspective view of an exemplary scan mirror that prevents an exemplary pincushion distortion.

FIG. 19 shows an exemplary beam scanning mechanism 1900. For example, the beam scanning mechanism 1900 may be the same as or similar to one or more of those explained above. The beam scanning mechanism 1900 may include a dual MEMS structure 1902 that combines a first one-dimensional gimbaled scan mirror 1904 and a second two-dimensional gimbaled scan mirror 1906. In one or more of the various embodiments, a common outer frame may hold the first and second mirrors 1904 and 1906 at two respective foci 1908 and 1910. In some of the various embodiments, the common outer frame may be rotated by 2ϵ.

In some of the various embodiments, the first mirror 1904 may mechanically rotate in a first direction by ϵ and optically rotate an incoming light 1912 (e.g., from a light source) in the first direction (e.g., as shown by a deflection (2ϵ)) as a first reflected light 1914 toward a relay surface 1916 (e.g., an elliptical relay surface). This optical rotation of the incoming light 1912 may be referred to as "prerotation" of the incoming light 1912. The relay surface 1916 may reflect the first reflected light 1914 as second reflected light 1918 toward the second mirror 1906. The second mirror 1906 may reflect the second reflected light 1918 as a scanning beam 1920 that the beam scanning mechanism 1900 may scan over a field of view.

In one or more of the various embodiments, as shown in the side view 1922 of the beam scanning mechanism 1900 taken along a slow scanning axis 1924 (e.g., axis of angle epsilon ϵ, elevation, or Y), the first reflected light 1914, second reflected light 1918, and scanning beam 1920 may be, after the prerotation of 2ϵ, in a plane that is orthogonal to a fast scan axis 1926 (e.g., axis of angle alpha α, horizontal, or X) regardless of rotation about the slow axis 1924. For example, after the reflection on the relay surface 1916, the second reflected light 1918 may travel along a path that is orthogonal to the fast scanning axis 1926. In some of the various embodiments, this orthogonality may eliminate any compound angle that may otherwise cause a "pincushion" effect as the second mirror 1906 rotates about the slow scan axis 1924. In some of the various embodiments, the first mirror 1904 may have a deflection of ½ of deflection of the second mirror 1906.

In one or more of the various embodiments, a receive system may include other relay mechanisms and/or other mirror configurations while achieving the same principle, ensuring that the direction of the second reflected beam 1906 remains orthogonal to the fast scan axis 1926 of the second mirror 1906 regardless of the slow axis rotation. In some of the various embodiments, the beam scanning mechanism 1900 may achieve a "flat" fast scan line. For example, the beam scanning mechanism 1900 may provide a perfect or nearly perfect epipolar alignment between various scan lines in frame and various rows in a sensor. In one or more of the various embodiments, the beam scanning mechanism 1900 may compensate for distortions that sensor optics introduce (e.g., pin cushion and/or barrel). Such advantages may come at a cost of complicating the beam scanning mechanism 1900.

Figure 20:
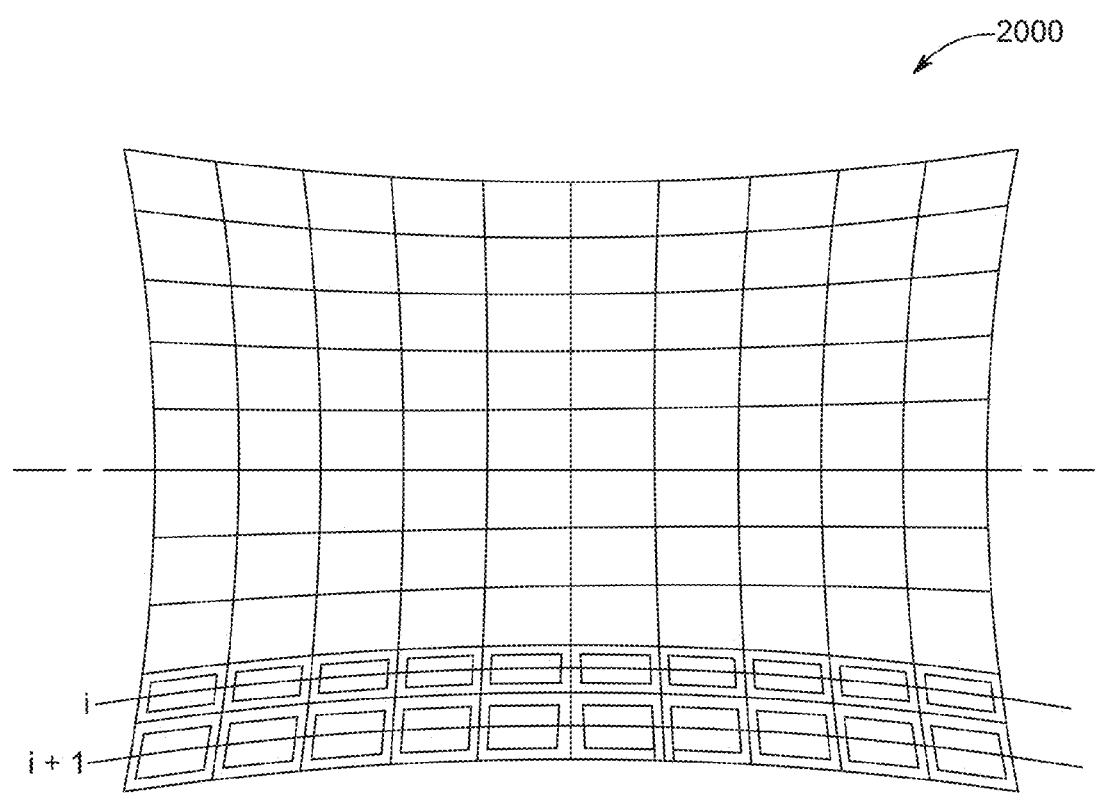
FIG. 20 shows an embodiment of an exemplary sensor grid that has exemplary pixel and row geometries that match an exemplary fast line scan trajectories to prevent an exemplary optical distortion.

FIG. 20 shows an exemplary sensor grid 2000. In one or more of the various embodiments, a receive system may include the sensor grid 2000 as a component of one or more sensors. For example, the receive system may be the same as or similar to one or more of those explained above. In some of the various embodiments, the sensor grid 2000 may adjust for optical distortions by one or more lenses. In one or more of the various embodiments, the sensor grid 2000 may adjust curve of rows in a sensor plane and, in some embodiments, optionally one or more of size, shape, or aspect ratios of one or more pixels to compensate for optical distortions.

In one or more of the various embodiments, the sensor grid 2000 may have one or more of pixel or row geometries that match fast line scan trajectories. For example, the one or more lenses may be part of a fixed lens system. In one or more of the various embodiments, optics of the one or more lenses may cause pincushion distortion at a sensor plane (e.g., magnification of the one or more lenses may be proportional to a radial distance from an optical center), thereby making corners appear "stretched away". In some of the various embodiments, the sensor grid 2000 may adjust a pixel grid to match the distortion. In some embodiments, the sensor grid 2000 may adjust the pixel grid to match rows in the sensor with straight scan lines to exploit one or more of the epipolar arrangements described above. In one or more of the various embodiments, line i and line i+1 may be curved. In some of the various embodiments, the sensor grid 2000 may adjust pixel geometries to match the distortion. In some embodiments, the sensor grid 2000 may adjust the pixel geometries to match the straight scan lines to exploit the one or more of the epipolar arrangements described above. In one or more of the various embodiments, one or more of pixel orientations, sizes, or shapes may change along the scan line direction.

Figure 21:
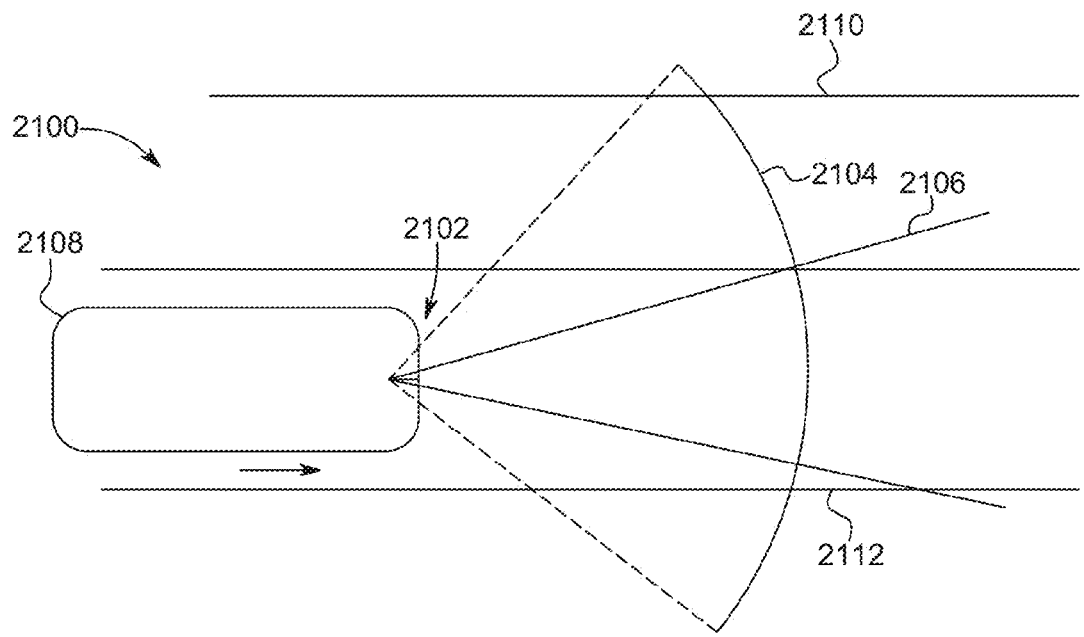
FIG. 21 illustrates an embodiment of a two-dimensional perspective view of an exemplary scanning system with an exemplary multi-focus camera array that provides exemplary overlapping fields of view.

FIG. 21 illustrates an exemplary scanning system 2100. In one or more of the various embodiments, the scanning system 2100 may include a transmit and receive ($T_x$-$R_x$) system 2102. For example, the scanning system 2100 may be the same as or similar to one or more of those explained above (e.g., the transmit and receive ($T_x$-$R_x$) system 2102 may be the same as or similar to one or more of those explained above). In one or more of the various embodiments, the scanning system 2100 may include a multi-focus camera array. In some of the various embodiments, the multi-focus camera array may provide overlapping fields of view. For example, the scanning system 2100 may employ a wide field of view 2104 or a narrow field of view 2106. In one or more of the various embodiments, the scanning system 2100 may be part of or mounted to a vehicle 2108. The wide field of view 2104 may cover one or more portions of a first lane 2110 and a second lane 2112. The narrow field of view 2106 may mainly cover one or more portions of the second lane 2112.

In one or more of the various embodiments, the multi-focus camera array may include a sensor that has a given resolution (e.g., 10 Mpixels, 5000 columns with 2000 rows). In some of the various embodiments, the multi-focus camera array may be arranged to selectively support the wide field of view 2104 or the narrow field of view 2106. For example, the multi-focus camera may support a wide field of view 2104 (e.g., a field of view that has a horizontal span of 83 degrees) distributed over a given number of columns (e.g., 5000 columns). While supporting the wide field of view 2104, the multi-focus camera may have a given triangulation capability (e.g., 60 columns per degree, which approximates HD or 20/20 human vision). In some of the various embodiments, if the same sensor is combined with a longer telephoto lens system, it may span fewer degrees (e.g., 20 degrees), yielding a higher resolution (e.g., 4× higher resolution of 250 pixels per degree, which approximates 4×20/20 human vision). In some embodiments, with enough light, the sensor may resolve about 4× more detail on critical X and Z dimensions. In one or more of the various embodiments, for a given sensor size (e.g., pixels and resolution) various levels of light gathering can be accomplished.

Figure 22:
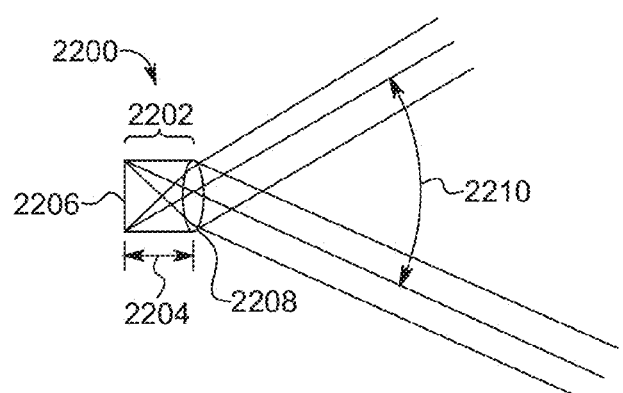
FIG. 22 shows an embodiment of a two-dimensional perspective view of an exemplary scanning system with an exemplary multi-focus camera array employing an exemplary wide angle field of view.

FIG. 22 shows an exemplary scanning system 2200 with an exemplary multi-focus camera array 2202 that has an exemplary selected distance 2204 between an exemplary sensor 2206 and an exemplary aperture 2208. For example, the scanning system 2200 may be the same as or similar to one or more of those explained above. The multi-focus camera array 2202 may selectively employ the selected distance 2204 to provide a wide angle field of view 2210.

Figure 23:
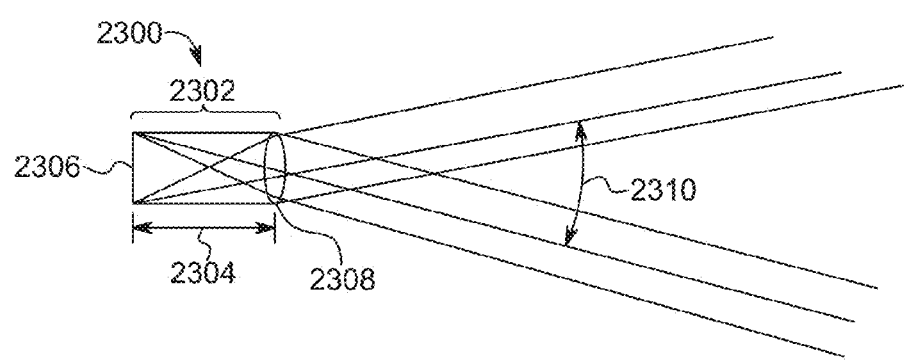
FIG. 23 illustrates an embodiment of a two-dimensional perspective view of an exemplary scanning system with an exemplary multi-focus camera array employing an exemplary narrow angle field of view.

FIG. 23 illustrates an exemplary scanning system 2300 with an exemplary multi-focus camera array 2302 that has an exemplary selected distance 2304 between an exemplary sensor 2306 and an exemplary aperture 2308. For example, the scanning system 2300 may be the same as or similar to one or more of those explained above. The multi-focus camera array 2302 may selectively employ the selected distance 2304 to provide a narrow angle field of view 2310. Contrasting FIGS. 22 and 23 demonstrates tradeoffs between a wide angle field of view and a narrow angle field of view. In one or more of the various embodiments, one or more of the above explained receive systems may include a telescopic optical system that may have a larger aperture (e.g., lens diameter) to gather more light and extend the system's range.

Returning to FIG. 4, the transmit and receive ($T_x$-$R_x$) system 402 may provide robust high-speed 4K resolution three-dimensional video motion capture. With a 1 GHz clock, for example, the receive system 412 may record up to 1 billion distinct pixel pair disparities. In one or more of the various embodiments, the receive system 412 may observe up to 1 billion voxels per second. For example, the receive system 412 may successively observe 10,000 voxels per line and up to 100,000 lines/second. In some of the various embodiments, the receive system 412 may capture with 4K resolution, three-dimensional video at up to 50 fps. For example, the receive system 412 may read a fine-grained 4K resolution three-dimensional surface contour without motion artifacts, even in strong ambient light conditions.

In one or more of the various embodiments, the receive system 412 may implement one or more of higher frame speeds or higher line scan resolution. In some of the various embodiments, the receive system 412 may avoid speeding up the scan mechanism. For example, the receive system 412 may implement a 50 kHz mirror to record 100,000 lines per second with a single flying spot or 2,000 lines at up to 50 FPS. In some of the various embodiments, the transmit and receive ($T_x$-$R_x$) system 402 may employ a multi-beam scan to further increase both image projection and object fine detail detection. In one or more of the various embodiments, the transmit and receive ($T_x$-$R_x$) system 402 may employ a dual scanning system that can simultaneously scan two parallel lines in the receive system 412 ("dual twin-matched epipolar"), which may result in double the resolution.

In one or more of the various embodiments, the transmit and receive ($T_x$-$R_x$) system 402 may provide powerful three-dimensional motion capture. In some of the various embodiments, the receive system 412 may instantaneously (or practically instantaneously) find a voxel range via two receivers of the receive system 412 (e.g., offset in an epipolar stereo configuration as explained above). For example, the receive system 412 may employ a hardware or software Look Up Table (LUT) to determine the Z distance. In some of the various embodiments, separate third sensor determines the vertical dimension (e.g., as explained above). In some of the various embodiments, one of the epipolar receivers may provide a two-dimensional instantaneous read out. For example, the receive system 412 may determine the vertical dimension via two receivers (e.g., a one-dimensional receiver and a two-dimensional receiver).

In some of the various embodiments, the transmit system 404 may lack one or more of a position sensor or a feedback loop to track instantaneous scan angles of the transmit system 404. The transmit system 404 may include an ultra-fast open-loop MEMS laser scanning system (e.g., two fast resonant one-dimensional scanning mirrors configured in a relay optics arrangement, such as, for example, the BTendo dual-mirror system acquired by STmicroelectronics™ or Lissajous dual mirror scanning systems developed by Fraunhofer™)

In one or more of the various embodiments, receive system 412 may provide ultra-wide fast scanning. For example, the receive system 412 may include one or more "Lamb Drive" piezo-electric driven resonant steel mirror systems that have been demonstrated recently in research laboratories in Tsukuba Japan. In some of the various embodiments, the receive system 412 can scan wide angles at up to 60 kHz (120,000 lines per second). In some embodiments, the transmit and receive ($T_x$-$R_x$) system 402 may provide a dual stereo or triple sensor arrangement to provide a wide range of such novel scanning options. In one or more of the various embodiments, the receive system 412 may record and track various points, flying spots, or scan lines with pin point accuracy in three dimensions by an N (where N>=2) camera system. In some of the various embodiments, the receive system 412 may do so regardless of quality, trajectory, or periodicity of optics of the transmit system 412. For example, the transmit and receive ($T_x$-$R_x$) system 402 may provide pseudo-random three-dimensional surface scanning, for example, as described U.S. Pat. No. 8,430,512 assigned to PhotonJet Scanner.

In one or more of the various embodiments, the receive system 412 may determine and provide each voxel position as soon as one or more light pulses are detected by a pair of pixels (e.g., one in a left receiver and one in a right receiver). In some of the various embodiments, the transmit and receive ($T_x$-$R_x$) system 402 may optionally determine and provide each voxel position in response to the transmit and receive ($T_x$-$R_x$) system 402 pairing up the one or more detected light pulses with a corresponding elevation value (e.g., one or more of a separate receiver, a two-dimensional left receiver, a two-dimensional right receiver, or the transmit system 404 can instantly compute a Z value).

Part of a light field of a reflected beam may reach each of three sensors simultaneously (or practically simultaneously). Three resulting signals may be naturally synchronized. In one or more of the various embodiments, the receive system 412 may unambiguously correlate (e.g., matched up) these signals. When a stereo pair of pulses is detected, the receive system 412 provides an instantaneous (or practically instantaneous) triangulation, nearly instantaneously yielding corresponding X & Z values of a voxel. An additional elevation sensor may provide the elevation (e.g., Y value), for example, as described above. In some of the various embodiments, the receive system 412 may determine the elevation by an additional read out in one of the dual receivers. In one or more of the various embodiments, the transmit and receive ($T_x$-$R_x$) system 402 may maintain the sequential voxel detection speed (e.g., up to one voxel per nanosecond) even at longer distances (e.g., regardless of observation lag). In some of the various embodiments, the receive system 412 may eliminate correlation of an outgoing transmission angle with an incoming reception angle. In some embodiments, the receive system 412 may eliminate ambiguity caused by an initially unknowable time of flight (e.g., unknown elapsed time between outgoing and receiving). For farther objects, in response to the baseline offset becoming too small of a fraction of a range, the transmit and receive ($T_x$-$R_x$) system 402 may implement time of flight (e.g., by pulsing or modulating a laser source in a known code sequence, such as, for example, AM or FM Phase modulation, grey coding, or tapping beats). FIG. 18 illustrates an example procedure (e.g., a logical flow) of how the transmit and receive ($T_x$-$R_x$) system 402 may determine when to range with time of flight (e.g., for far field) and when to use triangulation (e.g., for mid field or near field).

In one or more of the various embodiments, the transmit and receive ($T_x$-$R_x$) system 402 may provide high-speed three-dimensional motion capture. In some of the various embodiments, the transmit and receive ($T_x$-$R_x$) system 402 may produce accurate and fine-grained, high-speed three-dimensional motion maps of scanned objects. In some embodiments, the transmit and receive ($T_x$-$R_x$) system 402 may optionally provide one or more of the motion capture or the motion maps in full color. The transmit and receive ($T_x$-$R_x$) system 402 may include various robust high-speed color 3D motion capture systems (e.g., as explained above) which produce accurate and fine-grained high-speed 3D motion maps of scanned objects—optionally in full color.

In one or more of the various embodiments, the receive system 412 may include one or more cameras for fast asynchronous triangulation. Low cost so-called "rolling shutter" mobile cameras may have small (e.g., 1 to 1.5 micron) pixels in 5 to 10 MP arrays. Each pixel (or single-photon avalanche diode (SPAD)) can serve a same column detection circuit. Rows may be selected, actively shuttered in a manner that may be analogous to CMOS camera pixels. In one or more of the various embodiments, however, fast and binary threshold detection of a flying spot may have a high priority. In some of the various embodiments, the transmit and receive ($T_x$-$R_x$) system 402 may determine a direction substantially orthogonal to a fast axis scan direction from feedback of a slow angle of one or more scanners (e.g., the vertical or elevation angle $\epsilon$). In some embodiments, the transmit and receive ($T_x$-$R_x$) system 402 may utilize these features to determine where a pixel has landed. For example, the transmit and receive ($T_x$-$R_x$) system 402 may utilize these features to provide instantaneous (or practically instantaneous) (optionally asynchronous) column detection.

In one or more of the various embodiments, the receive system 412 may include a 4-way receiver sensor system. In some of the various embodiments, the 4-way receiver sensor system may include four apertures. In some embodiments, the apertures may be arranged in a square. In one or more of the various embodiments, the quad receiver sensor system may have dual orthogonal disparity.

In one or more of the various embodiments, the receive system 412 may capture and image the spot four times (e.g., each time with row and column detection). In some of the various embodiments, at each spot recording instance, the receive system 412 may record four azimuth X values and four epsilon Y values (e.g., a total of 8 values, thereby capturing four times more light). In some embodiments, the receive system 412 may optionally apply one or more of R, G, B, or NIR filters. For example, each of the four quadrants may capture NIR (e.g., up to eight instantaneous (or practically instantaneous) readouts) for 4× signal strength).

In one or more of the various embodiments, the receive system 412 may determine depth estimation by scanned laser triangulation. In some of the various embodiments, the receive system 412 may determine the depth information based at least in part on the following formula: $Z=hD/(Q-h \tan \theta)$. The variables of this formula may represent those illustrated in the figures.

For example, as illustrated throughout the figures and as discussed above, Z may represent a distance to a point where a beam was reflected (e.g., an apex C in a triangle ABC, where Z may be a distance that is orthogonal to the baseline (e.g., Z represents a height of the triangle measure as measured from C to base AB along a path that is orthogonal to base AB). In some of the various embodiments, h may represent an orthogonal distance from a center of an aperture (e.g., a lens) to a sensor plain. For example, as discussed above and as illustrated in FIGS. 4, 5, and 30, h may represent a focal length f of a lens system. In some of the various embodiments, the lens system may focus far away light to a small pixel-sized spot on the sensor surface 414. As illustrated throughout the figures and as discussed above, D may represent a baseline offset distance or baseline distance. For example, in an assisted stereo, the baseline is a distance between two receivers of a stereo pair (e.g., a left receiver and a right receiver). As discussed above and as illustrated in FIGS. 4 and 5, Q may represent a lateral (e.g., azimuthal) disparity as measured by, for example, a distance along the sensor plane from an optical center to where an image of a scanning spot is projected onto the sensor 414. For example, Q may be measured along a fast scanning direction (e.g., in some of the various embodiments, the receive system 412 may implement an ideal epipolar arrangement in which directions of scanning rows in the sensor 414 and the baseline are all parallel). As illustrated in FIG. 4, $\theta$ may represent an angle from which an incoming ray deviates from a central optical axis of a receiver. For example, $\theta$ may be a complement of a receiver angle $\beta$ (e.g., $\beta+\theta=90$ degrees). In one or more of the various embodiments, the transmit and receive ($T_x$-$R_x$) system 402 may achieve greater precision in estimating Z by more finely measuring each of these variables.

In one or more of the various embodiments, the transmit and receive ($T_x$-$R_x$) system 402 may have a fixed baseline distance D. For example, the baseline distance D can be established with great precision at manufacturing, through some kind of calibration. In some of the various embodiments, where a large baseline (e.g., 1.5 meters) is feasible and desirable (e.g., in an automotive set up), there might be some recalibration to adjust for mechanical movements or misalignments that occur naturally.

In one or more of the various embodiments, the focal length h may be precisely measurable (e.g., in microns) after the lens and sensor 414 have been assembled.

In one or more of the various embodiments, the incoming ray deviation angle Θ may be determined by measurement of a relative spot location in the sensor 414. In some of the various embodiments, the receive system 412 may approximate the incoming ray deviation angle Θ based on pixel location nearest to a maximum illumination centroid of a spot (e.g., the location of optimal brightness) in the sensor. In some embodiments, the transmit and receive ($T_x$-$R_x$) system 402 may provide three-dimensional measurements regardless of whether the spot is sharply focused. For example, the transmit and receive ($T_x$-$R_x$) system 402 may provide three-dimensional measurements based on a clear center of brightness for the spot.

In one or more of the various embodiments, the receive system 412 may have precise (e.g., to the nanometer) and invariant pixel locations. In some of the various embodiments, the receive system 412 may have pixel locations that may be fixed by lithography and fixedness of silicon. In some embodiments, sizing and spacing of the pixels may define a quantization limit of this discrete location measurement.

In one or more of the various embodiments, the receive system 412 may benefit from a smaller ratio of pixel size to sensor size. For example, the receive system 412 may benefit from an increase in pixel quantity. Smaller pixels, however, may receive less light. Small sensors (e.g., as may result from the smaller pixels) may be much less expensive in practice. These small sensors, however, may limit aperture size and field of view. To gather enough light for sufficiently long range triangulation and ranging, larger apertures may be desirable, but their optics may provide more support for narrower fields of view (e.g., governed by the law of etendue, by geometric optics, and practical f-numbers of lenses).

In one or more of the various embodiments, the transmit and receive ($T_x$-$R_x$) system 402 may employ one or more methods to achieve a certain degree of "hyper resolution." For example, the transmit and receive ($T_x$-$R_x$) system 402 may very precisely determine an exact (or practically exact) arrival time of a sweeping beam, sweeping with a known velocity on a surface (e.g., contiguous surface trajectory velocity).

Large apertures may result in large sensors with larger pixels that may be expensive. For example, a modern high-resolution camera such as the 42 Megapixel SLR from Sony™ may accommodate ultra low-light capture with large apertures but may employ 3×3 Micron pixels that may involve thousands of dollars of optics and sensors. CMOS sensor technology has made great progress as evidenced by extremely powerful optics being available at consumer prices.

In one or more of the various embodiments, the transmit and receive ($T_x$-$R_x$) system 402 may employ latest-generation CMOS sensors in novel ways to create machine vision systems of utmost speed, resolution, and sensitivity. For example, the transmit and receive ($T_x$-$R_x$) system 402 may provide three-dimensional metrology and ultra-fast three-dimensional scanning systems (e.g., LIDAR Triangulation and Hybrid LIDAR-Triangulation).

In one or more of the various embodiments, the transmit and receive ($T_x$-$R_x$) system 402 may leverage low-cost mobile camera pixel technology with 1.5 or 1 micron pixels to provide a camera sensor that may be 10 to 100 times smaller and cheaper. In some of the various embodiments, the transmit and receive ($T_x$-$R_x$) system 402 may position fine pitch pixels in strategic locations. In some embodiments, the transmit and receive ($T_x$-$R_x$) system 402 may control a field of view of individual sensors to provide big apertures. In one or more of the various embodiments, the transmit and receive ($T_x$-$R_x$) system 402 may use a plurality of cheap sensors and mass producible optics while improving field of view, focal length, and depth of field. For example, rather than using one large collection type optics that may include a sensor costing well over $1,000 (e.g., DSLR Alpha a7R II from Sony™ with 42.4 M Pixel sensor), the transmit and receive ($T_x$-$R_x$) system 402 may use an array of low cost mobile phone sensors (e.g., $5 for a diffraction limited 10M pixel camera) or mobile phone sensors. In some of the various embodiments, the transmit and receive ($T_x$-$R_x$) system 402 may include an array of such sensors, wherein the sensors have slightly modified specifications as explained herein. In one or more of the various embodiments, the transmit and receive ($T_x$-$R_x$) system 402 may detect 100 Mega pixel composite images for less than $100.

In one or more of the various embodiments, the transmit and receive ($T_x$-$R_x$) system 402 may include in stereo or N camera multi-view arrangements. In some of the various embodiments, the transmit and receive ($T_x$-$R_x$) system 402 may utilize overlapping regions for extra three-dimensional (e.g., Z-range) resolution. In some embodiments, the transmit and receive ($T_x$-$R_x$) system 402 may fiducially anchor both observation (e.g., each three-dimensional voxel on an object's surface) and observer (e.g., camera). For example, the transmit and receive ($T_x$-$R_x$) system 402 may utilize each pixel in the field of view, when illuminated by pinprick flash scanning lasers, as "absolute ground truth." In one or more of the various embodiments, the transmit and receive ($T_x$-$R_x$) system 402 may anchor one or more of the observation or the observer in three-dimensional space and anchoring the one or more of the observation or the observer with nanosecond-precision in time.

Illustrated Circuitry of the Sensing Systems

In one or more of the various embodiments, each pixel of the sensor 414 of the receive system 412 may include one or more photo diodes (PD). For example, each pixel may include one or more pinned photo diodes (PDD). In some of the various embodiments, the receive system 412 may include one or more transfer gate transistors (TG) (e.g., the receive system 412 may include a transfer gate transistor for each photo diode). For example, a photo diode in a pixel may selectively be enabled in response to a transfer signal that a transfer gate transistor associated with the photo diode receives from a transfer gate enable line. In some embodiments, a transfer gate transistor may provide a high (e.g., enabled) transfer signal to a row of pixels. Photodiodes of the row of pixels may be configured and arranged to, in response to the high (e.g., enabled) transfer signal, become set to "spew" photo-electrons (e.g., set to source an instantaneous spike of photocurrent) that trigger an op-amp (e.g., a specially configured transistor circuit) to "jolt" a column sense line that belongs to the particular pixels of the photodiodes.

For example, one or more of the op-amp logic or the pixel-level transistor logic may have a threshold function. In some of the various embodiments, the logic may prevent the jolt from occurring unless the photo-current exceeds an instantaneous peak value. For example, a weak pull-up provided by a weakly pulled up reset transistor RST may keep the output of the transfer gate transistor (e.g., photo-diode output) high in the absence of photo current until a certain peak instantaneous photo-electron supply is strong enough (and a pull up resistor value is large/weak enough) to lower a voltage provided to the op-amp for a time that is long enough to raise the jolt to be triggered (e.g., the op-amp switches momentarily to connect $V_{DD}$ to a column trigger detector, such as, for example, a column sensing line). An example of such a circuit function is explained in further detail below.

In one or more of the various embodiments, the sensor 414 may employ an instantaneous asynchronous two-dimensional row and column function. In some of the various embodiments, the "jolt" signal may be provided to both row and column sense lines corresponding to the pixel. For example, the receive system 412 may include fast detection logic at each of the columns and rows (e.g., the X value (such as, for example, azimuth, beta) and Y value (such as, for example, epsilon)). In some embodiments, the receive system 412 may determine each voxel at each nanosecond with a minimal latency at a rate up to 1 billion XY pairs per second.

In one or more of the various embodiments, the receive system 412 may include one or more dual-function sensors that provide both asynchronous peak flow detection and row time exposure integration camera function. In some of the various embodiments, the dual-function sensor may provide instantaneous position via lighting detection and/or logarithmic bypass with a longer integration function provided by a four-transistor pinned photo-diode pixel. For example, the op-amp may temporarily deflect (e.g., re-route) a rush of photo-electrons caused by an intense and instantaneous (or practically instantaneous) (e.g., temporally and spatially sharp) spot transition, and the receive system 412 may preserve the four-transistor pinned photo-diode to continue flowing sub-threshold photo current into a floating gate to maintain synchronous rolling or global shutter camera function.

In one or more of the various embodiments, the receive system 412 may optionally include NIR peak detection circuits and sense lines buried deep below "shallower" RGB camera circuits (e.g., using lower sub surface metal lines, or, in case of back illumination, coarser surface structure).

In one or more of the various embodiments, the receive system 412 may provide pixel specific output proportional to a natural logarithm of an instantaneous photo-current produced by a pixel in response to detecting a laser light reflected from a three-dimensional object. For example, a photodiode of the receive system 412 may generate photo-current that may be represented by the following relationship: $I_{ph} \approx e^{V_{ph}/V_T}$ where "$I_{ph}$" represents photo current of the photodiode, "$V_{ph}$" represents voltage across the photodiode, and "$V_T$" represents thermal voltage. In some of the various embodiments, a pixel circuit of the receive system 412 may provide an output that drives a column sense line. For example, the output of the pixel circuit may be proportional to a natural logarithm of an instantaneous photodiode current $I_{ph}$.

In one or more of the various embodiments, the receive system 412 may implement the 4-way receiver sensor system in multiple roles. For example, the receive system 412 may implement the 4-way receiver sensor system in a traditional four-transistor PPD pixel role, integrating photo current over a longer exposure period. In some of the various embodiments, the receive system 412 may implement the 4-way receiver sensor system in an alternative mode of operation to immediately relay a photon pulse with minimal delay (e.g., nanoseconds) towards an adjacent column sense line for a given pixel.

Figure 24:
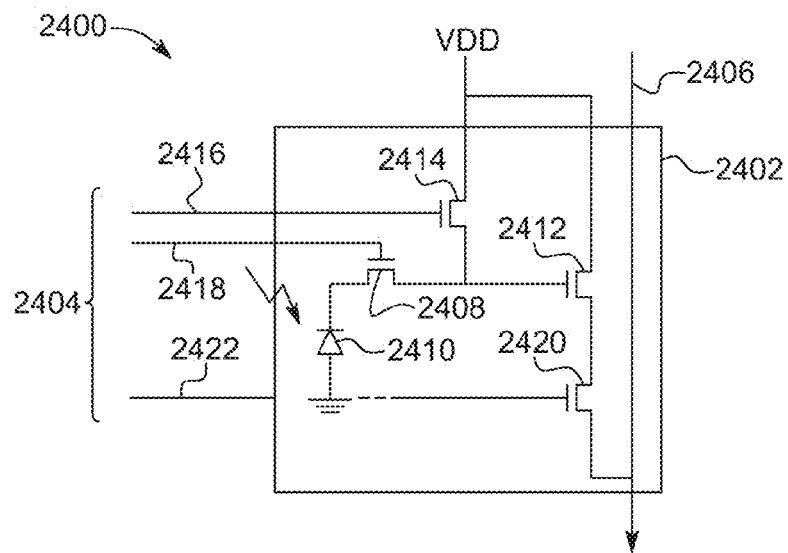
FIG. 24 illustrates an embodiment of an exemplary four-transistor photodiode pixel.

FIG. 24 illustrates an exemplary sensor portion 2400 that includes an exemplary four-transistor pinned photodiode (PDD) pixel 2402. The sensor portion 2400 may be that of a sensor of a receive system. For example, the receiver may be the same as or similar to one or more of those explained above. In one or more of the various embodiments, the pixel 2402 may employ logic 2404 that provides one or more of row-select or row-control. In some of the various embodiments, the pixel 2402 may include a column sense line 2406 over which the pixel 2402 outputs data (e.g., to a column decoder or analog to digital converter).

In one or more of the various embodiments, the pixel 2402 may include a transfer gate 2408. In some embodiments, the transfer gate 2408 may connect a pinned photodiode 2410 of the pixel 2402 to a floating diffusion well 2412 of the pixel 2402. In some of the various embodiments, the PPD 2410 may provide a charge to the transfer gate 2408 in response to capturing photons. In some of the embodiments, the transfer gate 2408 may provide the charge to the floating diffusion well 2412. In one or more of the various embodiments, the floating diffusion well 2412 may hold the charge. In some of the various embodiments, a voltage may fall as photoelectrons arrive through the transfer gate 2408. For example, the voltage may fall inversely proportionally with respect to previously received photon flux.

In one or more of the various embodiments, a pixel row that contains or bears the pixel 2402 may include a reset circuit 2414. In some of the various embodiments, the reset circuit 2414 may reset the floating diffusion well 2412 to $V_{DD}$ in response to one or more pulses that the reset circuit 2414 receives over a reset line 2416. For example, in response to the one or more pulses, the reset circuit 2414 may reset a whole row of pixels before exposure. In one or more of the various embodiments, the transfer gate 2408 may receive one or more signals over a transfer gate enable line 2418. In some of the various embodiments, pixel integration may be enabled in response to the transfer gate 2408 receiving the one or more signals over the transfer gate enable line 2418.

In one or more of the various embodiments, the pixel 2402 may include a read enable circuit 2420. In some of the various embodiments, the read enable circuit 2420 may enable a pixel read (e.g., a reduced voltage after exposure) over the column sense line 2406 for the pixel 2402. In one or more of the various embodiments, the read enable circuit 2420 may receive one or more signals over a read enable line 2422. For example, the read enable circuit 2420 may enable the pixel read in response to receiving the one or more signals over the read enable line 2422 (e.g., connecting to the column decoder or analog to digital converter). In some embodiments, the pixel row that contains the pixel 2402 may include the read enable circuit 2420. In some of the various embodiments, the read enable circuit 2420 may provide the pixel read enable for each pixel of the pixel row in response to receiving the one or more signals over the read enable line 2422. For example, the read enable circuit 2420 may enable the pixel read for each pixel in the row by respective column sense lines that correspond to each pixel (e.g., connecting to respective column decoders or analog to digital converters).

Figure 25:
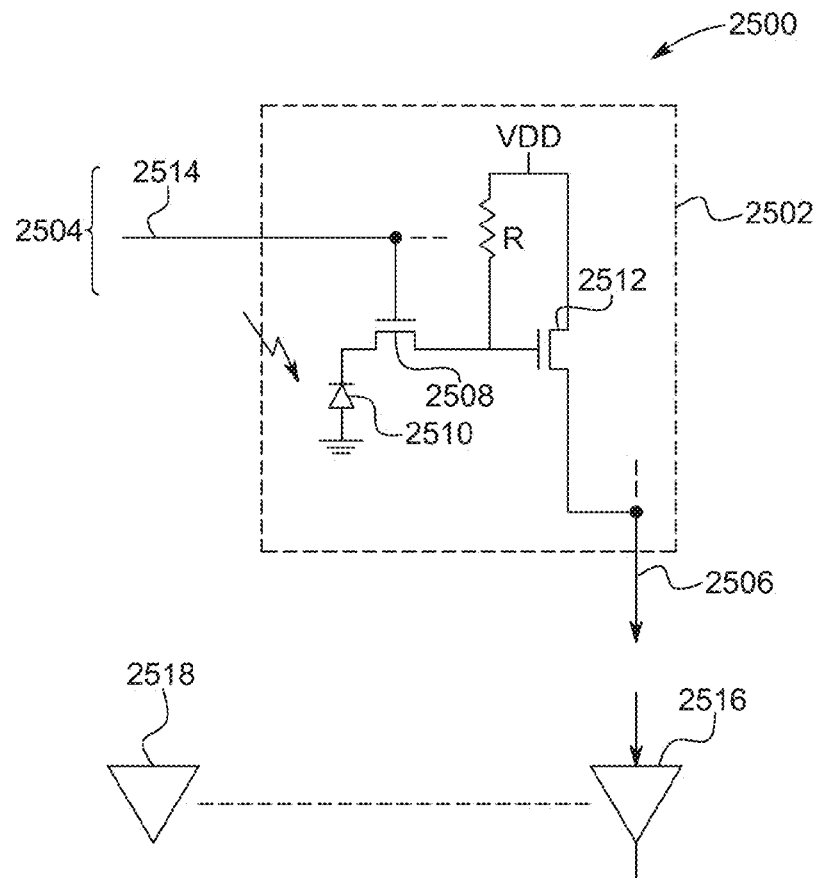
FIG. 25 show an embodiment of an exemplary two-transistor photodiode pixel.

FIG. 25 shows an exemplary sensor portion 2500 that includes an exemplary two-transistor photodiode pixel 2502. The sensor portion 2500 may be that of a sensor of a receive system. For example, the receiver may be the same as or similar to one or more of those explained above. In one or more of the various embodiments, the pixel 2502 may employ logic 2504 that provides one or more of row-select or row-control. In some of the various embodiments, the pixel 2502 may include a column sense line 2506 over which the pixel 2502 outputs data (e.g., to a column decoder or analog to digital converter).

In one or more of the various embodiments, the pixel 2502 may include a transfer gate 2508. In some of the various embodiments, the transfer gate 2508 may connect a pinned photodiode 2510 of the pixel 2502 to a floating diffusion gate 2512 of the pixel 2502. In some of the various embodiments, in contrast to the reset circuit 2414 of FIG. 24, the pixel 2502 may include a weak pull-up resistor (R). In some embodiments, the weak pull-up resistor may keep the floating diffusion gate 2512 pulled up to $V_{DD}$ when no photo-electron pulse is detected. Alternatively, a third reset transistor may be set to act as a weak pullup that can be controlled by an external reset control line. In one or more of the various embodiments, the transfer gate 2508 may receive one or more signals over a transfer gate enable line 2514. In some of the various embodiments, pixel or row activation (e.g., light sensing) may be enabled in response to the transfer gate 2508 receiving the one or more signals over the transfer gate enable line 2514.

For example, at time to photons may rush into the pixel photodiode 2510. The pulse of photodiode-generated electrons may rush through the transfer gate 2508 (e.g., at $t_1$). At $t_2$, the column sense line 2506 may be pulled low (e.g., a peak electron flux current may flow from the photodiode 2510 and through the transfer gate 2508 and may be stronger than a weak pull up provided by the pull-up resistor) to produce a signal. At $t_3$ a column sensing circuit 2516 may amplify the signal. In some of the various embodiments, each column may have a corresponding column sensing circuit (e.g., for column sense lines 2506 through column sense line N that connects to an Nth column sensing circuit 2518). Based on the signal, the receive system may instantly (or practically instantly) know in which column the photon pulse occurred. In one or more of the various embodiments, the receive system may have low signal propagation lag (e.g., in the order of nanoseconds). In some of the various embodiments, the receive system may have small pixel structures, capacitances, and impedances. In some embodiments, the column sense line 2506 may have its own amplifier (e.g., column sensing circuit 2516).

In one or more of the various embodiments, the receive system may encode the signal with column numbers. In some of the various embodiments, the receive system may combine the signals for various columns into a serial bus. In some embodiments, the receive system may implement sense line logic to encode the signals with column numbers. Additionally or alternatively, the receive system may implement the sense line logic to combine the signals for various columns into the serial bus.

In one or more of the various embodiments, the receive system may provide a signal for each detected scan beam reflection. For example, the receive system may implement a 1 GHz clock to provide asynchronous voxel registrations (e.g., up to 1 billion voxels per second).

Figure 26:
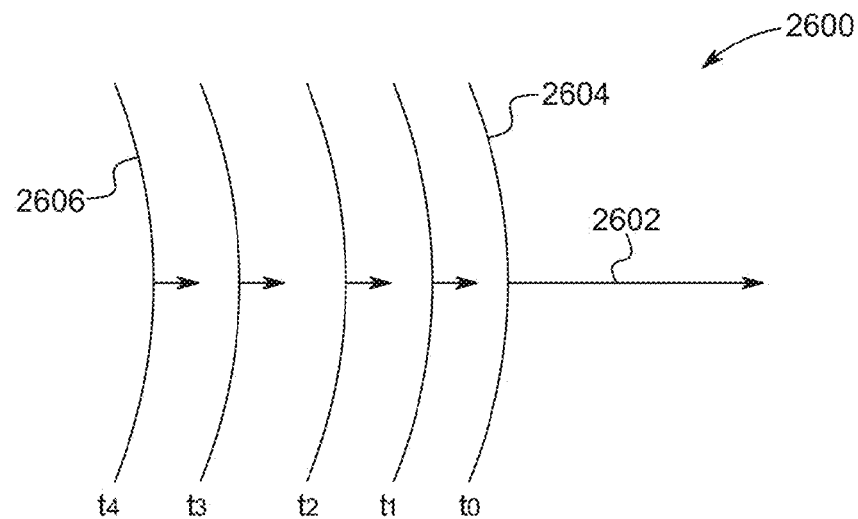
FIG. 26 shows an embodiment of an exemplary flashed illumination employing exemplary wave-front color separation.

FIG. 26 shows an exemplary flashed illumination 2600 that employs exemplary wave-front color separation. An exemplary transmit and receive ($T_x$-$R_x$) system may implement the flashed illumination 2600. For example, the transmit and receive ($T_x$-$R_x$) system may be the same as or similar to one or more of those explained above. In one or more of the various embodiments, a transmit system of the transmit and receive ($T_x$-$R_x$) system may emit the flashed illumination 2600 in a scan direction 2602. In some of the various embodiments, the flashed illumination 2600 may include a "PlainBow" Flashed Phosphor illumination wave front color separation with short (e.g., UV or blue) wavelengths 2604 leading and long (e.g., red or NIR) wavelengths trailing 2606.

Figure 27:
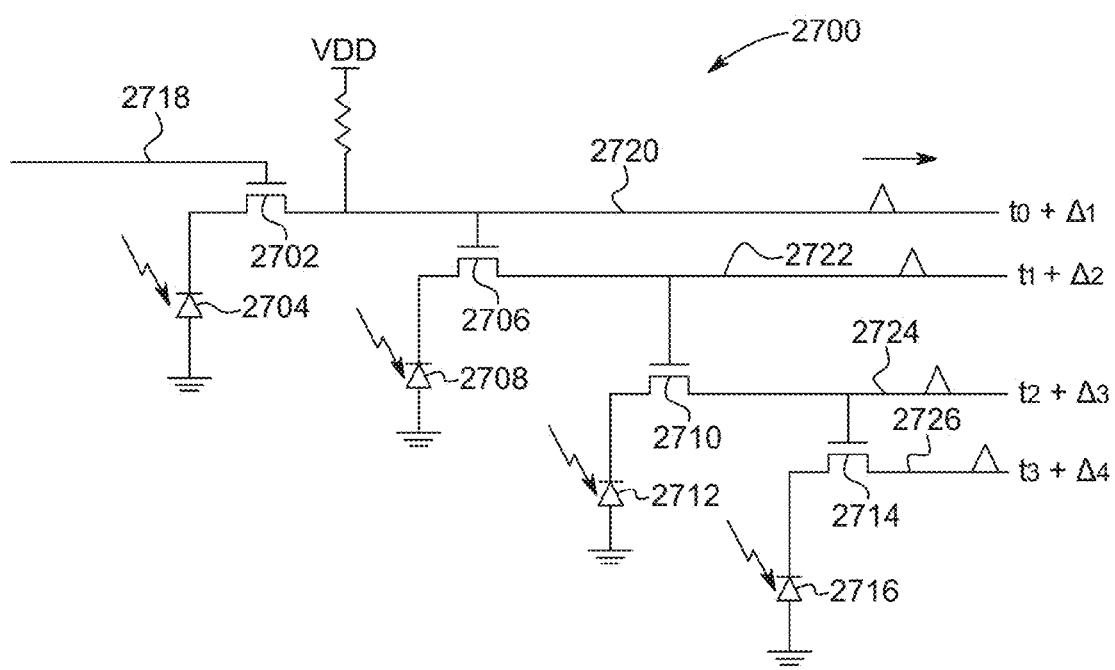
FIG. 27 illustrates an embodiment of an exemplary cascaded trigger pixel system that employs exemplary separate sense lines to sequentially capture various exemplary color-separated and time-separated components.

FIG. 27 illustrates an exemplary cascaded trigger pixel system 2700 that employs exemplary separate sense lines to sequentially capture various exemplary color-separated and time-separated components. An exemplary sensor of an exemplary receive system may include the cascaded trigger pixel system 2700. For example, the receive system may be the same as or similar to one or more of those explained above. In one or more of the various embodiments, the separate sense lines of the cascaded trigger pixel system may sequentially capture one or more of the color-separated and time-separated components of the flashed illumination 2600 of FIG. 26.

In one or more of the various embodiments, the cascaded trigger pixel system 2700 may include a first transfer gate 2702 that connects to a first photodiode 2704, a second transfer gate 2706 that connects to a second photodiode 2708, a third transfer gate 2710 that connects to a third photodiode 2712, and a fourth transfer gate 2714 that connects to a fourth photodiode 2716. In some of the various embodiments, the first transfer gate 2702 may receive one or more signals over a transfer gate enable line 2718 at to. In some embodiments, the first transfer gate 2702 may pass a first signal from the first photodiode 2704 over a first transfer gate output line 2720 in response to receiving the one or more signals over the transfer gate enable line 2718 and the first photodiode 2704 capturing a light spot. The first transfer gate output line 2720 may deliver the first signal to the second transfer gate 2706 and to one or more row or column sense lines at $t_1$ (e.g., $t_1$ may equal $t_0+\Delta_1$). The second transfer gate 2706 may pass a second signal from the second photodiode 2708 over a second transfer gate output line 2722 in response to receiving the first signal and the second photodiode 2708 capturing a light spot. The second transfer gate output line 2722 may deliver the second signal to the third transfer gate 2710 and to one or more row or column sense lines at $t_2$ (e.g., $t_2$ may equal $t_1+\Delta_2$). The third transfer gate 2710 may pass a third signal from the third photodiode 2712 over a third transfer gate output line 2724 in response to receiving the second signal and the fourth photodiode 2712 capturing a light spot. The third transfer gate output line 2724 may deliver the third signal to the fourth transfer gate 2714 and to one or more row or column sense lines at $t_3$ (e.g., $t_3$ may equal $t_2+\Delta_3$). The fourth transfer gate 2714 may pass a fourth signal from the fourth photodiode 2716 over a fourth transfer gate output line 2726 in response to receiving the third signal and the fourth photodiode 2712 capturing a light spot. The fourth transfer gate output line 2726 may deliver the fourth signal to a subsequent transfer gate (not shown) and to one or more row or column sense lines at $t_4$ (e.g., $t_4$ may equal $t_3+\Delta_4$).

FIG. 28 shows an exemplary flash-triggered four-transistor photodiode pixel 2800 (e.g., a pinned photodiode pixel). An exemplary sensor of an exemplary receive system may include the flash-triggered four-transistor photodiode pixel 2800. For example, the receive system may be the same as or similar to one or more of those explained above. In one or more of the various embodiments, the flash-triggered four-transistor photodiode pixel 2800 may employ logic 2802 that provides one or more of row-select or row-control.

In some of the various embodiments, the pixel 2800 may include a column sense line 2804 over which the pixel 2800 outputs data (e.g., to a column decoder or analog to digital converter).

In one or more of the various embodiments, the pixel 2800 may include a transfer gate 2806 that passes current from a photodiode 2808 to a floating diffusion well 2810 of the pixel 2800. In some of the various embodiments, a pixel row that contains or bears the pixel 2800 may have a reset circuit 2812 that receives one or more signals over a reset line 2814. In some embodiments, the transfer gate 2806 may enable in response to receiving one or more signals over a transfer gate enable line 2816. In some of the various embodiments, the pixel 2800 may include a reset enable circuit 2818 that enables a pixel read over the column sense line 2804 in response to receiving one or more signals over a read enable line 2820.

In one or more of the various embodiments, the pixel 2800 employ one or more lines of the logic 2802 to sequentially capture various color-separated and time-separated components. In some of the various embodiments, the same one or more lines may provide fast-sequential pixel-read outs with regard to one or more captures of one or more of the color-separated and time-separated components of the flashed illumination of FIG. 26.

Additional Illustrated Aspects of the Sensing Systems

Figure 29:
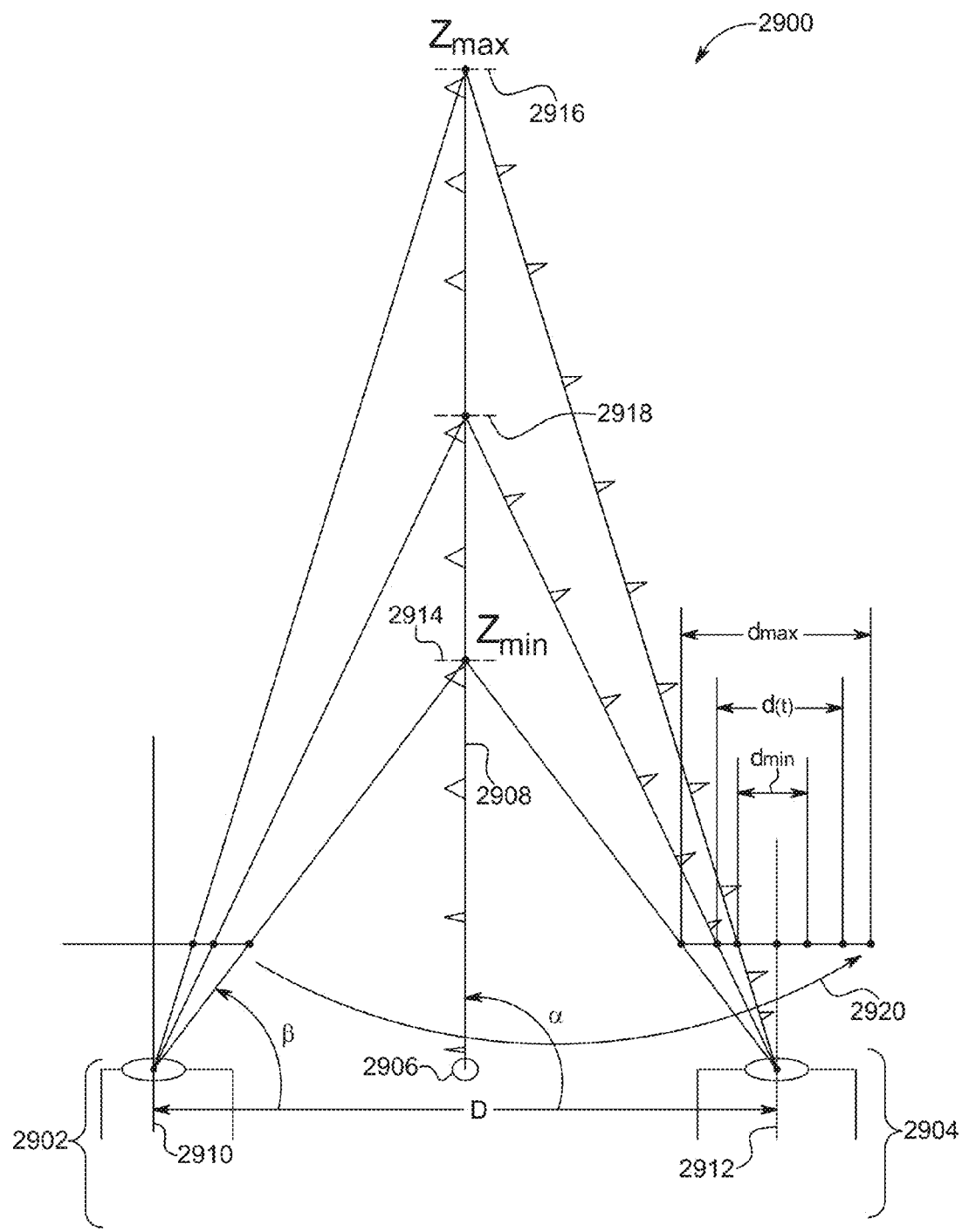
FIG. 29 shows an embodiment of a two-dimensional perspective view of an exemplary stereo pair of exemplary triangulating LIDAR receivers that detect exemplary reflecting light waves of exemplary tracer bullets, wherein pixels in each of the receivers are, for each individual emitted tracer bullet, individually anticipatorily activated to synchronize each active ON period of each individual pixel with an anticipated return time and anticipated pixel location of each possible reflection for each possible range and location along a path of travel of the individual emitted tracer bullet.

As shown in FIG. 29, an exemplary transmit and receive ($T_x$-$R_x$) system 2900 may employ exemplary LIDAR triangulation (e.g., as explained above). For example, the transmit and receive ($T_x$-$R_x$) system 2900 may be the same as or similar to one or more of those explained above. In one or more of the various embodiments, the transmit and receive ($T_x$-$R_x$) system 2900 may include a stereo pair of triangulating LIDAR receivers 2902 and 2904. In some of the various embodiments, the transmit and receive ($T_x$-$R_x$) system 2900 may include a scanning laser transmitter 2906.

In one or more of the various embodiments, the transmit and receive ($T_x$-$R_x$) system 2900 may offset the two receivers 2902 and 2904 from the scanning laser transmitter 2906 (e.g., along a baseline of the transmit and receive ($T_x$-$R_x$) system 2900). In some of the various embodiments, the scanning laser transmitter 2906 may be arranged to scan across a field of view of the transmit and receive ($T_x$-$R_x$) system 2900. In some embodiments, the scanning laser transmitter 2906 may be arranged to sweep a scanning beam 2908 in successive scans. In one or more of the various embodiments, the transmit and receive ($T_x$-$R_x$) system 2900 may arrange the receivers 2902 and 2904 to have respective central optical axes 2910 and 2912 that are parallel with each other. In some of the various embodiments, the central optical axes 2910 and 2912 may be perpendicular to the baseline of the transmit and receive ($T_x$-$R_x$) system 2900.

In one or more of the various embodiments, the transmit and receive ($T_x$-$R_x$) system 2900 may be a smart hybrid triangulating LIDAR system. In some of the various embodiments, the smart hybrid triangulating LIDAR system may optimize ambient illumination suppression. For example, the smart hybrid triangulating LIDAR system may employ synchronized time-selective triggered pixel activation. In one or more of the various embodiments, the scanner may project images of scan lines onto surfaces in the field of view. In some of the various embodiments, the receivers 2902 and 2904 and the scanner 2906 may be arranged to align the images with rows in sensors of the receivers 2902 and 2904. For example, the receivers 2902 and 2904 and the scanner 2906 may be arranged in an epipolar configuration.

In one or more of the various embodiments, the scanning laser transmitter 2906 may include a light source and a scanning mirror. In some of the various embodiments, the light source may emit short collimated photonic pulses as the scanning mirror scans across the field of view. In some embodiments, the receivers 2902 and 2904 and the scanner 2906 may be arranged so that trajectories of reflections of these pulses trace along successive rows in each of the sensors. In one or more of the various embodiments, the collimated photonic pulses emitted by the scanner may include, for example, "tracer bullets" (e.g., as described in U.S. Pat. Nos. 8,282,222, 8,430,512, 8,696,141, and 8,711,370 and U.S. patent application Ser. No. 14/823,668, each of which is assigned to PhotonJet). In one or more of the various embodiments, the scanning laser transmitter may project time-of-flight tracer bullets. In some of the various embodiments, the stereo pair of triangulating time-of-flight receivers may capture reflections of the time-of-flight tracer bullets. In some embodiments, projected light may reflect on a surface in the field of view. A fraction of the reflection may return towards the system. The receivers may capture the fraction of the reflection.

In one or more of the various embodiments, the smart hybrid triangulating LIDAR system may combine triangulation with time-of-flight ranging. In some of the various embodiments, the transmitter 2906 may transmit the tracer bullets along a known trajectory axis (e.g., ray direction with angular coordinates α & ε) at speed c (approx. $3 \times 10^8$ m/sec). In some embodiments, the transmitter 2906 may emit the tracer bullets along the straight line by reflecting the tracer bullets off the scan mirror.

In one or more of the various embodiments, in response to the tracer bullets impacting a surface at distance Z (e.g., a first distance 2914, a second distance 2918, or a third distance 2916), a fraction of photons of the tracer bullets may reflect back toward the three-dimensional sensing system 900 as explained above. In some of the various embodiments, apertures of the receivers 2902 and 2904 may capture the fraction of the photons as explained above. In some embodiments, the receivers 2902 and 2904 may be offset at distance D from each other as explained above. In one or more of the various embodiments, the scanning source transmitter 2906 may be positioned in a center of the baseline. In some of the various embodiments, each receiver may be positioned at a distance D/2 from the scanning source transmitter 2906.

Where the receivers 2902 and 2904 are offset from the transmitter 2906, the photons may travel in triangles to reach the receivers 2902 and 2904. These triangles may become more acute as distance Z increases. In one or more of the various embodiments, as Z increases, returning light's chief ray may rotate out toward a vanishing point. In some of the various embodiments, as the returning light's chief ray rotates out toward the vanishing point, an angle beta β may increase. In some embodiments, the increase in the angle beta β may converge the outgoing beam 2908 and incoming reflected light's chief ray directions toward being parallel (e.g., as the Z increases toward infinity, α≈β). In one or more of the various embodiments, one or more columns in the sensor may capture each incoming ray (e.g., each ray with incoming angle β). For example, each incoming ray may be captured by one or more columns at an intersection point that may slide along a row toward a center of the sensor (e.g., along the epipolar axis).

In one or more of the various embodiments, the sensor may identify a unique pixel location for each distance Z that the outgoing ray travels along the outgoing ray direction α.

In some of the various embodiments, the incoming ray angle β may be a function of Z and α. In some embodiments, the transmit and receive ($T_x$-$R_x$) system 2900 may employ a time of flight for the reflected photons. For example, the time at which the reflected photons arrive at the sensor location is given by $t_{ToF}$ (e.g., a round trip time at a speed of light where $t_{ToF}$=2*Z/c).

In one or more of the various embodiments, the smart three-dimensional triangulating LIDAR system may know where to expect the photons to return (e.g., an anticipated location in the sensor). In some of the various embodiments, the smart three-dimensional triangulating LIDAR system may know when to expect the photons to return. In some embodiments, the anticipated location in the sensor may be a function of time. For example, the anticipated location may be a function of the tracer bullet's time of flight (which may be a function of Z). In one or more of the various embodiments, based on this fixed physical geometric relationship, the smart LIDAR system may preemptively correlate an instantaneous moment and location of the returning photons.

In one or more of the various embodiments, the system 2900 may know that, for each possible distance Z, there might be a reflecting surface or obstacle in a path of the beam. In one or more of the various embodiments, the system 2900 may know, for each such possible Z value, exactly (or practically exactly) when and where in the sensor the photons should return. In actuality, each tracer bullet may reflect for one value of Z and return in one location in the sensor at a given time. Because the system 2900 may anticipate each possibility and because a possible photon landing at a location in the sensor can happen at a unique moment (e.g., one possible location at a given time), the system 2900 can open up a "landing" pixel as a function of time. In one or more of the various embodiments, the system 2900 may slide the position of the "landing pixel" very quickly (e.g., in nanoseconds) along a row in the sensor.

In one or more of the various embodiments, the system 2900 may, at a given time, activate a very small subsection of a row (e.g., one pixel or a few pixels). In some of the various embodiments, the system 2900 may slide a subsection window of activated pixels along the row (e.g., within a microsecond from a point of greatest disparity $d_{max}$ to a point of least disparity $d_{min}$).

In one or more of the various embodiments, the transmitter 2906 may include a pixel sequential transmitter. In some of the various embodiments, the pixel sequential transmitter may launch a brief (100 ps), narrowly collimated (<500 microns) "spit ball" of photons toward a target (e.g., Z feet away). The photons may splash onto the target (e.g., Z nanoseconds after launch). Some of the photons may reflect back in a direction of one of the receivers 2902 and 2904 as explained above. After another Z ns, the reflected photons may enter an aperture of the receivers 2902 and 2904. The receivers 2902 and 2904 may collimate the reflected photons to a point that may approximately match a size of the pixels (e.g., a micron) on the sensor's surface.

In one or more of the various embodiments, when the receivers 2902 and 2904 simultaneously detect reflected photons of a photon bullet, the transmit and receive ($T_x$-$R_x$) system 2900 may associate those detections with each other, determining a correspondence between one or more pixels in the receiver 2902 and one or more pixels in the receiver 2904 in this stereo detection (e.g., as shown by arrow 2920). In this manner, the transmit and receive ($T_x$-$R_x$) system 2900 may instantaneously and unambiguously provide the correspondence between the pixels when using a pixel sequential (e.g., twitch pixels, SPAD, or the like) camera.

In one or more of the various embodiments, the transmit and receive ($T_x$-$R_x$) system 2900 may have expected the reflected photons to arrive at the point at that particular time. In some of the various embodiments, the transmit and receive ($T_x$-$R_x$) system 2900 may open an ultra-fast shutter that may open up a particular pixel at the point (e.g., just before the reflected photons arrive at the particular pixel). For example, the transmit and receive ($T_x$-$R_x$) system 2900 may open up a sliding activated pixel window at a sliding position along the row.

In one or more of the various embodiments, the transmit and receive ($T_x$-$R_x$) system 2900 may instantly (or practically instantly) set detection circuits to an exact (or practically exact) sensitivity to positively detect an amount of the reflected photons that arrive at the particular pixel. In some of the various embodiments, the receivers 2902 and 2904 may include fast-gated logic that may activate column-sensing logic. In some embodiments, this column-sensing logic activates a sensing decoder for brief time period (e.g., at a moment of arrival of a spike of photocurrent generated in the particular pixel that the reflected tracer bullet activates). In some embodiments, the transmit and receive ($T_x$-$R_x$) system 2900 may synchronously match up the incoming electrons on arrival. In some embodiments, the receivers 2902 and 2904 may amplify a corresponding signal to a strength sufficient to reach a control system.

In one or more of the various embodiments, the transmit and receive ($T_x$-$R_x$) system 2900 may account for which pixel should capture the reflected photons at what time as explained above. In some of the various embodiments, the transmit and receive ($T_x$-$R_x$) system 2900 may make small adjustments (e.g., to a fraction of a nanosecond) to, for example, account for known system latency (e.g., lag between arrival of photons and a boosted signal arriving at the control system). In some embodiments, the transmit and receive ($T_x$-$R_x$) system 2900 may, with an expected time-of-flight delay and disparity d confirmed, instantly (or practically instantly) compute (e.g., by looking up a precomputed triangulation matrix) an exact (or practically exact) distance Z, for location X, Y (column and row address of the pixel that the reflected photons activate).

In one or more of the various embodiments, the transmit and receive ($T_x$-$R_x$) system 2900 may employ precise spatio-temporal single pixel confinement. In some of the various embodiments, the transmit and receive ($T_x$-$R_x$) system 2900 may activate a pixel just before arrival of the reflected tracer bullet's photons at the pixel (e.g., after a flight time that equates to 2*Z/c). In some embodiments, the transmit and receive ($T_x$-$R_x$) system 2900 may do so by sequentially activating pixels along a particular row that an active column decoder supports. In one or more of the various embodiments, the transmit and receive ($T_x$-$R_x$) system 2900 may shutter out other light. In some of the various embodiments, the transmit and receive ($T_x$-$R_x$) system 2900 may sequentially and very briefly activate the pixels along that row in an anticipatory fashion as explained above.

In one or more of the various embodiments, the transmit and receive ($T_x$-$R_x$) system 2900 may preselect (e.g., both spatially and temporally) potentially receiving pixels in the sensor. For example, the transmit and receive ($T_x$-$R_x$) system 2900 may employ an epipolar arrangement with a sliding pixel shutter as explained above. In some of the various embodiments, the transmit and receive ($T_x$-$R_x$) system 2900 may detect the returning photons with pinpoint precision. In some embodiments, the transmit and receive ($T_x$-$R_x$) system 2900 may, in an anticipatory fashion, confine the moment and location of arrival of the reflected photons to as little as a single nanosecond and a single pixel.

The following example illustrates the above. The following example uses round numbers for convenience, simplicity, and clarity. As shown by arrow 2920, simultaneously activated pixels in the receivers 2902 and 2904 may have a disparity relative to each other (e.g., $d_{min}$, $d_{(t)}$, and $d_{max}$).

In one or more of the various embodiments, the transmit and receive ($T_x$-$R_x$) system 2900 may use a laser beam to scan an area equivalent to a single pixel in the system's field of view (e.g., a 10 degree field of view) in 1 nanosecond. The sensor may include 10,000 pixels in each row. Each pixel may capture 1/1000 of a degree of the field of view. The transmit and receive ($T_x$-$R_x$) system 2900 may scan each line of the field of view in 10 microseconds.

For example, the transmit and receive ($T_x$-$R_x$) system 2900 may "fire" an intense 100 pico second tracer bullet in a direction of epsilon ϵ and alpha α. Shortly afterwards, the transmit and receive ($T_x$-$R_x$) system 2900 may activate one pixel in each receiver 2902 and 2904 for approximately 1 nanosecond (e.g., one clock). The transmit and receive ($T_x$-$R_x$) system 2900 may select the pixel based on a position of the pixel. For example, the transmit and receive ($T_x$-$R_x$) system 2900 may select the pixel because this pixel position may be a position of maximum disparity $d_{max}$ (e.g., greatest stereo differential angle β−α) and may correspond to a minimal range $Z_{min}$. The transmit and receive ($T_x$-$R_x$) system 2900 may shutter the pixel off again and may activate a pixel neighbor of that pixel (e.g., may activate a pixel in the next column over) for approximately one nanosecond. The transmit and receive ($T_x$-$R_x$) system 2900 may sequentially proceed to each subsequent pixel until a maximum detection range position has been reached at $d_{min}$.

As explained above, the maximum disparity, $d_{max}$, may occur at the minimum range $Z_{min}$, and the minimum disparity, $d_{min}$, may occur at the maximum range, $Z_{max}$. The farther the light travels, the less the disparity as explained above. At some point, the maximum observable range, $Z_{max}$, is reached. In response to reaching the maximum observable range, $Z_{max}$, the transmit and receive ($T_x$-$R_x$) system 2900 may stop looking at the next pixel in the row. For example, if there are no objects (e.g., no reflecting surfaces) within this range or if the surface reflects an insufficient portion of the tracer bullet's light, then the transmit and receive ($T_x$-$R_x$) system 2900 may fail to record an event. In response to the transmit and receive ($T_x$-$R_x$) system 2900 failing to record an event, the system may "time-out." In response to the transmit and receive ($T_x$-$R_x$) system 2900 timing out (or approaching the time-out), the transmit and receive ($T_x$-$R_x$) system 2900 may fire a subsequent tracer bullet (e.g., after maximum range time of 1 microsecond, a 500 ft. range, for example).

In one or more of the various embodiments, the transmit and receive ($T_x$-$R_x$) system 2900 may employ a fast dynamical scanning mode (e.g., a mode in which the transmit and receive ($T_x$-$R_x$) system 2900 may provide a fast dynamical voxel detection rate). In the dynamic scanning mode, the system may send a subsequent bullet in response to recording a given bullet's reflection. For short-range detection, an inverse-square law may indicate that the transmit and receive ($T_x$-$R_x$) system 2900 may need quadratically less energy in each photon bullet, while still achieving a sufficiency of photons arriving in the sensor, as compared to energy in a photon bullet that travels to and from a target that spaced one further unit of distance from the transmit and receive ($T_x$-$R_x$) system 2900 (e.g., near objects automatically receive a dense hail of low energy tracer bullets). The short distance allows a rapid firing of low energy tracer bullets without causing ambiguity in the sensor.

At larger distances (e.g., when detection is limited to a relatively narrow range, such as, for example, a 20' sensing range at 200' distance), the system may time out sooner and may, for example, fire a subsequent tracer bullet upon reaching a time period between bullet firings that may corresponds to a time interval where simultaneously arriving reflections may cause ambiguity (e.g., 40 nanoseconds). For example, at a detection range setting of 20 feet and at a distance of 200', the transmit and receive ($T_x$-$R_x$) system 2900 may reach rates up to 25M Voxels/sec.

Figure 38:
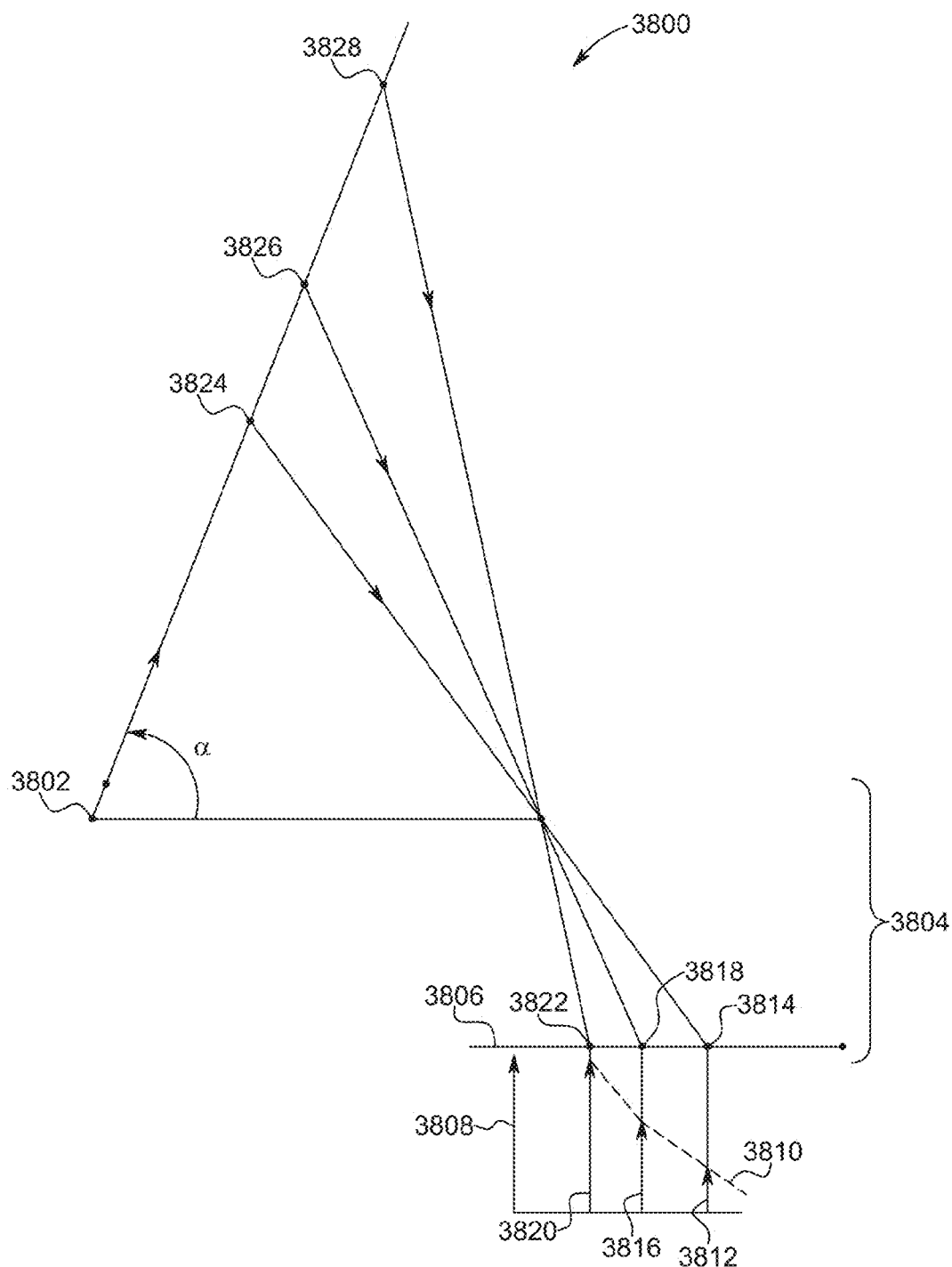
FIG. 38 shows an embodiment of a two-dimensional perspective view of an exemplary transmit and receive ($T_x$-$R_x$) system that sequentially sets and activates exemplary pixels.

The transmit and receive ($T_x$-$R_x$) system 2900 may dynamically amplify signals. Because closer objects may reflect more strongly than further objects (e.g., according to the inverse-square law), an incoming signal of reflected photons may be stronger and much easier to detect. In one or more of the various embodiments, the transmit and receive ($T_x$-$R_x$) system 2900 may, therefore, provide less signal amplification for pixels associated with close range reflections (e.g., both in those pixels and in circuits that connect to those pixels). In some of the various embodiments, the transmit and receive ($T_x$-$R_x$) system 2900 may include amplification circuits built in to column (or row) sensing lines. In some embodiments, the transmit and receive ($T_x$-$R_x$) system 2900 may set the amplification of column sensing lines connected to pixels that are set to receive nearby reflections (e.g., pixels with current disparity values d close to $d_{max}$) to temporarily amplify by reduced magnitudes. In some embodiments, the transmit and receive ($T_x$-$R_x$) system 2900 may set the amplification of column sensing lines associated with pixels that receive longer range signals (e.g., with Z closer to $Z_{max}$), such as, for example, pixels in positions where the disparity currently is closer to $d_{min}$, to temporarily amplify by increased magnitudes. In some embodiments, the transmit and receive ($T_x$-$R_x$) system 2900 may adjust, in real time, pixel circuits themselves (e.g., by adjusting photodiode bias or an adjustable gain circuit in pixel logic as illustrated in FIG. 38).

In one or more of the various embodiments, the transmit and receive ($T_x$-$R_x$) system 2900 may, in response to detecting a surface and establishing an approximate range, adjust all three settings: the photon bullet energy, the repeat frequency, as well as the sensor sensitivity. In some of the various embodiments, the transmit and receive ($T_x$-$R_x$) system 2900 may automatically set an optimal setting for each situation.

TABLE 2

| Range | 10' | 20' | 40' | 100' |
|---|---|---|---|---|
| ≈$1/R^2$ | 1.00 | .250 | .0625 | .010 |
| Photons | 1000 | 250 | 62 | 10 |
| Gain | 1 | 4 | 16 | 100 |
| Net signal | 1.0 | 1.0 | 1.0 | 1.0 |
| d (≈1/R) | 100 | 50 | 25 | 10 |
| $t_{ToF}$ (in ns) | 20 | 40 | 80 | 200 |

TABLE 1

| Range (R) | 100' | 200' | 300' |
|---|---|---|---|
| d (1/R) | 300 | 150 | 100 |
| Photon ($1/R^2$) | 900 | 300 | 100 |
| $t_{ToF}$ (in ns) | 200 | 400 | 600 |

In one or more of the various embodiments, a "twitchy pixel" may instantly (or practically instantly) report an incoming pulse of reflected tracer bullet photons (e.g., via one or more of a high sensitivity sensing amplifier or a source follower connected to a photodiode in the pixel). In some of the various embodiments, the pixel may be arranged to cause an amplified pulse to travel via a column sense line to a gated sense amplifier. In some embodiments, this amplifier may serve one column. The transmit and receive ($T_x$-$R_x$) system 2900 may turn this amplifier on for a very brief moment (e.g., at time $t=t_{ToF}=2*Z/c$), for example, an exact (or practically exact) moment (one nanosecond) when the photon bullet's reflection arrives. In some embodiments, the system may determine Z within an accuracy of ½ of one foot.

In one or more of the various embodiments, the transmit and receive ($T_x$-$R_x$) system 2900 may provide sequential voxel scanning of close-range surfaces (e.g., surfaces within 10 feet) at, for example, 20 nanoseconds per sequential location. In some of the various embodiments, the transmit and receive ($T_x$-$R_x$) system 2900 may scan up to, for example, 50 Million Voxels per second (50 MVps).

Figure 30:
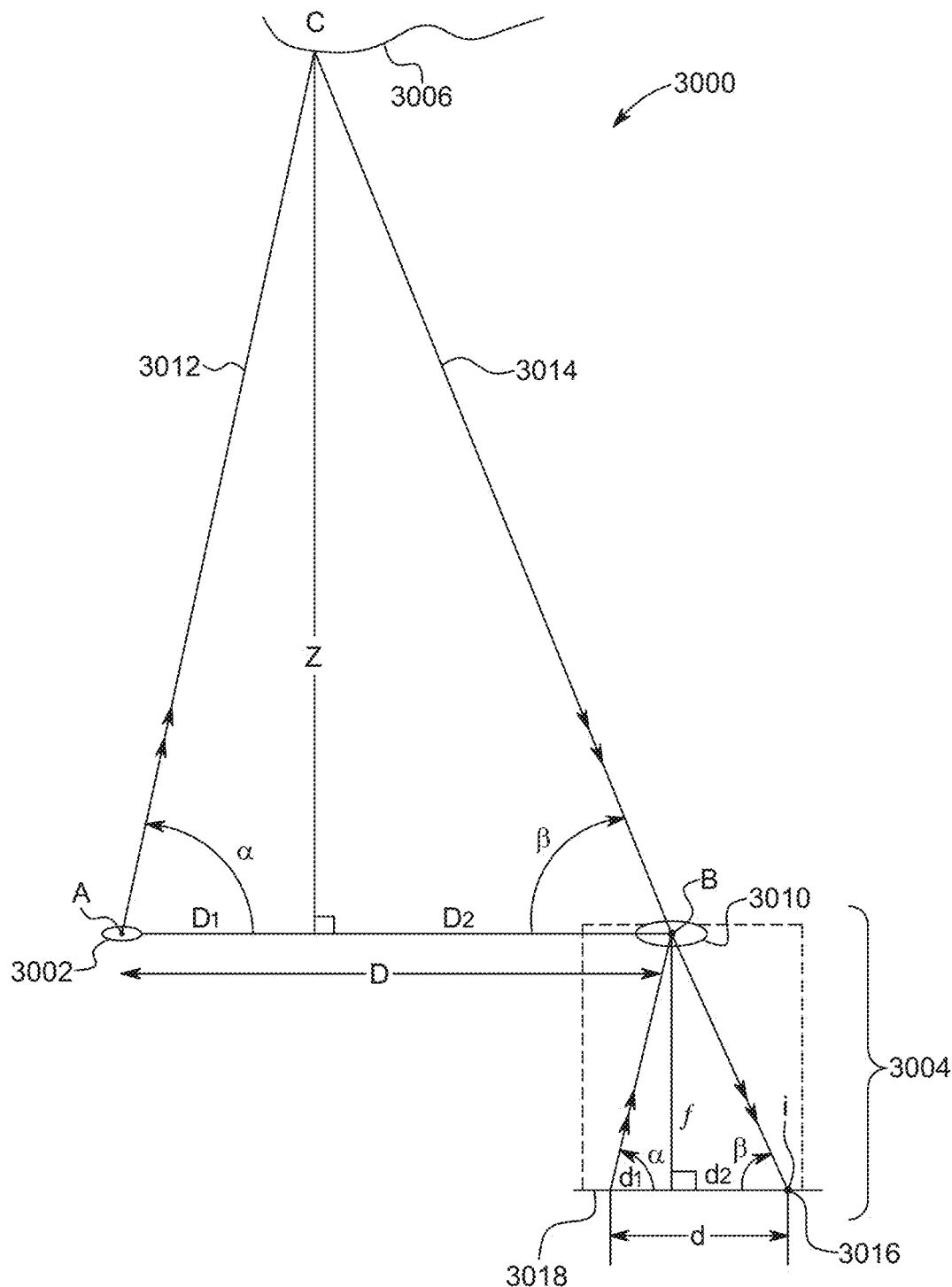
FIG. 30 illustrates an embodiment of a two-dimensional perspective view of an exemplary LIDAR triangulating transmit and receive ($T_x$-$R_x$) system with exemplary disparity proportional to time of flight.

FIG. 30 illustrates an exemplary LIDAR triangulating transmit and receive ($T_x$-$R_x$) system 3000. For example, the transmit and receive ($T_x$-$R_x$) system 3000 may be the same as or similar to one or more of those explained above. In one or more of the various embodiments, the transmit and receive ($T_x$-$R_x$) system 3000 may include a triangulating transmitter-receiver pair 3002 and 3004. In some of the various embodiments, the transmit and receive ($T_x$-$R_x$) system 3000 may include a photon transmitter 3002 at base point A of a triangle ABC. In some embodiments, the transmit and receive ($T_x$-$R_x$) system 3000 may include a receiver 3004 at another base point B at an offset base distance D (e.g., AB=D). The transmitter 3002 may emit a scanning beam 3012 that reflects off a surface 3006 as reflected light 3014 toward the receiver 3004 (e.g., a pixel 3016 of a sensor of the receiver 3004 may capture the reflected light 3014, the pixel 3016 being at point i where the column position or number is proportional to the angle of beta β).

In one or more of the various embodiments, the receiver 3004 may include a sensor 3018. In some of the various embodiments, the sensor 3018 may be arranged in a plane parallel to base AB at a distance f, where f is an effective focal length of a lens or focusing system 3010 at an aperture of the receiver.

In one or more of the various embodiments, the transmitter 3002 may transmit a highly collimated beam in direction α. (While FIG. 30 illustrates the system in two dimensions, showing a plane in which the triangle ABC lies, another plane exists for each elevation angle ε.) In some of the various embodiments, the transmit and receive ($T_x$-$R_x$) system 3000 may be an epipolar aligned system. In some embodiments, fast scanning axis motion of the transmitter 3002 may scan a series of points C in rapid succession. In some embodiments, the transmit and receive ($T_x$-$R_x$) system 3000 may image reflections of these points as a succession of imaged reflection points C' in the sensor 3018, along the same row. (Small deviations may occur due to factors such as non-ideal motions of a mirror and distortions of receiving optics.)

In one or more of the various embodiments, a row in the sensor may be formed by a triangle with height h=f and base corners C' (e.g., the triangle may be similar in shape as triangle ABC). In some of the various embodiments, the base length is d, which may be scaled down. In some embodiments, the base corners may be α and β (e.g., the same as the base corners of triangle ABC). In some embodiments, the transmit and receive ($T_x$-$R_x$) system 3000 may determine that, based on the law of similar triangles, d/f=D/Z. For example, the transmit and receive ($T_x$-$R_x$) system 3000 may know that, based on the law of similar triangles, if Z is 300 feet, D is 3 feet, and f is 10 mm, then d is 1/100 of 10 mm (100 microns). In a 2 k sensor with 1 micron pixels, d measured in pixels may be 100 pixels. In some of the various embodiments, the transmit and receive ($T_x$-$R_x$) system 3000 may determine that the photons that reached the sensor at position C' traveled for approximately 600 ns (e.g., 300 ns from the transmitter 3002 to target and 300 ns again back to receiver 3004). For a closer target (e.g., at 200 feet), the photons may arrive at 400 ns and with a significantly greater disparity (d) of 150 microns (e.g., 150 pixels). For 100 feet, the values may be 200 ns, 300 microns, and 300 pixels (e.g., as illustrated by table 1).

In one or more of the various embodiments, there may be a relationship between where (e.g., which pixel, at how much disparity, or the like) and when the photons arrive. In some of the various embodiments, the further photons go, the longer a time period that the photons travel and the smaller the disparity as explained above. In addition, according to the inverse square law, a signal may attenuate proportionally to time-of-flight (e.g., a further distance results in fewer photons that return to the aperture 3010).

In one or more of the various embodiments, the transmit and receive ($T_x$-$R_x$) system 3000 may employ this type of ultra-fast pixel shuttering to individual pixels to open individual pixels "just-in-time" for capturing a signal. In some of the various embodiments, the transmit and receive ($T_x$-$R_x$) system 3000 may reduce ambient light "leakage" to an absolute (or practically absolute) minimum. For example, the transmit and receive ($T_x$-$R_x$) system 3000 may open a correct pixel (e.g., selectively enabling a column and a row) for as little as 10 nanoseconds, thereby capturing one hundred millionth ($10^{-8}$) of a fraction of the ambient light, even before filtering (e.g., with Bragg type narrow band pass filters).

In one or more of the various embodiments, the exemplary system may not require special narrow band pass filters. In some of the various embodiments, ranging function of the transmit and receive ($T_x$-$R_x$) system 3000 can be added to otherwise ordinary cameras. For example, rolling shutter camera with four-transistor pinned photodiodes may be modified by adding a fast column gating function and an asynchronous binary detection mode (e.g., as a "twitchy pixel" circuit as described herein. In some embodiments, twitchy pixels may asynchronously transmit photodiode rush current with minimal (e.g., nanosecond) latency to a column sense line. In some of the various embodiments, for three-dimensional ranging, existing color pixels may be configured to sense visible color-coded (RG&B) tracer bullets. In some embodiments, the pixels may be configured to sequentially activate column decoder circuit sense lines to record received pulses. Alternatively, in some embodiments, in a two-dimensional mode, a full frame time integration shutter exposure may be supported (e.g., with each successive row of pixels being decoded in parallel).

In one or more of the various embodiments, the transmit and receive ($T_x$-$R_x$) system 3000 may employ color codes to add contrast to enhance stereo decoding. In some of the various embodiments, the transmit and receive ($T_x$-$R_x$) system 3000 may employ fast color switching (e.g., "chameleon mode") to prevent ambiguity when in time-of-flight three-dimensional mode, thereby supporting, for example, three-times higher color voxel detection rates (e.g., FIG. 40).

In one or more of the various embodiments, the system 3000 may selectively and momentarily increase sensitivity of each pixel. For example, the transmit and receive ($T_x$-$R_x$) system 3000 may increase a gain of a decoder circuit that a given pixel connects to. As another example, the transmit and receive ($T_x$-$R_x$) system 3000 may increase gain for pixels in positions that the transmit and receive ($T_x$-$R_x$) system 3000 determines are about to receive light that is most attenuated (e.g., in comparison to light that one or more other pixels are about to receive). In some of the various embodiments, the transmit and receive ($T_x$-$R_x$) system may determine that pixels that receive rays with lowest stereo disparity (e.g., in comparison to stereo disparity of rays that other pixels receive) receive photons that have traveled furthest. In some embodiments, the transmit and receive ($T_x$-$R_x$) system 3000 may amplify signals from those pixels the most in response to this determination to compensate for attenuation due to the distance.

In one or more of the various embodiments, the sensor may have extra sensitive photodiodes (e.g., one or more of Avalanche Photo Diodes (APDs) or Single Photon Avalanche Diodes (SPADs)). In some of the various embodiments, these diodes may be reverse biased. In some embodiments, when triggered by photons, these diodes may avalanche, generating a strong current, and may then be quenched. In some of the various embodiments, the transmit and receive ($T_x$-$R_x$) system 3000 may manage the bias of individual pixels in real-time according to selected sensitivity and gain. In some embodiments, the transmit and receive ($T_x$-$R_x$) system 3000 may vary this bias from pixel-to-pixel over a period less than a microsecond.

In one or more of the various embodiments, a pixel may start out below a critical bias (e.g., keeping bias below APD linear mode). Just before arrival of a first tracer bullet, the transmit and receive ($T_x$-$R_x$) system 3000 may raise the bias to APD linear mode (e.g., close to but below a breakdown voltage) to detect relatively near reflections (e.g., initially for first pixels to be activated, such as, for example, pixels close to a present $d_{max}$ position). In some of the various embodiments, the system 3000 may continue to rapidly increase the bias for pixel positions closer to a &Imposition (than to the $d_{max}$ position) where, for example, even more sensitivity may improve range detection. In some embodiments, the transmit and receive ($T_x$-$R_x$) system 3000 may temporarily raise the bias to Geiger mode. In some of the various embodiments, in Geiger mode (e.g., with reverse bias on a photodiode set above a breakdown regime), the pixel becomes highly unstable. In some embodiments, the transmit and receive ($T_x$-$R_x$) system 3000 may limit operation in the Geiger mode to minimal (or practically minimal) time intervals. For example, the transmit and receive ($T_x$-$R_x$) system 3000 may place a few pixels in Geiger mode at one time and for brief periods (e.g., a hundred or so nanoseconds). As another example, the transmit and receive ($T_x$-$R_x$) system 3000 may make pixel bias a function of both time and position. In some embodiments, the transmit and receive ($T_x$-$R_x$) system 3000 may utilize the Geiger mode to one or more of minimize false detections caused by dark current, increase sensitivity of the sensor, increase a detection range, or avoid interference of ambient light.

In one or more of the various embodiments, the transmit and receive ($T_x$-$R_x$) system 3000 may rapidly vary responsivity of individual pixels to correspond to a certain expected time of flight at each pixel. For example, the transmit and receive ($T_x$-$R_x$) system 3000 may change a photodiode's biasing voltage, and/or selectively enable a pixel to activate the pixel just in time and with an appropriate sensitivity for an expected attenuation.

In one or more of the various embodiments, the transmit and receive ($T_x$-$R_x$) system 3000 may include a rapidly scanning laser beam system. In some of the various embodiments, for a plurality of transmitting scan directions (e.g., tracer bullets fired in multiple directions $\alpha$), pixels in a receiver 3004 may capture photons that arrive from various distances with different incoming directions $\beta$ at different times. In some embodiments, the receiver 3004 may first capture those photons that traversed the shortest distance. The receiver 3004 may next capture photons that traversed greater distances. In some of the various embodiments, the transmit and receive ($T_x$-$R_x$) system 3000 may effectively range gate signals to respond only to light returning after a certain delay. In some embodiments, the transmit and receive ($T_x$-$R_x$) system 3000 may do so to filter out responses that are outside a desired range (e.g., one or more of too close or too far). For example, the transmit and receive ($T_x$-$R_x$) system 3000 may rapidly and dynamically change a bias of a pixel's photodiode circuit.

In one or more of the various embodiments, the transmit and receive ($T_x$-$R_x$) system 3000 may employ a range selection function (e.g., a spatial range selection). In some of the various embodiments, the transmit and receive ($T_x$-$R_x$) system 3000 may employ the range selection function for three-dimensional tracking where, for example, reflections from objects in a certain range (e.g., range $Z_{min}$ to $Z_{max}$) are recorded.

Figure 31:
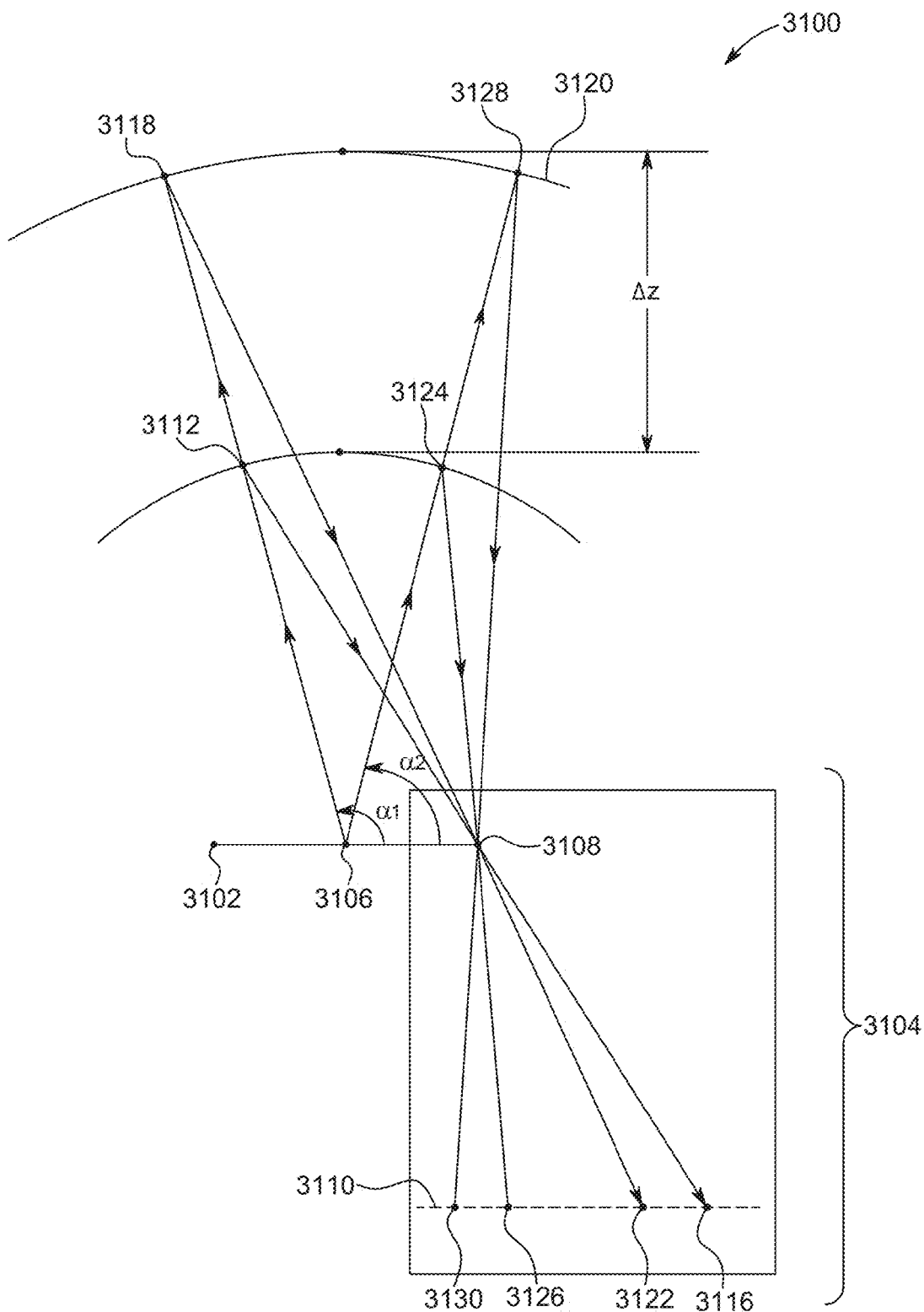
FIG. 31 shows an embodiment of a two-dimensional perspective view of exemplary spatial range selection.

FIG. 31 shows an exemplary transmit and receive system ($T_x$-$R_x$) system 3100. For example, the ($T_x$-$R_x$) system 3100 may be the same as or similar to one or more of those explained above. The ($T_x$-$R_x$) system 3000 may include first and second receivers 3102 and 3104 (FIG. 31 shows the second receiver 3104 in greater detail) and a transmitter 3106. The second receiver 3104 may include an aperture 3108 and a sensor 3110.

In one or more of the various embodiments, the transmitter 3106 transmits a pulse at $t_0$ in direction $\alpha_1$. In some of the various embodiments, the pulse might reflect at a first point 3112 at time $t_1$. In some embodiments, the reflection may arrive at a first pixel 3116 in the sensor 3110 at time $t_1^+$. Alternatively, the same pulse might reflect at a second point 3118 at time $t_2$ and result in a second pixel 3122 capturing the reflection at time $t_2^+$. In some of the various embodiments, the transmit and receive ($T_x$-$R_x$) system 3100 may determine that a difference in $t_{ToF}$ is $\Delta t = \Delta Z$ (or $\Delta R$)/2c. In one or more of the various embodiments, at some time $t_3$, the transmitter 3106 may transmit another pulse in a scan direction $\alpha_2$. The other pulse might reflect at a third point 3124 at time $t_4$. In some of the various embodiments, the reflection may arrive at a third pixel 3126 in the sensor 3110 at time $t_4^+$. Alternatively, the same pulse might reflect at a fourth point 3128 at time is and result in a fourth pixel capturing the reflection at time $t_5^+$. In some embodiments, the transmit and receive ($T_x$-$R_x$) system 3100 may determine that the difference in $t_{ToF}$ is again $\Delta t = \Delta Z$ (or $\Delta R$)/2c. As shown in FIG. 31, by sequentially activating pixels at separate moments within these ranges in the sensor 3110, the transmit and receive ($T_x$-$R_x$) system may provide a range of detection of $\Delta Z$ (or $\Delta R$) (e.g., from an arc on which first and third points 3112 and 3124 reside to a further arc 3120).

Figure 32:
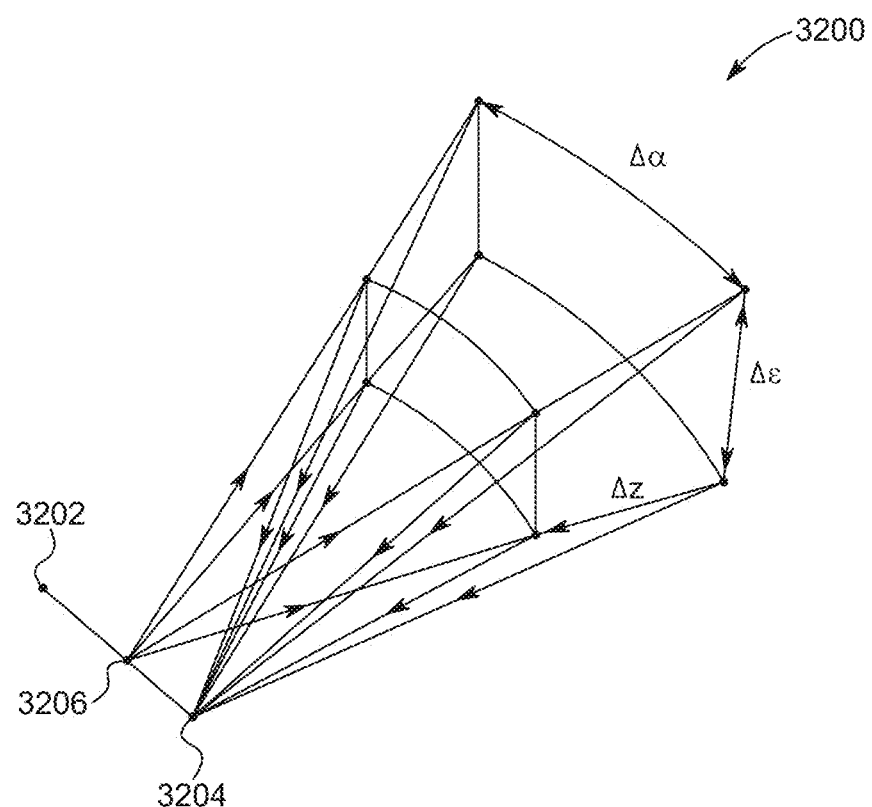
FIG. 32 illustrates an embodiment of a three-dimensional perspective view of exemplary three-dimensional range selection.

FIG. 32 illustrates an exemplary transmit and receive ($T_x$-$R_x$) system 3200 that may be an exemplary three-dimensional tracking system. For example, the transmit and receive ($T_x$-$R_x$) system 3200 may be the same as or similar to one or more of those explained above. In one or more of the various embodiments, the three-dimensional tracking system 3200 may "foveate" on a volumetric three-dimensional subsection of a field-of-view space (e.g., as shown by the three-dimensional range selection, three-axis volumetric space selection). For example, the three-dimensional tracking system 3200 may cause a scanning emitter 3206 to illuminate certain ranges in horizontal ($\Delta\alpha$) and vertical ($\Delta\epsilon$) directions. A stereo pair of first and second receivers 3202 and 3204 may receive reflections of the illumination. As another example, the three-dimensional tracking system may reach a subset of rows ($\Delta Y$) and columns ($\Delta X$) in the second receiver 3204. As a further example, the three-dimensional tracking system 3204 may select a detection range $\Delta Z$. In some of the various embodiments, the three-dimensional tracking system 3204 may select the detection range by sequentially activating narrow sub-bands of pixels within those rows that the three-dimensional tracking system reached.

Figure 33:
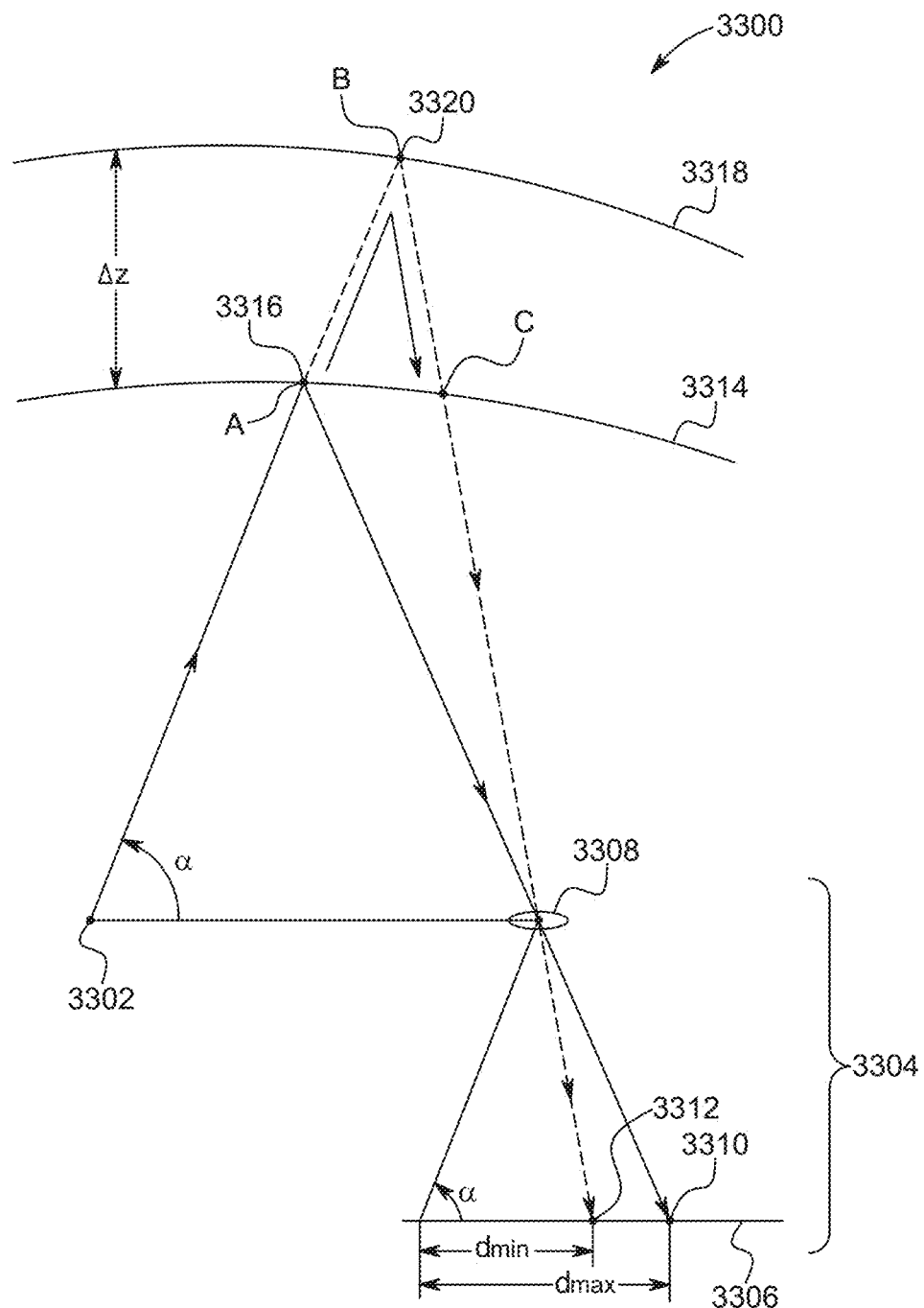
FIG. 33 shows an embodiment of a two-dimensional perspective view of an exemplary transmit and receive ($T_x$-$R_x$) system that manages exemplary pixels to detect and differentiate between exemplary "early birds" and "late stragglers"

FIG. 33 shows an exemplary transmit and receive ($T_x$-$R_x$) system 3300 that manages exemplary pixels. For example, the transmit and receive ($T_x$-$R_x$) system 3300 may be the same as or similar to one or more of those explained above. The transmit and receive ($T_x$-$R_x$) system 3300 may include a transmitter 3302 and a receiver 3304. The receiver 3304 may include a sensor that receives reflections via an aperture 3308. In some of the various embodiments, the sensor 3306 may include one or more rows of pixels. For example, FIG. 33 shows a $row_i$ of pixels in the sensor 3306.

In one or more of the various embodiments, the transmit and receive ($T_x$-$R_x$) system 3300 may bias and set a range of adjacent pixels along the row of pixels to open (e.g., shutter) in a direction of decreasing disparity. In some of the various embodiments, the transmit and receive ($T_x$-$R_x$) system 3300 may sequentially activate sub-pixels with increasingly sensitive detection (e.g., ramping gain) circuitry. In some embodiments, the transmit and receive ($T_x$-$R_x$) system 3300 may initiate a sequential activation by activating a pixel 3310 to detect an object 3316 at a $Z_{min}$ range 3314. In some embodiments, the transmit and receive ($T_x$-$R_x$) system 3300 may terminate the sequential activation after sequentially activating pixels from the pixel 3310 to a pixel 3312 to detect an object 3320 in response to reaching a $Z_{max}$ range 3318. In some embodiments, the transmit and receive ($T_x$-$R_x$) system 3300 may terminate the sequential activation in response to the transmit and receive ($T_x$-$R_x$) system 3300 determining that reflections have ceased being detected. In some embodiments, the transmit and receive ($T_x$-$R_x$) system 3300 may time out.

In some embodiments, the transmit and receive ($T_x$-$R_x$) system 3300 may repeat the above process for a next tracer bullet in response to termination of the sequential activation. For example, the transmit and receive ($T_x$-$R_x$) system 3300 may transmit the next tracer bullet (e.g., adjacent new a, next scan line position) that may cause the next tracer bullet to arrive at the row of pixels when the above process repeats. In some embodiments, the transmit and receive ($T_x$-$R_x$) system 3300 may transmit the next tracer bullet at a time that may cause the next tracer bullet to already be "on its way" (e.g., half of time of flight to travel to target and another half time of flight on its way back) when the transmit and receive ($T_x$-$R_x$) system 3300 captures the prior tracer bullet. In one or more of the various embodiments, the transmit and receive ($T_x$-$R_x$) system 3300 may transmit the next tracer bullet at a time that may cause the next tracer bullet to be separable with regard to the prior tracer bullet from a perspective of the transmit and receive ($T_x$-$R_x$) system 3300 (e.g., unambiguously detectable).

In one or more of the various embodiments, at a certain time $t_i$, first photons may arrive at $row_i$ in the sensor 3306 after having reflected from a surface 3316 at a minimum range $Z_{min}$ 3314. These "early birds" may be photons transmitted recently at to in a certain transmission direction $\alpha_i$. A significant portion of them may return with a maximum disparity $d_{max}$. In some of the various embodiments, at a significantly later time (e.g., up to a microsecond later), $t_j$ ($\Delta t = t_j - t_i = \Delta_{ToF} = 2*\Delta Z/c$, a time of flight of an additional round trip from point A to B and to C as the arrow of FIG. 33 indicates), final photons from the same transmission (in direction $\alpha_i$ and transmitted at the same time $t_0$) may arrive at an entirely different position in the same $row_i$ in the sensor 3306. These "stragglers" may be significantly fewer in proportion to the transmission (e.g., as compared to that proportion for the early birds) and may arrive at a position with smallest disparity (e.g., shifted significantly away from the early arrivals). In some embodiments, arrival time, disparity, and photon fraction may be equally correlated measures of Z distance.

In some of the various embodiments, the transmit and receive ($T_x$-$R_x$) system 3300 may transmit the next tracer bullet at a time that may cause the next tracer bullet's early birds from spurious foreground objects to arrive subsequent to the transmit and receive ($T_x$-$R_x$) system's 3300 accounting for the prior tracer bullet's last stragglers (e.g., the transmit and receive ($T_x$-$R_x$) system 3300 may determine a time of flight for the prior tracer bullet's early birds and/or may determine a time difference in arrival of the prior tracer bullet's early birds and the prior tracer bullet's last stragglers, and the transmit and receive ($T_x$-$R_x$) system 3300 may delay transmitting the next tracer bullet based on one or more of these determined time periods).

In one or more of the various embodiments, the transmit and receive ($T_x$-$R_x$) system 3300 may reduce laser power for a tracer bullet to prevent stragglers. In some of the various embodiments, the transmit and receive ($T_x$-$R_x$) system 3300 may disparity filter (e.g., block) early birds from very close foreground objects (e.g., spurious foreground objects). In some embodiments, the transmit and receive ($T_x$-$R_x$) system 3300 may detect shadows (e.g., missing voxels) in response to partial overlaps between one or more very close foreground objects (e.g., spurious foreground objects) and a foreground target object. For example, the transmit and receive ($T_x$-$R_x$) system 3300 may, while locked onto and ranging the foreground target object, detect a lower "hit" rate with regard to reflections from the foreground target objects (e.g., due to flack, snow, rain, or fog).

Figure 34:
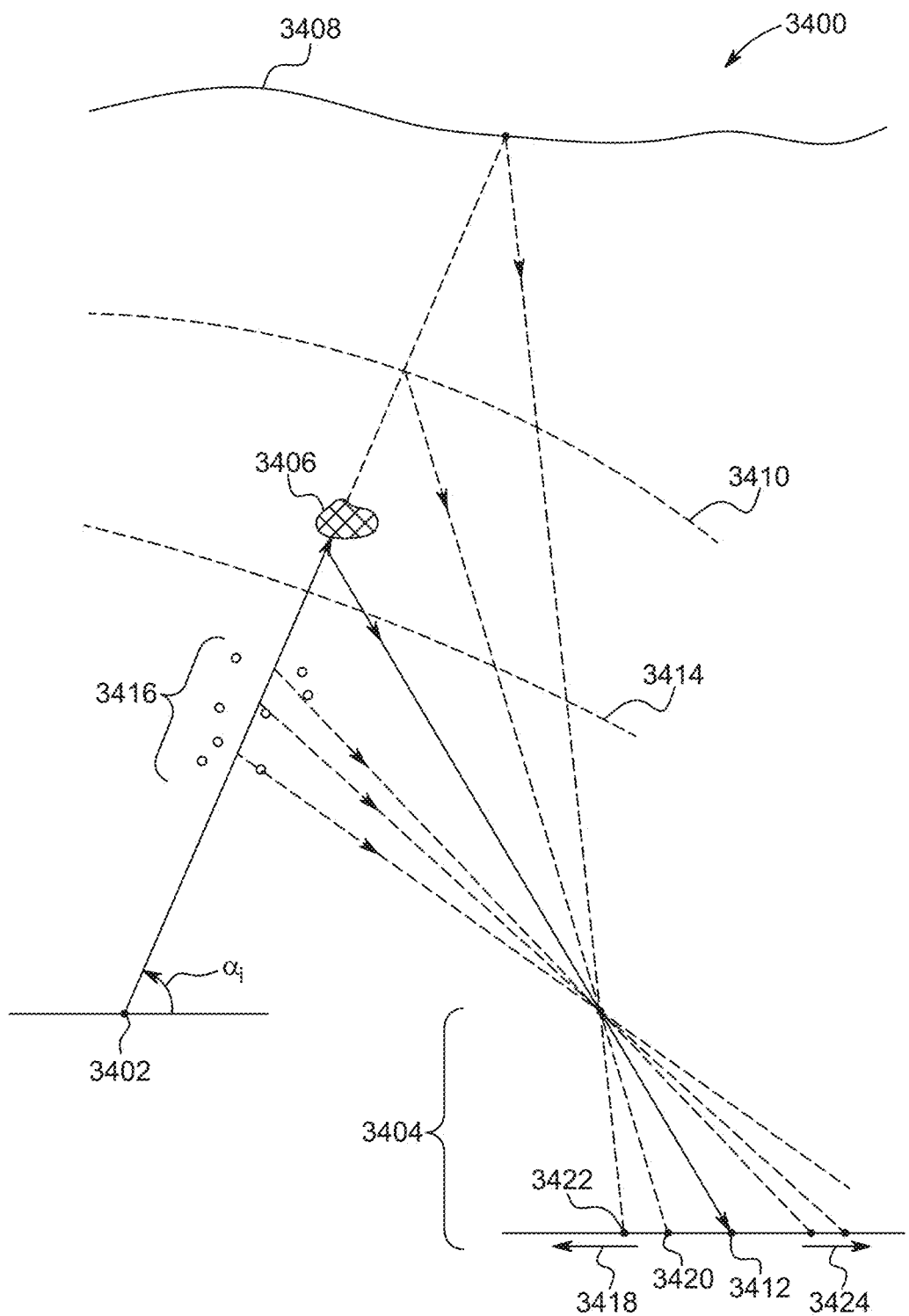
FIG. 34 illustrates an embodiment of a two-dimensional perspective view of an exemplary transmit and receive ($T_x$-$R_x$) system that employs exemplary background elimination and foreground elimination.

FIG. 34 illustrates an exemplary transmit and receive ($T_x$-$R_x$) system 3400. For example, the transmit and receive ($T_x$-$R_x$) system 3400 may be the same as or similar to one or more of those explained above. The transmit and receive ($T_x$-$R_x$) system 3400 may include a transmitter 3402 and a receiver 3404.

In one or more of the various embodiments, the transmit and receive ($T_x$-$R_x$) system 3400 may detect a foreground object 3406 against a background 3408 at a first pixel 3412. In some of the various embodiments, the transmit and receive ($T_x$-$R_x$) system 3400 may "remove" the background 3408. In some embodiments, the transmit and receive ($T_x$-$R_x$) system 3400 may remove the background 3408 by selecting a moderate (but sufficient) intensity for a scanning beam. In some embodiments, the transmit and receive ($T_x$-$R_x$) system 3400 may remove the background 3408 by selecting an appropriate threshold (e.g., a floor) for a receive sensitivity of the receive system 3404 of the transmit and receive ($T_x$-$R_x$) system 3400. In some embodiments, the transmit and receive ($T_x$-$R_x$) system 3400 may remove the background 3408 by "turning off" pixels after a short time-of-flight interval so that light that arrives after this interval may not trigger a detector (e.g., a "twitchy pixel", APD, or SPAD) at a lesser disparity (e.g., pixel locations) beyond the range $d_{min}$. For example, light that reflects off a surface at a distance further than a threshold distance 3410 may arrive at the sensor at one or more pixels in a first direction 3418 of a second pixel 3420. The transmit and receive ($T_x$-$R_x$) system 3400 may not activate pixels that reside in the first direction 3418 of the second pixel 3420 or may ignore signals from those pixels.

In one or more of the various embodiments, small spurious foreground objects 3416 may interfere with an ability of the transmit and receive ($T_x$-$R_x$) system 3400 to detect the foreground object 3406 as shown in FIG. 34. In some of the various embodiments, the transmit and receive ($T_x$-$R_x$) system 3400 may ignore reflections of the scanning beam from the small spurious foreground objects 3416 (e.g., the transmit and receive ($T_x$-$R_x$) system 3400 may eliminate spurious foreground light). In some embodiments, the transmit and receive ($T_x$-$R_x$) system 3400 may ignore (e.g., reject) early arriving photons ("gate crashers") that reflect off surfaces that are closer than a second distance 3414. In some embodiments, the transmit and receive ($T_x$-$R_x$) 3400 system may ignore reflections of the scanning beam from the small spurious foreground objects 3416 by delaying enablement "firing" by pixels until after a certain minimal latency. For example, after the beam transmits in direction cu, the transmit and receive ($T_x$-$R_x$) system 3400 may delay releasing (e.g., biasing) the pixels until after a minimum time-of-flight interval. In some embodiments, the transmit and receive ($T_x$-$R_x$) system 3400 may select a minimum time-of-flight interval that is more than twice a travel time in one direction ($R_{min}/c$). For example, the transmit and receive ($T_x$-$R_x$) system 3400 may prevent activation of pixels that reside in a second direction 3424 of a pixel that would receive a reflection from any object at the second distance 3414 or may ignore signals from those pixels.

In one or more of the various embodiments, the foreground objects 3416 may partially occlude the background, but the transmit and receive ($T_x$-$R_x$) system 3400 may avoid recording foreground image voxels. The above-explained three-dimensional voxel filter may be useful in, for example, rejecting spurious reflections caused by fog, rain, or snow. The above-explained three-dimensional voxel filter may mitigate blinding a sensor of the receive system 3404 and/or overloading one or more of busses, logic, or VPU (Visual Processing Unit) of the transmit and receive ($T_x$-$R_x$) system 3400 with such spurious noisy voxel data.

Figure 35:
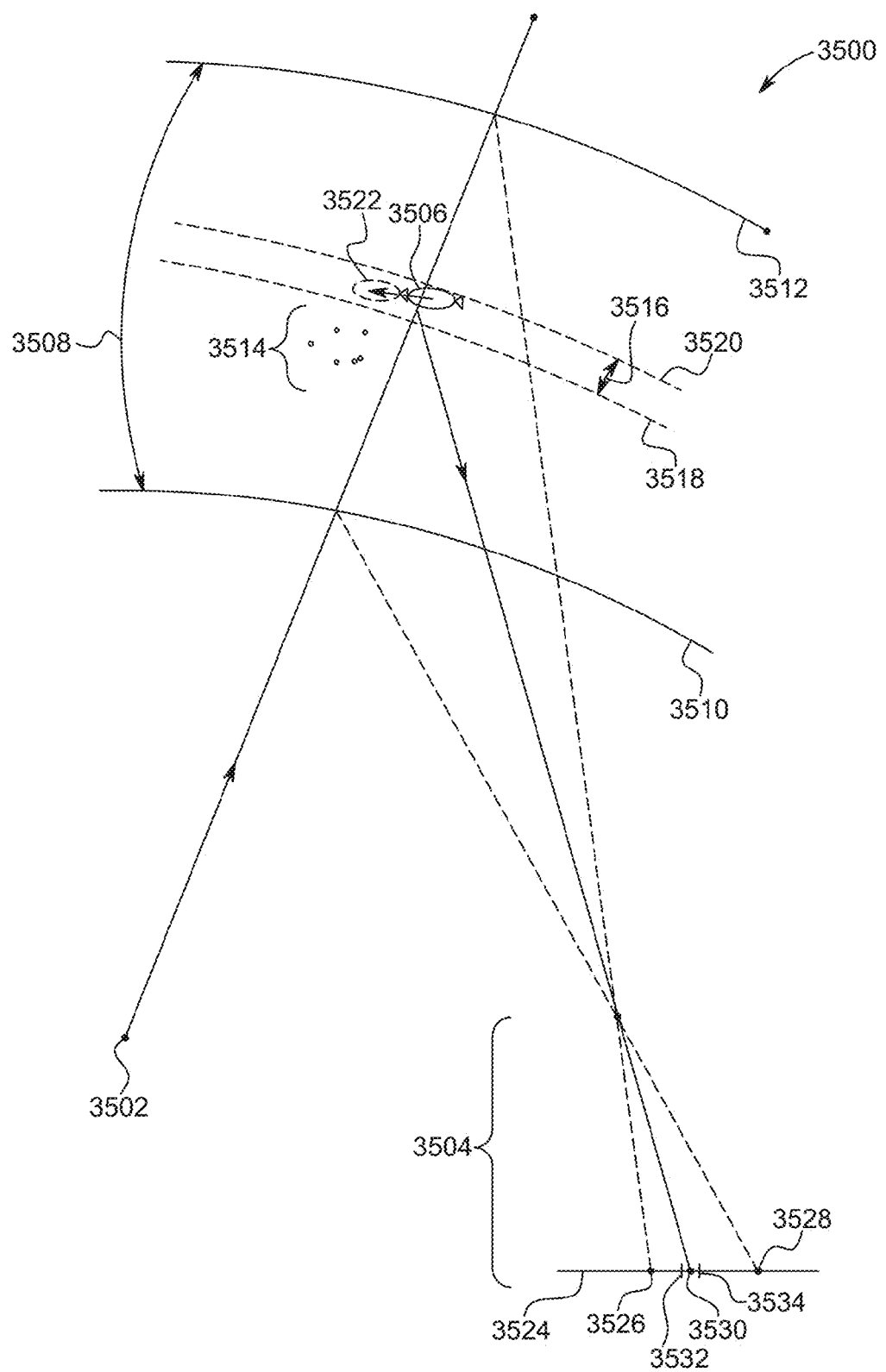
FIG. 35 shows an embodiment of a two-dimensional perspective view of an exemplary transmit and receive ($T_x$-$R_x$) system that Z-locks on an exemplary surface to be mapped.

FIG. 35 shows an exemplary transmit and receive ($T_x$-$R_x$) system 3500 that scans an exemplary relatively clear sky for exemplary projectiles. For example, the transmit and receive ($T_x$-$R_x$) system 3500 may be the same as or similar to one or more of those explained above. In one or more of the various embodiments, the transmit and receive ($T_x$-$R_x$) system 3500 may include a transmitter 3502 and a receiver 3504. In some of the various embodiments, the transmit and receive ($T_x$-$R_x$) system 3500 may Z-lock onto a surface to be mapped. In some of the various embodiments, the transmit and receive ($T_x$-$R_x$) system 3500 may Z-lock onto a surface to be mapped in high resolution or for robust tracking of a high-speed moving object 3506.

In one or more of the various embodiments, the transmit and receive ($T_x$-$R_x$) system 3500 may time-gate a subset of pixels in a sensor 3524 of the receive system 3504. In some of the various embodiments, the transmit and receive ($T_x$-$R_x$) system 3500 may time-gate the subset of pixels to be open for a limited range 3508 of Z (e.g., for a 500 ft. Z-range). In some embodiments, the transmit and receive ($T_x$-$R_x$) system 3500 may select the Z-range 3508 for scanning a volume of sky above a suspected missile launch site to be monitored (e.g., at 5000 feet distance where the range may be 10% of the total distance).

In one or more of the various embodiments, the transmit and receive ($T_x$-$R_x$) system 3500 may, during each scan, set each pixel in the sensor 3524 to open for a given time period (e.g., a few nanoseconds) at a sufficient range of pixel disparities (e.g., from a first pixel 3526 that corresponds to a far range 3512 through a second pixel 3528 that corresponds to a near range 3510) and over a sufficient time-of-flight range. In some of the various embodiments, the transmit and receive ($T_x$-$R_x$) system 3500 may confine detection to a trail of nanosecond sequentially shuttered active pixels, following an image of the scan beam trajectory in the sensor 3524. In some embodiments, the transmit and receive ($T_x$-$R_x$) system 3500 may (e.g., when the transmit and receive ($T_x$-$R_x$) system 3500 activates the pixels) set a sensitivity of the pixels to an appropriate gain for the selected range 3508.

In one or more of the various embodiments, the transmit and receive ($T_x$-$R_x$) system 3500 may detect the object 3506 in response to the first reflected photons arriving at a pixel 3530. In some of the various embodiments, the transmit and receive ($T_x$-$R_x$) system 3500 may (e.g., in detecting the object 3506) precisely observe disparity (e.g., pixel shift $d_i$) and time (e.g., ToF, delay) for the first reflected photons. In some embodiments, the transmit and receive ($T_x$-$R_x$) system 3500 may instantly (or practically instantly) calculate an exact (or practically exact) range. In some embodiments, the transmit and receive ($T_x$-$R_x$) system 3500 may adjust one or more of sensitivity, disparity (e.g., by reducing a range of utilized pixels to those from a third pixel 3532 that corresponds to a first middle distance 3520 to a fourth pixel 3534 that corresponds to a second middle distance 3518), or time-of-flight ranges based on that detected position. For example, the transmit and receive ($T_x$-$R_x$) system 3500 may optimize one or more of the sensitivity, disparity, or time-of-flight ranges to a minimal envelope 3516 around that detected position. In some embodiments, the transmit and receive ($T_x$-$R_x$) system 3500 may set the scan beam to a corrected power level, may set a gain of the sensor, may set the disparity, and may set pixel timing (e.g., each based on that detected position). In some embodiments, the transmit and receive ($T_x$-$R_x$) system 3500 may, given repeated successful detections, predict (e.g., estimate) a trajectory 3522 more and more accurately. In some embodiments, the transmit and receive ($T_x$-$R_x$) system 3500 may track and increasingly lock onto the missile. In one or more of the various embodiments, the transmit and receive ($T_x$-$R_x$) system 3500 may employ one or more portions of this method help ignore chaff or other objects ($O_{sf}$) 3514 that a party may deliberately launched to confuse conventional RADAR or LIDAR systems. In some of the various embodiments, the transmit and receive ($T_x$-$R_x$) system 3500 may employ one or more portions of this method to better track the objects when they are partially or temporally occluded by other objects.

In one or more of the various embodiments, the transmit and receive ($T_x$-$R_x$) system 3500 may, when the transmit and receive ($T_x$-$R_x$) system 3500 locks onto a surface, set a sharper, narrower acceptance margin for each successive (e.g., adjacent in time and space) pixel set to detect the next tracer bullet reflection. In some of the various embodiments, the transmit and receive ($T_x$-$R_x$) system 3500 may reduce an active window of acceptable time-of-flight and disparity ranges. For example, the transmit and receive ($T_x$-$R_x$) system 3500 may focus on detecting objects of interest that have dimensions of 10 feet or less. In such an example, the transmit and receive ($T_x$-$R_x$) system 3500 may set a 20 ns time-of-flight margin and a few pixels of disparity around predicted next locations.

In one or more of the various embodiments, the transmit and receive ($T_x$-$R_x$) system 3500 may, in making this prediction, consider relative motion between an observer and the tracked object (e.g., by Kalman filtering techniques predicting the object's three-dimensional motion trajectory). In some of the various embodiments, the transmit and receive ($T_x$-$R_x$) system 3500 may, when the transmit and receive ($T_x$-$R_x$) system 3500 has acquired such a surface, automatically "unlock" when locked tracking has failed. For example, the transmit and receive ($T_x$-$R_x$) system 3500 may, when the transmit and receive ($T_x$-$R_x$) system 3500 has acquired such a surface, automatically "unlock" after the scan fails to detect adjacent voxels (e.g., if the transmit and receive ($T_x$-$R_x$) system 3500 fails to detect tracer bullet reflections inside a narrower window).

In one or more of the various embodiments, the transmit and receive ($T_x$-$R_x$) system 3500 may, by employing one or more portions of the above-explained method, lock onto multiple objects at different Z-ranges and/or at different positions in the field of view. In some of the various embodiments, the transmit and receive ($T_x$-$R_x$) system 3500 may, by employing one or more portions of the above-explained method, lock onto multiple objects at different Z-ranges and/or at different positions in the field of view within the same scan. In some embodiments, the transmit and receive ($T_x$-$R_x$) system 3500 may, by employing one or more portions of the above-explained method, lock onto multiple objects at different Z-ranges and/or at different positions in the field of view with pixels in a sensor line individually preset to each of a plurality of narrower lock-on ranges (e.g. as shown in one or more of FIG. 39 or 40). In one or more of the various embodiments, the transmit and receive ($T_x$-$R_x$) system 3500 may reset to a wider search range between objects to detect new, previously undetected objects.

Figure 36:
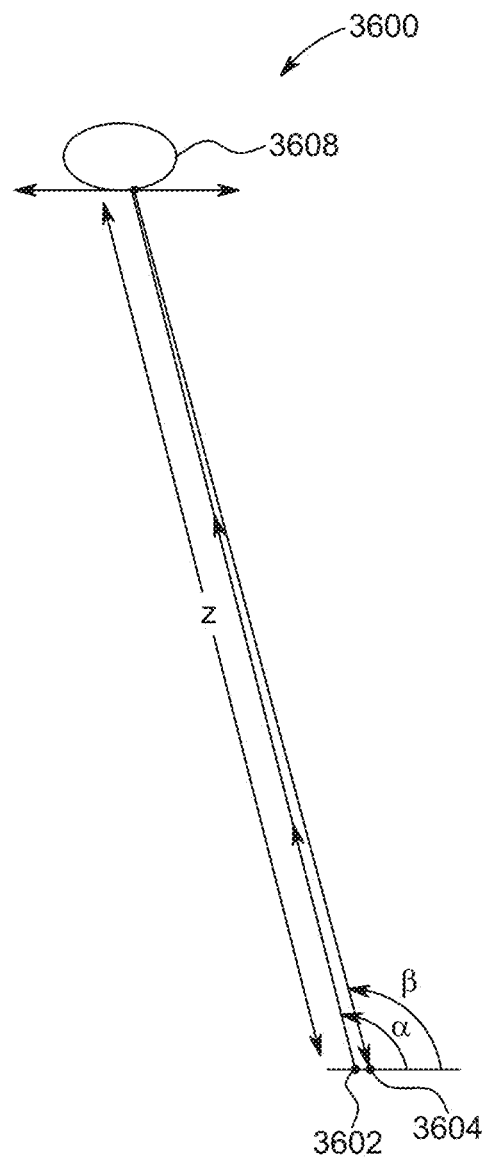
FIG. 36 illustrates an embodiment of an exemplary two-dimensional LIDAR system that uses exemplary small range expectation and location determinism to range lock and shutter exemplary successive incoming photons.

FIG. 36 illustrates an exemplary transmit and receive ($T_x$-$R_x$) system 3600 that may be an exemplary fast pixel sequential scanning LIDAR system. For example, the transmit and receive ($T_x$-$R_x$) system 3600 may be the same as or similar to one or more of those explained above. In one or more of the various embodiments, the transmit and receive ($T_x$-$R_x$) system 3600 may include a transmit system 3602 and a receive system 3604. In some of the various embodiments, the transmit system 3602 may be arranged at a position that may be close to a position of the receive system 3604. In some embodiments, the transmit system 3602 and the receive system 3604 may be positioned on the same axis as each other. In some embodiments, the transmit system 3602 and the receive system 3604 may be optically combined.

In one or more of the various embodiments, the transmit system 3602 may fire at time $t_d$ (departure) in direction $\alpha$. In some of the various embodiments, the receive system 3604 may, after time of flight (e.g., x nanoseconds) subsequent to time $t_d$, receive a reflected signal off an object 3608 at $t_a$ (arrival). In some embodiments, the receive system 3604 may detect the reflected signal as having come from direction $\beta$. In one or more of the various embodiments, the transmit and receive ($T_x$-$R_x$) system 3600 may estimate a duration that photons of the reflected signal were in flight. In some of the various embodiments, the transmit and receive ($T_x$-$R_x$) system 3600 may make this estimation based on presumptions that D is zero (or nearly zero) and that $\alpha$ is equal (or approximately equal) to $\beta$. For example, the transmit and receive ($T_x$-$R_x$) system 3600 may make this estimation based on a determined place (e.g., column) that the photons arrived and a determined time of arrival for the photons in the sensor. In one or more of the various embodiments, the transmit and receive ($T_x$-$R_x$) system 3600 may know, for each incoming direction $\beta$, the departure time in the corresponding direction $\alpha$ ($=\beta$) during the most recent scan. In some embodiments, the transmit and receive ($T_x$-$R_x$) system 3600 may be fast enough to employ a continuously illuminated laser scanning beam because each instantaneous transmit direction $\alpha$ may be determined after detection of a reflection (for example, by correlating the direction $\alpha$ with an observed return direction $\beta$ of the detected reflection). In some of the various embodiments, the receive system 3604 may record the arrival time and the time of flight. In some embodiments, the transmit and receive ($T_x$-$R_x$) system 3600 may calculate a range R based on $R=c(t_a-t_d)/2$.

In one or more of the various embodiments, the transmit and receive ($T_x$-$R_x$) system 3600 may employ fast scanning (e.g., 50 kHz). In some of the various embodiments, the transmit and receive ($T_x$-$R_x$) system 3600 may, while employing the fast scanning, correlate every $100^{th}$ of a degree with a nanosecond. For example, the transmit and receive ($T_x$-$R_x$) system 3600 may use "twitchy pixel" or SPAR receiver with 10,000 columns to do so.

In one or more of the various embodiments, the transmit and receive ($T_x$-$R_x$) system 3600 may include a single line (e.g., linear sensor) receiver. In some of the various embodiments, the transmit and receive ($T_x$-$R_x$) system 3600 may include a tilting mirror that rotates the scan in a vertical direction. In some embodiments, an "anti-epsilon mirror" of the receive system 3604 may match an epsilon (e.g., elevation) mirror of the transmit system 3602. In some embodiments, the transmit and receive ($T_x$-$R_x$) system 3600 may range lock by reducing an active pixel sub-window during the scan.

In one or more of the various embodiments, the transmit and receive ($T_x$-$R_x$) system 3600 may use one or more of small range expectation or location determinism to range lock incoming photons. In some of the various embodiments, the transmit and receive ($T_x$-$R_x$) system 3600 may use one or more of small range or location determinism to shutter successive incoming photons. In some embodiments, the transmit and receive ($T_x$-$R_x$) system 3600 may lock onto and range a three-dimensional surface with a particular volume.

In one or more of the various embodiments, the transmit and receive ($T_x$-$R_x$) system 3600 may utilize a lack of disparity (e.g., a lack of ambiguity due to "Z/d pixel overlap"). In some of the various embodiments, the transmit and receive ($T_x$-$R_x$) system 3600 may map pixel positions in a row (e.g., column numbers) directly into field-of-view positions. In some embodiments, the transmit and receive ($T_x$-$R_x$) system 3600 may provide fast scanning (e.g., via a 50 kHz resonant MEMS mirror). For example, the transmit and receive ($T_x$-$R_x$) system 3600 may provide scanning at one nanosecond per voxel. In one or more of the various embodiments, the transmit and receive ($T_x$-$R_x$) system 3600 may achieve such fast scanning by reducing the detection range to, for example, 10 feet (e.g., auto-lock on a surface). In some of the various embodiments, the transmit and receive ($T_x$-$R_x$) system 3600 may, in response to reducing the range, simultaneously fire multiple column decoders. For example, the transmit and receive ($T_x$-$R_x$) system 3600 may drive the column decoders via twitchy pixels, APDs, or SPADs.

Figure 37:
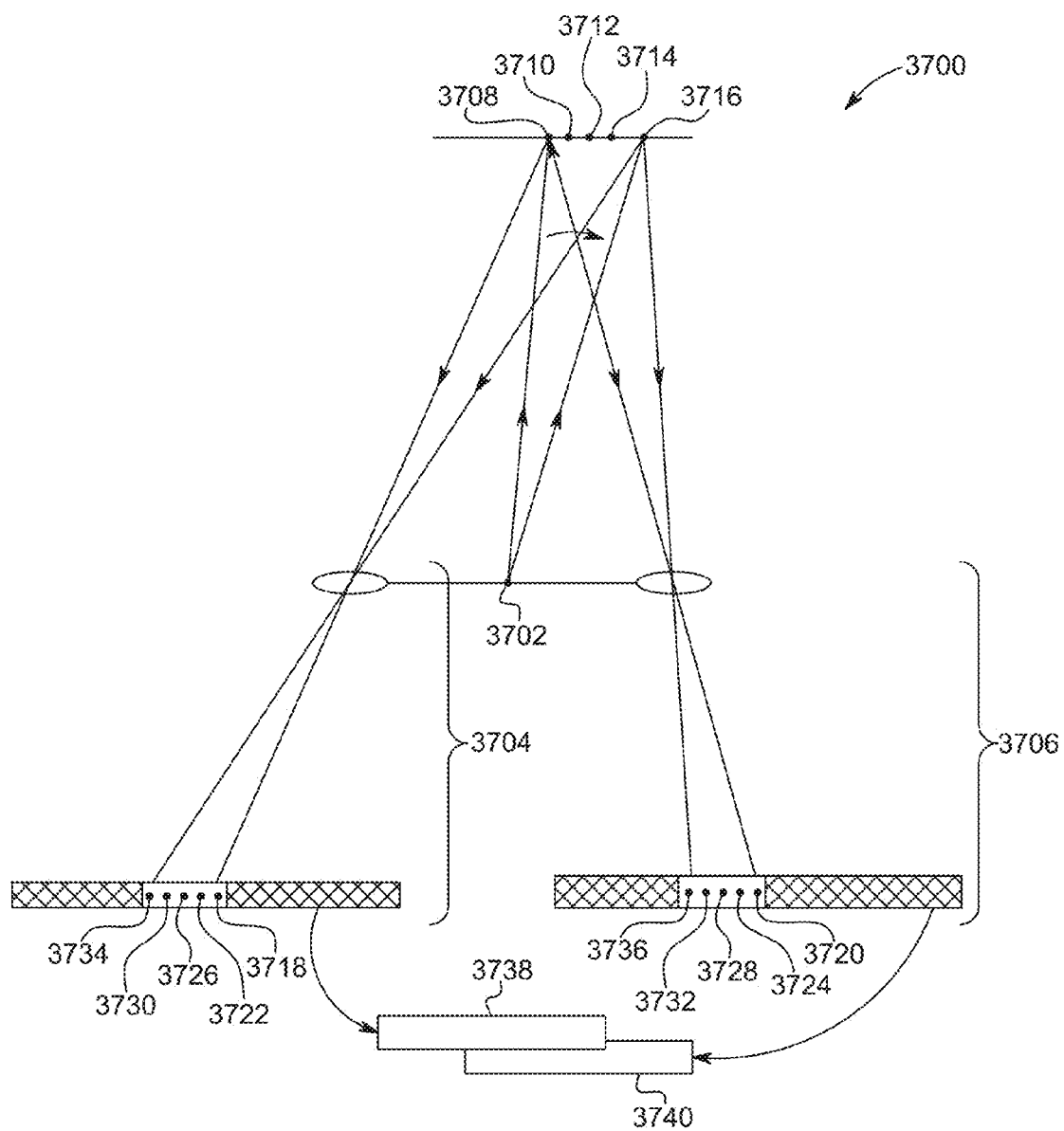
FIG. 37 shows an embodiment of an exemplary assisted stereo scanning system with an exemplary fast sliding register-logic epipolar parallel stereo matching system.

FIG. 37 shows an exemplary transmit and receive ($T_x$-$R_x$) system 3700 (e.g., an exemplary assisted stereo scanning system) with an exemplary fast sliding window logic epipolar parallel stereo decoder. For example, the transmit and receive ($T_x$-$R_x$) system 3700 may be the same as or similar to one or more of those explained above. In one or more of the various embodiments, the transmit and receive ($T_x$-$R_x$) system 3700 may include a transmitter 3702, a first receiver 3704, and a second receiver 3706. In some of the various embodiments, the two receivers 3704 and 3706 may be properly aligned in a pure rectified epipolar arrangement. In some embodiments, the two receivers 3704 and 3706 may compensate for lens effects (e.g., via their alignment). In some embodiments, the transmit and receive ($T_x$-$R_x$) system 3700 may include a sliding register comparator that may find stereo pair pixel correspondences (e.g., based on the alignment of the two receivers 3704 and 3706).

In one or more of the various embodiments, the transmit system 3702 may project DeBruijn color codes (e.g., 7 possible binary colors $2^3$−1: RGBCMY&W). FIG. 37 shows the color codes as decimal numbers 1-7 for clarity. In some of the various embodiments, an object may reflect the code "14527". For example, the "1" may reflect off a first portion 3708 of the object. The "4" may reflect off a second portion 3710 of the object. The "5" may reflect off a third portion 3712 of the object. The "2" may reflect off a fourth portion 3714 of the object. The "7" may reflect off a fifth portion 3716 of the object. In some embodiments, left and right cameras of the two receivers 3704 and 3706 may see these codes in reverse (e.g., as "72541") (assuming no occlusions). For example, a first pixel 3718 and a second pixel 3720 may receive the reflection of the "1". A third pixel 3722 and a fourth pixel 3724 may receive the reflection of the "4". A fifth pixel 3726 and a sixth pixel 3728 may receive the reflection of the "5". A seventh pixel 3730 and an eighth pixel 3732 may receive the reflection of the "2". A ninth pixel 3734 and a tenth pixel 3736 may receive the reflection of the "7".

In one or more of the various embodiments, the transmit and receive ($T_x$-$R_x$) system 3700 may estimate a distance to a surface of the object based on the color code. In some of the various embodiments, the transmit and receive ($T_x$-$R_x$) system 3700 may estimate a disparity of codes (e.g., colors) that match between the left camera and the right camera. In some embodiments, the transmit and receive ($T_x$-$R_x$) system 3700 may, due at least in part to the rectified epipolar alignment, look up a given code captured in the left camera with a matching code in the right camera and then determine a magnitude of pixel disparity between the matched (e.g., identical) codes. For example, the left and right cameras may include 4K sensors with 1 micron pixels (e.g., 4 mm array width). As explained above with regard to FIG. 30 (e.g., using the formula d/f=D/Z), the transmit and receive ($T_x$-$R_x$) system 3700 may determine that, if the disparity between codes is 100 pixels (e.g., 100 micron) and a focal length of the left and right cameras is 10 mm, d/f=1/100. The transmit and receive ($T_x$-$R_x$) system 3700 may also determine that, if a baseline distance between the left and right cameras is 3 feet, Z is 100×3 feet=300 feet.

In one or more of the various embodiments, the transmit and receive ($T_x$-$R_x$) system 3700 may include an assisted stereo scanning system. The assisted stereo scanning system may, for example, project five sequential De Bruijn colors on a back of a truck in a few nanoseconds. In some of the various embodiments, the left and right cameras may each have rolling shutters. In some embodiments, the rolling shutters of the left camera may be synchronized with the rolling shutters of the right camera. In some embodiments, the transmit and receive ($T_x$-$R_x$) system 3700 may include store the captured codes for each of the left and right cameras.

For example, the transmit and receive ($T_x$-$R_x$) system 3700 may include one or more hardware registers that store binary equivalents of each captured color (for simplicity, FIG. 37 shows decimals 1-7 instead of 001, 010, 011, 100, 101, 110, 111). In some embodiments, the transmit and receive ($T_x$-$R_x$) system 3700 may exclude a binary combination of 000 (e.g., black). In one or more of the various embodiments, the transmit and receive ($T_x$-$R_x$) system 3700 may, after storing a quantity of color codes that equates to an expected length of the codes (e.g., 20 microseconds after), reading the two synchronized rolling shutters. For example, the transmit and receive ($T_x$-$R_x$) system 3700 may read two hardware registers 3738 and 3740 after (e.g., 20 microseconds after) the two hardware registers fill up with the binary equivalents of the captured codes. In one or more of the various embodiments, the transmit and receive ($T_x$-$R_x$) system 3700 may compare values of $row_i$ of the left camera to values of equivalent $row_i$ in the right camera.

In one or more of the various embodiments, the code (e.g., "72541") may occur in a same row I of both of the left and right cameras. In some of the various embodiments, the transmit and receive ($T_x$-$R_x$) system 3700 may load both of these left and right versions of the same row I into respective registers 3738 and 3740. In some embodiments, the transmit and receive ($T_x$-$R_x$) system 3700 may load the right version of the row I into the respective register with an offset (e.g., a pixel shift) of a particular amount (e.g., $d_{max}$). In one or more of the various embodiments, the transmit and receive ($T_x$-$R_x$) system 3700 may subtract the register 3740 of the right camera from the register 37338 of the left camera. In some of the various embodiments, the transmit and receive ($T_x$-$R_x$) system 3700 may determine matches or, additionally or alternatively, "near-matches" (e.g., where the transmit and receive ($T_x$-$R_x$) system 3700 determines that a difference for shifted positions falls below a certain threshold). For example, the transmit and receive ($T_x$-$R_x$) system 3700 may determine that a match (or near-match) exists when a comparison of the two registers 3738 and 3740 results in zeros (e.g., "00000"). In some embodiments, the transmit and receive ($T_x$-$R_x$) system 3700 may record the determined matches (or near-matches) with a present pixel shift (e.g., disparity for those matches). In one or more of the various embodiments, the transmit and receive ($T_x$-$R_x$) system 3700 may then left-shift values in the right register 3740 (e.g., toward lower disparity) and repeat the process. In some of the various embodiments, the transmit and receive ($T_x$-$R_x$) system 3700 may shift one or more of the registers 3738 and 3740 multiple times prior to determining whether a match (or near-match) exists (e.g., to align the two "72541" codes as shown in FIG. 37).

In one or more of the various embodiments, the transmit and receive ($T_x$-$R_x$) system 3700 may provide very fast stereo matching (e.g., more than fast enough to support a 4K stereo decoder at up to 1 million lines per second). In some of the various embodiments, the transmit and receive ($T_x$-$R_x$) system 3738 and 3740 may include two 4K cameras (e.g., each with 4K by 2K pixels=8 million pixels each). In some embodiments, the transmit and receive ($T_x$-$R_x$) system 3738 and 3740 may decode, for example, 250 k lines per second (e.g., providing 125 frames at 4K resolution per second in full color=8M RBG voxels/frame, or rates up to 1 Giga voxels per second).

In one or more of the various embodiments, the transmit and receive ($T_x$-$R_x$) system 3700 may, even though each row in the sensor may contain, for example, 4000 pixel values, consider a certain subrange of potential disparities (e.g., $d_{min}$ to $d_{max}$). For example, the transmit and receive ($T_x$-$R_x$) system 3700 may have 40 degrees of view with 4K pixels across the field of view (e.g., 100 pixels per degree). In the case of this example, the transmit and receive ($T_x$-$R_x$) system 3700 may, for 1) a baseline offset of 3 feet between the left and right cameras, 2) a 10 mm focal length, and 3) a depth range of 200' $Z_{min}$ to 400' $Z_{max}$, consider range disparities of 150 pixels to 75 pixels (e.g., $d_{max}$ and $d_{min}$ respectively) (e.g., a net 75 pixels). In the case of this example, the transmit and receive ($T_x$-$R_x$) system 3700 may shift the values in the hardware registers 75 times to find possible matches in this range. In one or more of the various embodiments, the transmit and receive ($T_x$-$R_x$) system 3700 may, where implementing the registers 3738 and 3740 in hardware, do so in 75 clocks (e.g., 75 ns with a 1 GHz system). In some of the various embodiments, the transmit and receive ($T_x$-$R_x$) system 3700 may take less than a microsecond to find matches in the pixels. For example, the transmit and receive ($T_x$-$R_x$) system 3700 may subtract the right register 3740 with the right sensor pixel values from the left register 3738 with the left sensor pixel values and increment a lateral shift by one pixel 75 times. In some embodiments, the transmit and receive ($T_x$-$R_x$) system 3700 may start at maximum disparity and work towards minimum disparity.

In one or more of the various embodiments, the transmit and receive ($T_x$-$R_x$) system 3700 may include one or more memories that store code that, when one or more processors of the transmit and receive ($T_x$-$R_x$) system 3700 execute the code, perform the above process. An example of such code is as follows.

(STEP 0)
Load Rd values $row_i$ in to $reg_L$ (4 k pixel_values)
Load Rxr values $row_i$ in to $reg_R$ (4 k pixel_values)
Set d to d=$d_{max}$
(STEP 1) Offset $reg_R$ d pixels from $reg_L$ (See, e.g., FIG. 37)
Subtract non-zero values from each other in each column
If difference is zero,
OR, optionally, if difference is below noise threshold.
Then for those pixels note the disparity value
AND, optionally, with a confidence value base on the difference
Decrement the disparity d by one pixel
And repeat step 1 until d=$d_{min}$
All pixels with non zero values should have a disparity value
(Optionally with a confidence value, based on the smallest mismatch)
Repeat this procedure (Step 0) for each row.

In one or more of the various embodiments, the transmit and receive ($T_x$-$R_x$) system 3700 may read a row in one of the cameras in about 10-20 microseconds. In some of the various embodiments, the transmit and receive ($T_x$-$R_x$) system 3700 may take less than 1 microseconds (e.g., 1000 clocks @ 1 GHz) to run the above process in hardware. In some embodiments, the transmit and receive ($T_x$-$R_x$) system 3700 may stream the two receiver outputs through a hardware block that extracts best possible pixel matches in real time. For example, the transmit and receive ($T_x$-$R_x$) system 3700 may stream the two receiver outputs sequentially, row by row at up to 100 fps. In some embodiments, the transmit and receive ($T_x$-$R_x$) system 3700 may compute all of the Z values with minimal (or practically minimal) latency. In one or more of the various embodiments, the transmit and receive ($T_x$-$R_x$) system 3700 may be a very fast assisted stereo hybrid LIDAR system.

In one or more of the various embodiments, the transmit and receive ($T_x$-$R_x$) system 3700 may include a pair of high resolution sensors, combined with a fast pixel sequential scanning system in an epipolar arrangement as explained above. In some of the various embodiments, the transmit and receive ($T_x$-$R_x$) system 3700 can detect, localize, and track, for example, as many as 1 billion color voxels per second. In some embodiments, the system may triangulate two contrast enhanced video streams in hardware. In some embodiments, the transmit and receive ($T_x$-$R_x$) system 3700 may, with scanning laser illumination, track high-speed objects without blur and with great contrast. In some embodiments, the transmit and receive ($T_x$-$R_x$) system 3700 may provide high-resolution color three-dimensional images and highly accurate motion trajectories. In some embodiments, the transmit and receive ($T_x$-$R_x$) system may, using tight control over gain, using tight control over sensitivity, and using ultra-short activation of individual pixels, track while remaining highly robust to ambient light.

FIG. 38 shows an exemplary transmit and receive ($T_x$-$R_x$) system 3800 that may sequentially set and activate exemplary pixels. For example, the transmit and receive ($T_x$-$R_x$) system 3800 may be the same as or similar to one or more of those explained above. In one or more of the various embodiments, the transmit and receive ($T_x$-$R_x$) system 3800 may include a transmitter 3802 and a receiver 3804. The receiver 3804 may include a sensor 3806. The receiver 3804 may set a gain amplitude 3808 that may be different for different pixels of the sensor 3806. For example, the receiver 3804 may set the gains based on a gain envelope 3810. In one or more of the various embodiments, the receiver 3804 may set a first gain amplitude 3812 for a first pixel 3814, a second gain amplitude 3816 for a second pixel 3818, and a third gain amplitude 3820 for a third pixel 3822.

In one or more of the various embodiments, the receiver 3804 may sequentially set the gains 3812, 3816, and 3820 in the individual pixels 3814, 3818, and 3822. In some of the various embodiments, the transmit and receive ($T_x$-$R_x$) system 3800 may sequentially set and activated the pixels 3814, 3818, and 3822 by setting the gains 3812, 3816, and 3820 at times $t_1$, $t_2$, $t_3$ respectively. In some embodiments, the transmit and receive ($T_x$-$R_x$) system 3800 may employ smart system logic. For example, the transmit and receive ($T_x$-$R_x$) system 3800 may expect a photon signal to arrive at one of the pixels 3814, 3818, and 3822 at a given moment in time as explained above (e.g., a reflection from a first position 3824 may arrive prior to a reflection from a second position 3826, which may arrive prior to a reflection from a third position 3828). In one or more of the various embodiments, the transmit and receive ($T_x$-$R_x$) system 3800 may activate successive pixels in accordance with such expectation. In some of the various embodiments, the transmit and receive ($T_x$-$R_x$) system 3800 may compensate for an expected attenuation (e.g., based on incremental Z values when stepping through each successive pixel). For example, the transmit and receive ($T_x$-$R_x$) system 3800 may apply a ramping gain function GR(t) to determine the envelope 3810, ramping the gains 3812, 3816, and 3820 rapidly in time as a function time ($t_{ToF}$).

Figure 39:
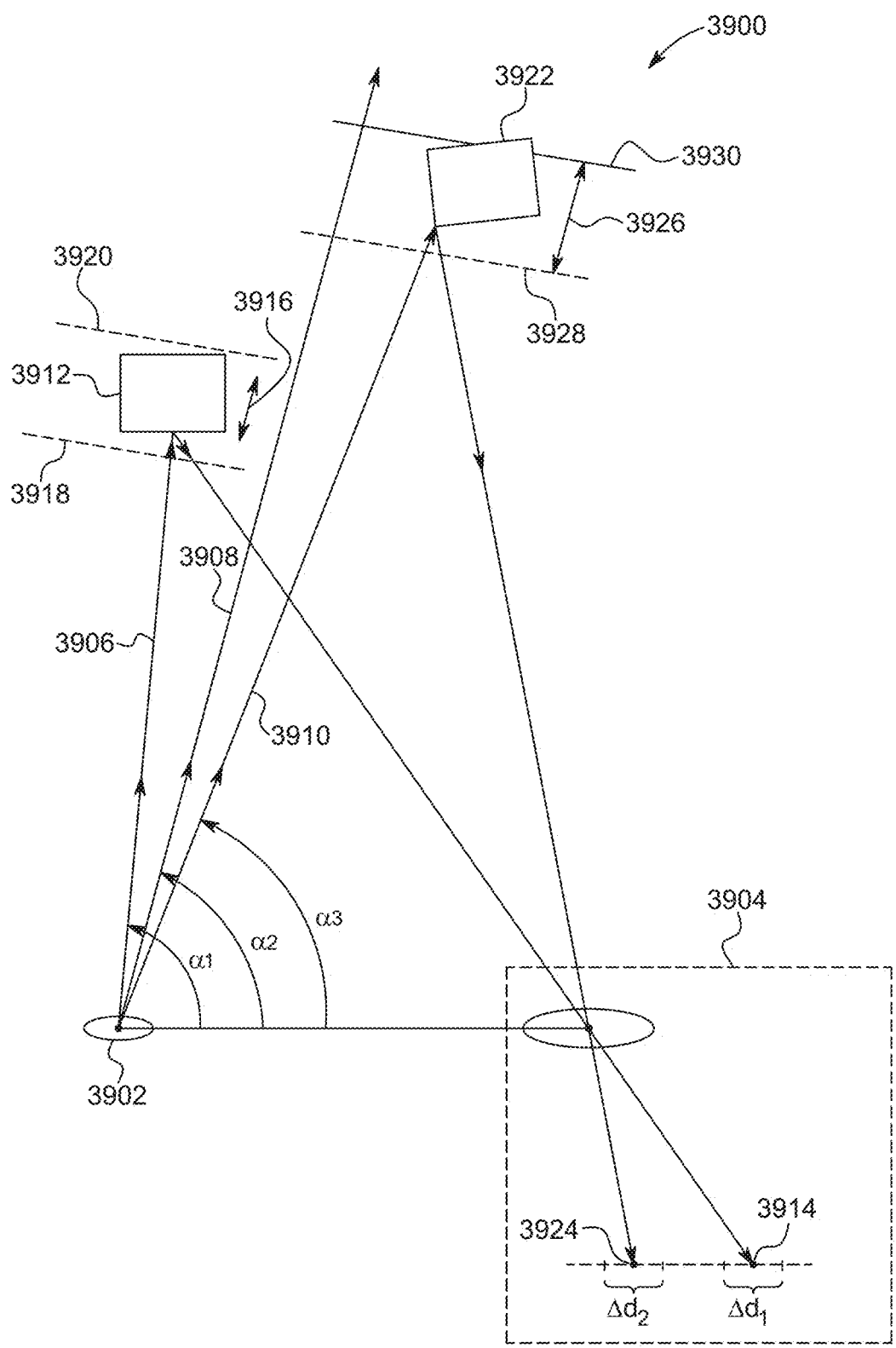
FIG. 39 illustrates an embodiment of a two-dimensional perspective of an exemplary transmit and receive ($T_x$-$R_x$) system that employs successive exemplary rays to obtain exemplary corresponding disparities.

FIG. 39 illustrates an exemplary transmit and receive ($T_x$-$R_x$) system 3900 that may employ successive exemplary rays to obtain exemplary corresponding disparities. For example, the transmit and receive ($T_x$-$R_x$) system 3900 may be the same as or similar to one or more of those explained above. In one or more of the various embodiments, the transmit and receive ($T_x$-$R_x$) system 3900 may include a transmitter 3902 and a receiver 3904. In some of the various embodiments, the transmitter 3902 may successively emit a first beam 3906 at a first scan angle α1, a second beam 3908 at a second scan angle $α_2$, and a third beam 3910 at a third scan angle α3.

In one or more of the various embodiments, the first beam 3906 may reflect from a first object 3912. A first pixel 3914 of the receiver 3904 may capture the deflection of the first beam 3906. In some embodiments, the transmit and receive ($T_x$-$R_x$) system 3900 may set a small range of disparities $Δd_1$ (e.g., that corresponds to a depth range 3916 from a first distance 3918 to a second distance 3920) around pixels in the sensor in the receiver 3904. The second beam 3908 may miss, and the transmit and receive ($T_x$-$R_x$) system 3900 may fail to capture a reflection of the second beam 3908. The third beam 3910 may hit and deflect off a second object 3922. A second pixel 3924 of the receiver 3904 may capture the reflection of the third beam 3910. In some embodiments, the transmit and receive ($T_x$-$R_x$) system 3900 may set a range of disparities $Δd_2$ (e.g., that corresponds to a depth range 3926 from a third distance 3928 to a fourth distance 3930) around pixels in the sensor.

Figure 40:
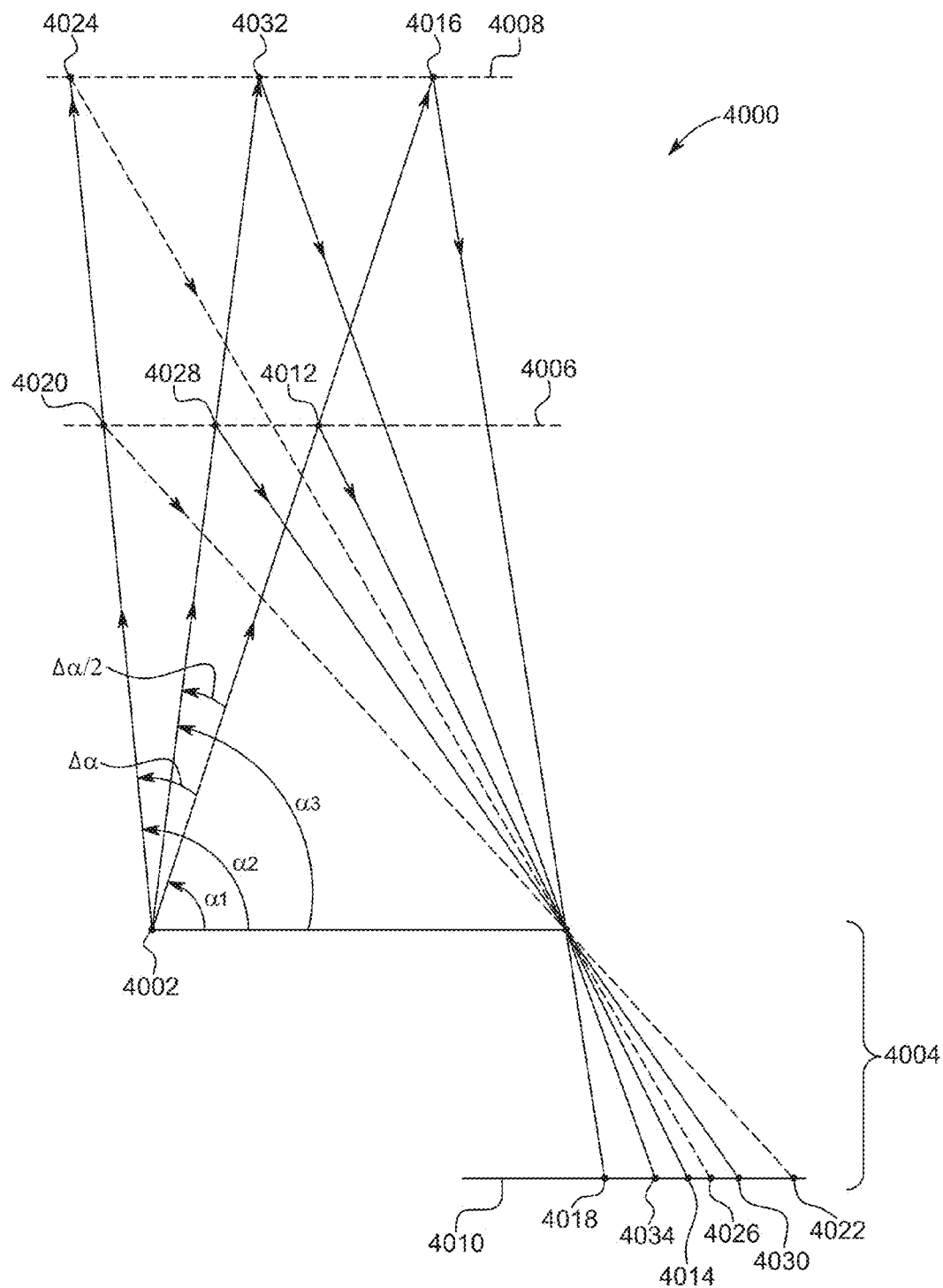
FIG. 40 shows an embodiment of a two-dimensional perspective of an exemplary transmit and receive ($T_x$-$R_x$) system that employs exemplary color coding to prevent ambiguity and to increase exemplary scanning rates.

FIG. 40 shows an exemplary transmit and receive ($T_x$-$R_x$) system 4000 that may employ exemplary color coding (e.g., time-of-flight color coding) to prevent exemplary ambiguity and/or to increase exemplary scanning rates (e.g., time-of-flight scanning rates). For example, the transmit and receive ($T_x$-$R_x$) system may be the same as or similar to one or more of those explained above. In one or more of the various embodiments, the transmit and receive ($T_x$-$R_x$) system 4000 may include a transmitter 4002 and a receiver 4004.

In one or more of the various embodiments, the transmitter 4002 may launch successive tracer bullets within a sizeable range from a first distance 4006 to a second distance 4008 (e.g., $Z_1$ to $Z_2$) and in different directions α (e.g., $α_1$ and $α_2$) at different times. In some of the various embodiments, the tracer bullets may return to the transmit and receive ($T_x$-$R_x$) system 4000 out of order. For example, a reflection at point 4012 may arrive at pixel 4014 at a first time, a reflection at point 4016 may arrive at a pixel 4018 at a second time, a reflection at point 4020 may arrive at a pixel 4022 at a third time, and a reflection at point 4024 may arrive at a pixel 4026 at a fourth time (e.g., where the first through fourth times are in successive temporal order the pixels may capture reflections from further distances subsequent to capturing reflections of closer distances). In some embodiments, the transmit and receive ($T_x$-$R_x$) system 4000 may experience a certain degree of ambiguity (e.g., a scanner of the transmit and receive ($T_x$-$R_x$) system 4000 has avoided movement in a particular direction by as great of an increment as shown here, for example Δα). For example, these reflections from further points may overlap (e.g., intermingle) in the sensor 4010 (e.g., both temporally, such as, for example, the third time may occur before the second time, and spatially). In one or more of the various embodiments, the transmit and receive ($T_x$-$R_x$) system 4000 may provide smaller angular increments (e.g., smaller than those shown) without causing ambiguity. For example, the transmit and receive ($T_x$-$R_x$) system 4000 may do so for high speed, high resolution scanning of voxels. In some of the various embodiments, the transmit and receive ($T_x$-$R_x$) system 4000 may change a scanning beam signal. In some embodiments, the transmit and receive ($T_x$-$R_x$) system 4000 may rapidly change a color of the scanning beam in real time. In one or more of the various embodiments, the transmit and receive ($T_x$-$R_x$) system 4000 may, after a smaller scan mirror rotation increment (e.g., Δα/2), fire tracer bullets that reflect off points 4028 (which directs a reflection to arrive at pixel 4030 at a fifth time) and 4032 (which directs a reflection to arrive at pixel 4034 at a sixth time). In some of the various embodiments, the transmit and receive ($T_x$-$R_x$) system 4000 may change the color of the scanning beam for each successive tracer bullet (e.g., from a blue tracer bullet to a red tracer bullet). In some embodiments, the transmit and receive ($T_x$-$R_x$) system 4000 may utilize the different colors of each successive tracer bullet to avoid ambiguity in detection. In one or more of the various embodiments, the transmit and receive ($T_x$-$R_x$) system 4000 may detect the reflected light that arrives at the fifth and sixth times via red pixels (e.g., instead of via blue pixels). For example, as explained above, the transmit and receive ($T_x$-$R_x$) system 4000 may include RGB hybrid sensors (e.g., three-dimensional and/or two-dimensional hybrid sensors). In some of the various embodiments, the transmit and receive ($T_x$-$R_x$) system 4000 may switch one or more other light attributes (e.g., polarization, intensity, phase) and/or us simultaneously mixed colors. In some embodiments, the transmit and receive ($T_x$-$R_x$) system 4000 may switch one or more light attributes in response to determining that ambiguity exceeds a threshold (e.g., as determined by logic of the transmit and receive ($T_x$-$R_x$) system 4000 or by a CPU-based control system that monitors the transmit and receive ($T_x$-$R_x$) system 4000). As shown above, the transmit and receive ($T_x$-$R_x$) system 4000 may reduce ambiguity and/or provide greater detection speeds (e.g., greater voxel ranges) by employing one or more portions of this process.

Additional Illustrated Circuitry of the Sensing Systems

Figure 41:
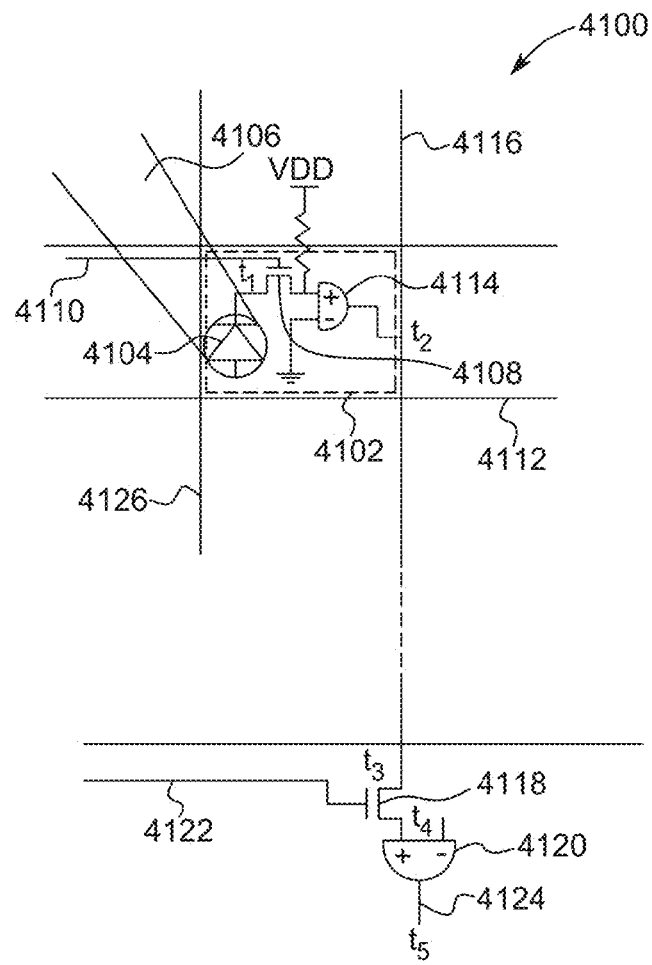
FIG. 41 illustrates an embodiment of an exemplary "twitchy pixel" that employs exemplary real-time pixel and column shuttering and dynamic sensitivity adjustment.

FIG. 41 illustrates an exemplary sensor portion 4100 that includes an exemplary "twitchy pixel" 4102. An exemplary sensor of an exemplary transmit and receive ($T_x$-$R_x$) system may include the sensor portion 4100. For example, the transmit and receive ($T_x$-$R_x$) system may be the same as or similar to one or more of those explained above. In one or more of the various embodiments, the twitchy pixel 4102 may employ real-time pixel shuttering. In some of the various embodiments, the twitchy pixel 4102 may employ real-time column shuttering. In some embodiments, the twitchy pixel 4102 may employ real-time row shuttering. In some of the various embodiments, the twitchy pixel 4102 may employ dynamic sensitivity adjustment.

In one or more of the various embodiments, the twitchy pixel 4102 may include a pinned photodiode 4104. The PDD 4104 may capture a reflection of a scanning spot 4106 at to. In some of the various embodiments, photon current may rush via a transfer gate 4108 (e.g., at $t_1$). In some embodiments, an active row control line 4110 may activate the transfer gate 4108. For example, the active row control line 4110 may activate individual pixels in a first row 4112 of the sensor.

In one or more of the various embodiments, the rush current may then reach an input of an amplification circuit 4114 (or source follower). In some of the various embodiments, this input may be weakly tied to $V_{DD}$ with a resistor R. The weak pull-up resistor R may hold the input of the amplification circuit 4114 at $V_{DD}$ until the rush current temporarily pulls the input low. In some embodiments, this sudden "twitch" may be amplified and transmitted to a column sense line 4116 at $t_2$. In some of the various embodiments, the amplified "twitch" signal may be transmitted to a row sense line. Alternatively, the amplified "twitch" signal may be simultaneously transmitted to both row and column sense lines so that both the vertical and horizontal positions of the "twitched" pixel are instantaneously transmitted to a detection system.

In one or more of the various embodiments, the amplified transmission may arrive at a transistor 4118 of a column decoder/amplifier 4120 at $t_3$. In some of the various embodiments, an active column control line 4122 may activate the transistor 4118 of the column decoder/amplifier CDA. In some embodiments, the column decoder/amplifier 4120 may amplify the transmission again at $t_4$. In one or more of the various embodiments, the column decoder/amplifier 4120 may transmit the again amplified transmission at time is (e.g., transmit an amplified detection signal over an output line 4124 to a remote processing system). In some embodiments, the output line 4124 may provide outputs for each pixel in a column 4126.

Figure 42:
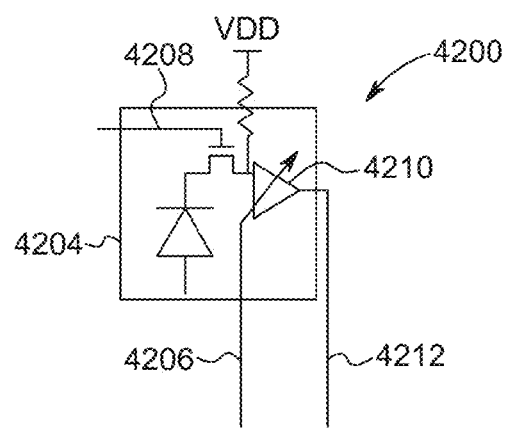
FIG. 42 shows an embodiment of exemplary activation and gain control circuitry built into an exemplary pixel.

FIG. 42 shows exemplary activation and gain control circuitry 4200 of an exemplary pixel 4204. For example, the pixel 4204 may be the same as or similar to one or more of those explained above. In one or more of the various embodiments, the activation and gain control circuitry 4200 may be controlled by a column pixel gain control line 4206. In some of the various embodiments, the column pixel gain control line 4206, in addition to a row select line 4208, may ensure that activation and sensitivity of individual pixels can be changed in real time (e.g., via and/or during one or more of the above-explained processes). For example, one or more signals transmitted over the column pixel gain control line 4206 may cause a gain control circuit 4210 to vary an amount of amplification applied to signals that the pixel 4204 outputs to a column sense line 4212.

Figure 43:
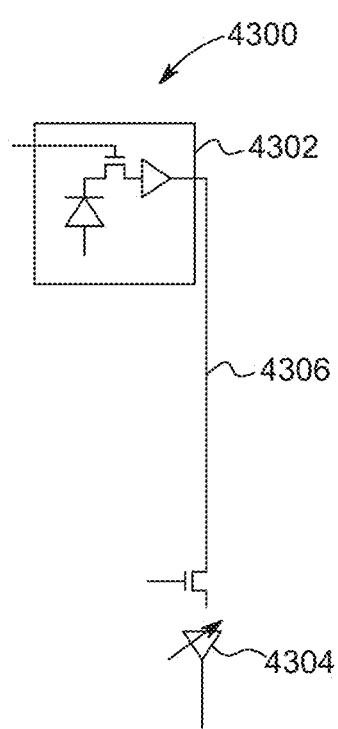
FIG. 43 illustrates an embodiment of exemplary gain control circuitry built into an exemplary column sense line amplifier.

FIG. 43 illustrates an exemplary activation and gain control circuitry 4300 of an exemplary pixel 4302. For example, the pixel 4302 may be the same as or similar to one or more of those explained above. In one or more of the various embodiments, the gain control circuitry 4300 may be built into a column sense line amplifier 4304 that obtains output signals from the pixel 4302 via a column sense line 4306.

Further Illustrated Aspects of the Sensing Systems

Figure 44:
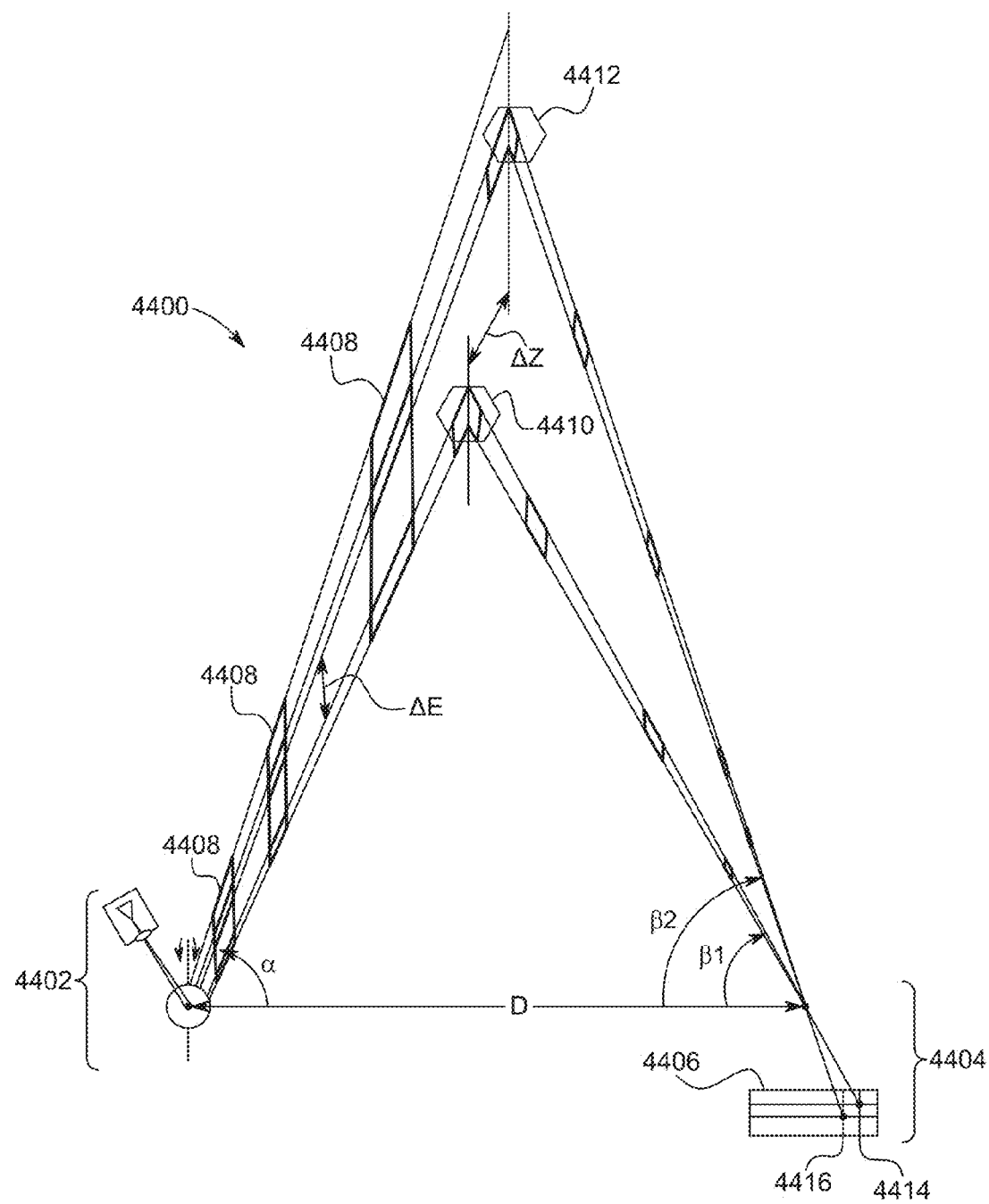
FIG. 44 shows an embodiment of a three-dimensional perspective view of an exemplary transmit and receive ($T_x$-$R_x$) system that employs exemplary light blades and an exemplary SPAD array sensor.

FIG. 44 shows an exemplary transmit and receive ($T_x$-$R_x$) system 4400. For example, the transmit and receive ($T_x$-$R_x$) system 4400 may be the same as or similar to one or more of those explained above. In one or more of the various embodiments, the transmit and receive ($T_x$-$R_x$) system 4400 may include a transmitter 4402 and a receiver 4404. In some of the various embodiments, the transmit and receive ($T_x$-$R_x$) system 4400 may be configured and arranged to offset the transmitter 4402 and the receiver 4404 from each other by a distance D. In some of the various embodiments, the receiver 4404 may include a SPAD (single photon avalanche detector) array sensor 4406. In some embodiments, the sensor 4406 may include an active column-gated SPAD array that includes a plurality of columns and a plurality of rows of SPAD pixels. In some embodiments, the transmit and receive ($T_x$-$R_x$) system 4400 may speculatively activate columns of the SPAD array.

In one or more of the various embodiments, the transmitter 4402 may emit narrowly collimated, one-dimensional, blade-like, photonic bursts ("blades") 4408. For example, the bursts 4408 may have short durations (e.g., 100 picoseconds). In some embodiments, the transmitter 4402 may emit the blades 4408 outward at a lateral angle α. In some embodiments, light of these blades 4408 may vertically spread across a field of view (e.g., along a Y-direction). In some embodiments, light of these blades 4408 may maintain a sharply focused light blade edge in a scan direction (e.g., in an X-direction, orthogonal to an edge of a given one of the blades 4408). In one or more of the various embodiments, the receiver 4404 may capture reflected blades. In some embodiments, a width of an image of a reflected blade at the sensor 4406 may be narrower than a width of a SPAD column in the SPAD array.

In one or more of the various embodiments, the transmitter 4402 may employ one-dimensional (e.g., cylindrical) laser collimated optics applied to one or more powerful striped edge emitting diode laser sources to produce the blades 4408 via intense bursts while maintaining a sharp edge. For example, the transmitter 4402 may employ a continuous motion one-dimensional scanning system that includes one or more of a one-dimensional MEMS mirror, a galvanic mirror, a phased array, or a spinning polygonal mirror wheel reflector. In some of the various embodiments, the transmit and receive ($T_x$-$R_x$) system 4400 may employ the offset distance D to ensure that light of blades 4408 emitted at a given scan angle α and reflected from different Z-ranges are captured by SPAD pixels in different columns of the SPAD array. In one or more of the various embodiments, the transmit and receive ($T_x$-$R_x$) system 4400 may implement a slower transmitter while employing blades 4408 as opposed to photon bullets because the transmitter 4402 may scan the blades 4408 across a horizontal dimension as opposed to both the horizontal and vertical dimensions.

For example, the blades 4408 may spread vertically across the entire field of view while traveling toward a first object 4410 and a second object 4412. The second object 4412 may be located at a position that is further from the transmit and receive ($T_x$-$R_x$) system 4400 than the first object 4410 by a distance ΔZ. The second object 4412 may be located at a position that is more elevated in the field of view than the first object 4410 by an incremental elevation angle ΔE. A first ray within a given blade may reflect off the first object 4410 while a second ray within the given blade may continue toward and reflect off the second object 4412. One or more pixels in a first column 4414 that has a first disparity in the SPAD array may detect photons of the first ray. One or more pixels in a second column 4416 that has a second disparity in the SPAD array may detect photons of the second ray. At least because of the offset distance D, the transmit and receive ($T_x$-$R_x$) system 4400 may determine that the first object 4410 is at a first distance Z based on the first disparity and may determine that the second object 4412 is at a second distance Z based on the second disparity (e.g., by employing a lookup table based on one or more of disparity or scan angle α such as, for example, explained in further detail below).

In one or more of the various embodiments, the transmit and receive ($T_x$-$R_x$) system 4400 may provide an actively column-gated scanning LIDAR system. In some of the various embodiments, the transmit and receive ($T_x$-$R_x$) system 4400 may employ time-of-flight as a ranging method. The transmit and receive ($T_x$-$R_x$) system 4400 may suppress ambient light by employing triangular light path geometry as a spatial-temporal filter. As explained above, portions of a reflected blade may arrive at the receiver 4404 sooner or later depending on a Z-range of an object that reflected the blade portion. Variance in time-of-flight required to cover different distances may also be proportional to a lateral displacement (e.g., as explained above). As explained above, the transmit and receive ($T_x$-$R_x$) system 4400 may detect lateral displacement based on which column contains one or more pixels that capture light of the reflected blade.

In one or more of the various embodiments, the transmit and receive ($T_x$-$R_x$) system 4400 may employ a choreographed succession of just-in-time activated columns. In some of the various embodiments, the transmit and receive ($T_x$-$R_x$) system 4400 may successively activate columns of SPAD pixels. In some of the various embodiments, the transmit and receive ($T_x$-$R_x$) system 4400 may adjust activation periods of successively activated columns. In some embodiments, the transmit and receive ($T_x$-$R_x$) system 4400 may increase the activation periods as the succession of column activation proceeds. For example, the transmit and receive ($T_x$-$R_x$) system 4400 may match the activation periods to ever greater periods time-of-flight delays for a given blade, with successively diminishing column position disparity shifts for a given increase in Z-range). In one or more of the various embodiments, the transmit and receive ($T_x$-$R_x$) system 4400 may vary the activation periods to reduce capture of ambient light by pixels of the SPAD array (e.g., as explained in further detail below).

Figure 45:
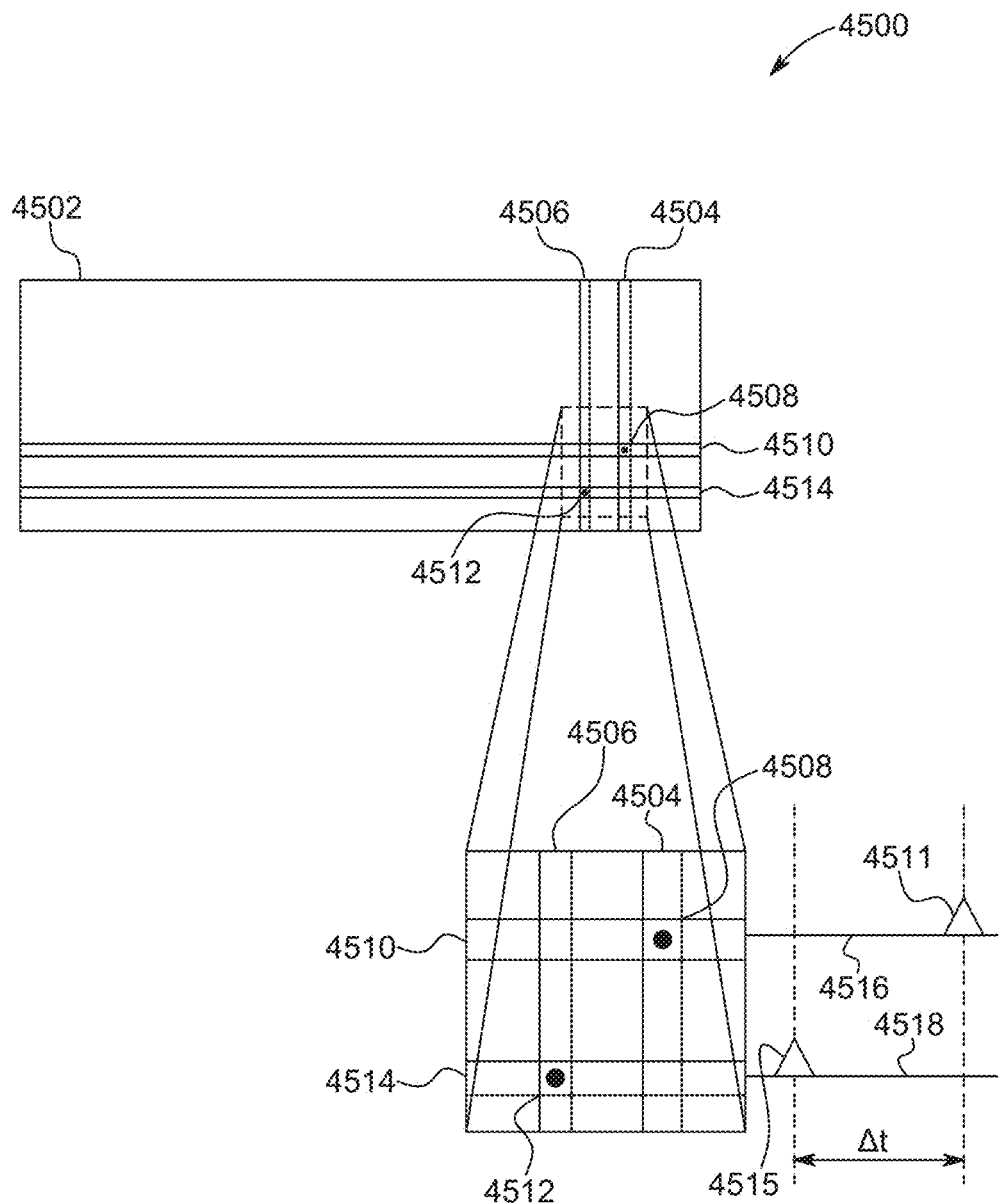
FIG. 45 illustrates an embodiment of a two-dimensional perspective view of an exemplary active column-gated SPAD array sensor.

FIG. 45 shows an exemplary SPAD array sensor 4500 of an exemplary transmit and receive ($T_x$-$R_x$) system. For example, the transmit and receive ($T_x$-$R_x$) system may be the same as or similar to one or more of those explained above. In one or more of the various embodiments, the sensor 4500 may include an active column-gated SPAD array 4502. In some of the various embodiments, the transmit and receive ($T_x$-$R_x$) system may employ the SPAD array 4502 to provide an accurate, actively column-gated scanning LIDAR system.

In one or more of the various embodiments, the SPAD array 4502 may have a plurality of columns and a plurality of rows of SPAD pixels. For example, the SPAD array sensor 4500 may have 500 columns and 200 rows of SPAD pixels for a total of 10,000 SPAD pixels. In some of the various embodiments, each SPAD pixel may have dimensions of five microns by five microns (or six microns by six microns or eight microns by eight microns, which is 64 times larger in area than one-micron pixels found in inexpensive modern rolling shutter cameras). In some embodiments, the SPAD array 4502 may have a height of 1 mm and a width of 2.5 mm.

In one or more of the various embodiments, the transmit and receive ($T_x$-$R_x$) system may successively activate individual columns of the SPAD array 4502. In some of the various embodiments, the transmit and receive ($T_x$-$R_x$) system may successively activate each column for a particular time period at a particular time subsequent to a start time of the sequential activation. In some embodiments, the transmit and receive ($T_x$-$R_x$) system may determine, for each individual column, the respective particular time based on a determined offset distance between a transmitter and a receiver of the transmit and receive ($T_x$-$R_x$) system (e.g., via a lookup table as explained in further detail below). Additionally or alternatively, the transmit and receive ($T_x$-$R_x$) system may determine, for each individual column, the respective particular time based on a determined scan angle α (e.g., via the lookup table).

For example, the SPAD array 4502 may capture reflections of a particular photon blade that reflected off two objects at two respective Z-ranges and two respective elevations (e.g., as explained above with regard to FIG. 44). The transmit and receive ($T_x$-$R_x$) system may activate a first column 4504 of SPAD pixels at a first time for a first activation period. The transmit and receive ($T_x$-$R_x$) system may activate a second column 4506 of SPAD pixels at a second time for a second activation period. The second time may be subsequent to the first time by a particular time interval Δt. In one or more of the various embodiments, the second activation period may exceed the first activation period. A first SPAD pixel 4508 in a first row 4510 and the first activated column 4504 may trigger a first avalanche 4511 responsive to the first SPAD pixel 4508 capturing a first one of the reflections during the first activation period. A second SPAD pixel 4512 in a second row 4514 and the second activated column 4506 may trigger a second avalanche 4515 responsive to the second SPAD pixel 4512 capturing a second one of the reflections during the second activation period. Each row of pixels may communicatively couple to a respective signal line. The first SPAD pixel 4508 may output the first avalanche to a first signal line 4516. The second SPAD pixel 4512 may output the second avalanche to a second signal line 4518. A time interval between when the first SPAD pixel 4508 outputs the first avalanche to the first signal line 4516 and when the second SPAD pixel 4512 outputs the second avalanche to the second signal line 4518 may equal or substantially equal the particular time period Δt. The transmit and receive ($T_x$-$R_x$) system may determine that the first avalanche on the first signal line 4516 was output from the first activated column 4504 and that the second avalanche on the second signal line 4518 was output from the second activated column 4506 based on one or more of the first time, the second time, or the particular time interval Δt between the first and second times. The transmit and receive ($T_x$-$R_x$) system may determine the two respective Z-ranges of the two objects based on the determined first and second activated columns 4504, 4506 (e.g., as explained above). The transmit and receive ($T_x$-$R_x$) system may determine the two respective elevations of the two objects based on the first and second rows 4510, 4514 of the first and second SPAD pixels 4508, 4512 (e.g., as explained above).

Figure 46:
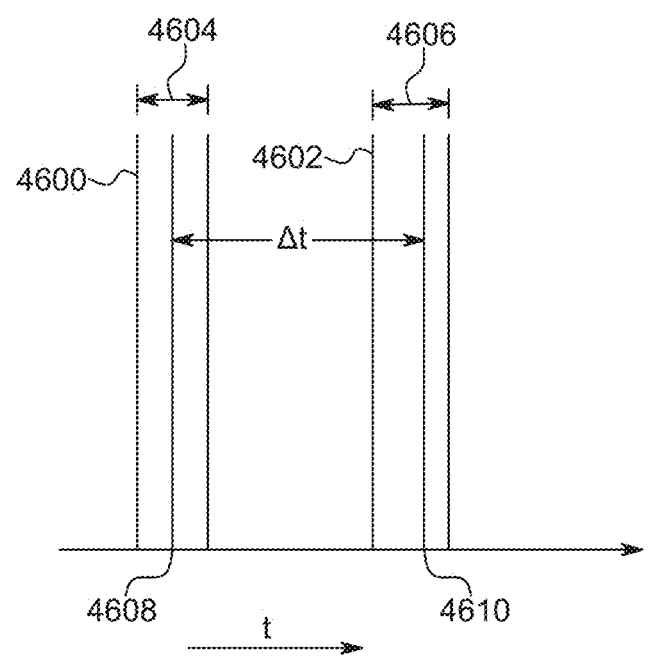
FIG. 46 shows an embodiment of exemplary choreographed successive SPAD pixel column activation.

FIG. 46 illustrates an exemplary choreographed successive SPAD pixel column activation by an exemplary transmit and receive ($T_x$-$R_x$) system. For example, the transmit and receive ($T_x$-$R_x$) system may be the same as or similar to one or more of those explained above. In one or more of the various embodiments, the transmit and receive ($T_x$-$R_x$) system may activate a first column in a SPAD array at a first time 4600. In some of the various embodiments, the transmit and receive ($T_x$-$R_x$) system may activate a second column in the SPAD array at a second time 4602. In some embodiments, the transmit and receive ($T_x$-$R_x$) system may activate the first column for a first time period 4604 and may activate the second column for a second time period 4606. Responsive to one or more SPAD pixels in the first column capturing a sufficient quantity of photons to trigger during the first time period 4604, the one or more SPAD pixels in the first column may avalanche at a third time 4608. Responsive to one or more SPAD pixels in the second column capturing a sufficient quantity of photons to trigger during the second time period 4606, the one or more SPAD pixels in the second column may avalanche at a fourth time 4610. In some embodiments, the fourth time 4610 may be subsequent to the third time 4608 by a duration Δt (e.g., as explained above).

Figure 47:
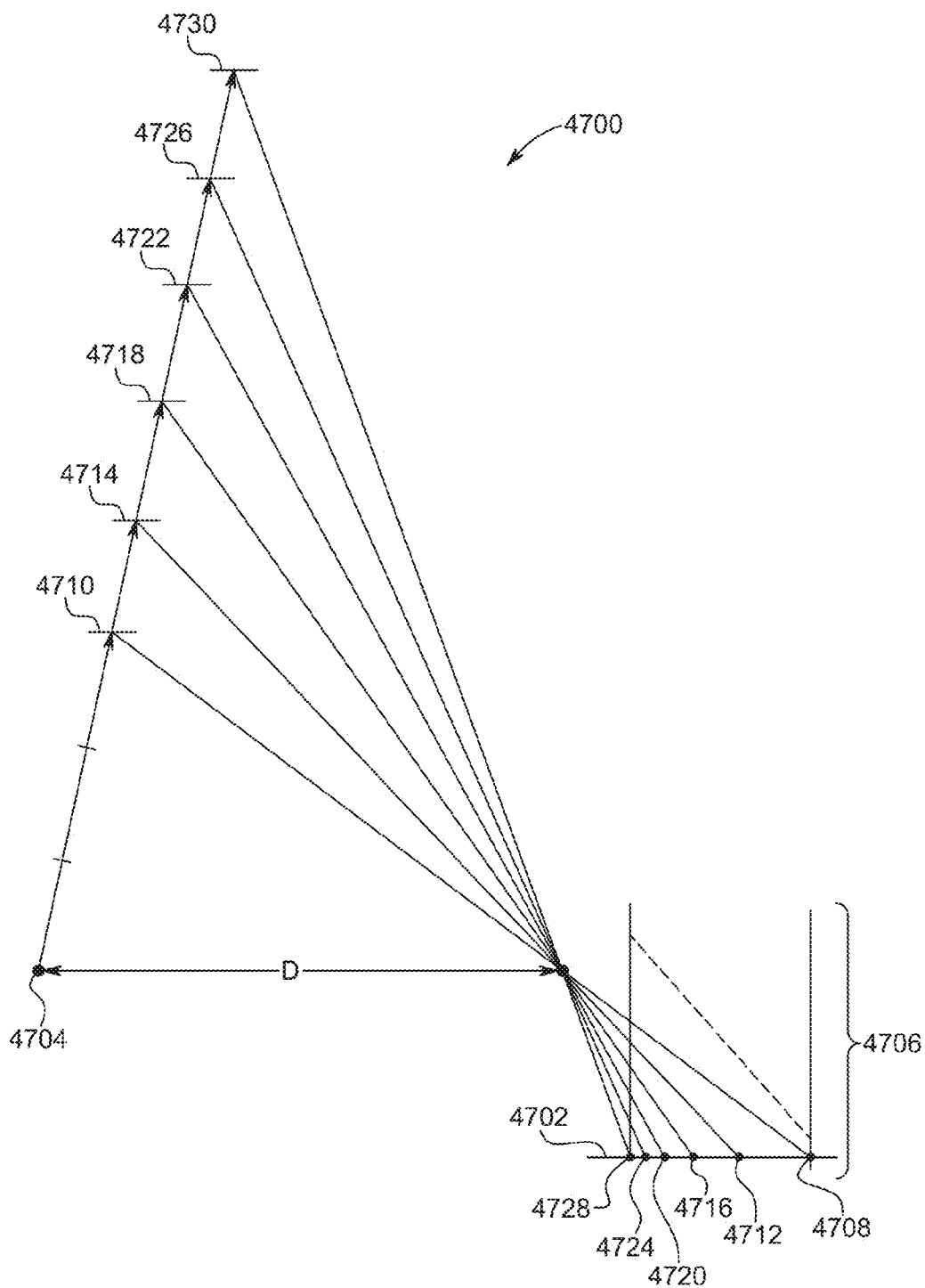
FIG. 47 illustrates an embodiment of a two-dimensional perspective view of an exemplary transmit and receive ($T_x$-$R_x$) system that employs an exemplary series of light blades and an exemplary SPAD array that captures exemplary reflections of the light blades.

FIG. 47 shows an exemplary transmit and receive ($T_x$-$R_x$) system 4700 that employs an exemplary series of light blades and an exemplary SPAD array 4702 that captures reflections of the light blades. For example, the transmit and receive ($T_x$-$R_x$) system 4700 may be the same as or similar to one or more of those explained above. In one or more of the various embodiments, the transmit and receive ($T_x$-$R_x$)

system 4700 may include a transmitter 4704 and a receiver 4706. In some of the various embodiments, the transmit and receive ($T_x$-$R_x$) system 4700 may be configured and arranged to offset the transmitter 4704 and the receiver 4706 from each other by a distance D. In some embodiments, the transmit and receive ($T_x$-$R_x$) system 4700 may employ the offset distance D to measure one or more Z-ranges of one or more objects that reflect light to the receiver 4706.

In one or more of the various embodiments, the transmit and receive ($T_x$-$R_x$) system 4700 may select a sequence of columns in the SPAD array 4702. In some of the various embodiments, the transmit and receive ($T_x$-$R_x$) system 4700 may determine that differences between disparities of successive columns in the sequence of columns varies as a function of one or more of the offset distance D, respective Z-ranges that corresponds to each of the successive columns, and a scan angle α. For example, the transmit and receive ($T_x$-$R_x$) system 4700 may associate, for each given SPAD pixel in a given row of pixels, unique narrow (e.g., telescopic) sections of a field of view of the transmit and receive ($T_x$-$R_x$) system 4700 that the given SPAD pixel observes (e.g., a narrow section, such as a horizontal slice, of a trajectory of a photon blade). In some embodiments, the transmit and receive ($T_x$-$R_x$) system 4700 may determine that photons captured by the given SPAD pixel indicate a reflection off an object in the narrow section associated with the given pixel (e.g., based on self-reporting by active smart pixels such as the avalanches that the SPAD pixels output to reveal a voxel position) as explained above.

For example, the transmit and receive ($T_x$-$R_x$) system 4700 may determine, for each given Z-range in a sequence of potential Z-ranges, that light of a given blade emitted at a particular time may reflect off a given object at the given Z-range and arrive at the SPAD array 4702 at a respective expected arrival time (e.g., based on time-of-flight as explained above). In some embodiments, the transmit and receive ($T_x$-$R_x$) system 4700 may also determine, for each given Z-range in the sequence of potential Z-ranges, which one or more columns of the SPAD array 4702 contains one or more pixels that may capture the light of the given blade emitted at the particular time and reflected off the given object. In some embodiments, the transmit and receive ($T_x$-$R_x$) system 4700 may make one or more of these determinations for each of a plurality of scan angles α. The transmit and receive ($T_x$-$R_x$) system 4700 may selectively include the determined one or more columns in a sequence of columns.

In one or more of the various embodiments, the transmit and receive ($T_x$-$R_x$) system 4700 may associate a first column 4708 in the sequence of columns with a first Z-range 4710 in the sequence of Z-ranges, associate a second column 4712 in the sequence of columns with a second Z-range 4714 in the sequence of Z-ranges, associate a third column 4716 in the sequence of columns with a third Z-range 4718 in the sequence of Z-ranges, associate a fourth column 4720 in the sequence of columns with a fourth Z-range 4722 in the sequence of Z-ranges, associate a fifth column 4724 in the sequence of columns with a fifth Z-range 4726 in the sequence of Z-ranges, and associate a sixth column 4728 in the sequence of columns with a sixth Z-range 4730 in the sequence of Z-ranges. An expected time of arrival at one or more pixels in the first column 4708 for a reflection of light of a given blade off a given object at the first Z-range 4710 may precede respective expected times of arrival for each subsequent column in the sequence of columns. A Z-range increment from each given Z-range in the sequence of potential Z-ranges to an immediately subsequent Z-range in the sequence of potential Z-ranges may be equal to a Z-range increment from an immediately prior Z-range in the sequence of potential Z-ranges to the given Z-range. In contrast, a disparity increment between a first successive pair of columns in the sequence of columns may be different from a disparity increment between a second successive pair of columns in the sequence of columns.

Figure 48:
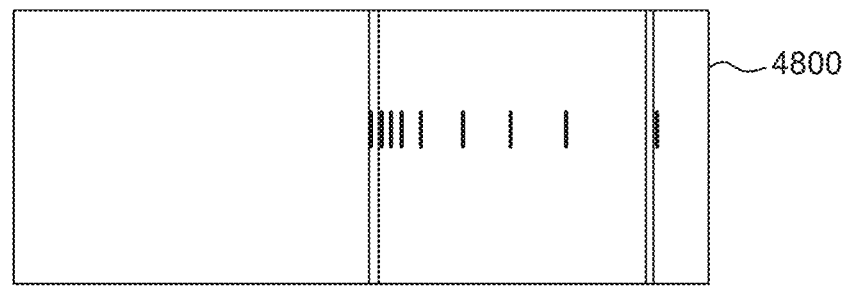
FIG. 48 shows an embodiment of a two-dimensional perspective view of an exemplary SPAD array that captures an exemplary series of exemplary light blades at exemplary positions that have exemplary disparity deltas that vary as an exemplary function of distance between an exemplary receiver and an exemplary transmitter and as an exemplary function of Z-range of a target object.

FIG. 48 illustrates an exemplary SPAD array 4800 of an exemplary transmit and receive ($T_x$-$R_x$) system. For example, the transmit and receive ($T_x$-$R_x$) system may be the same as or similar to one or more of those explained above. In one or more of the various embodiments, the transmit and receive ($T_x$-$R_x$) system may determine that, for columns that receive reflections off objects at equally incremented Z-ranges, differences between disparities of the columns are unequal (e.g., as shown in FIG. 48). In some of the various embodiments, the transmit and receive ($T_x$-$R_x$) system may determine that the differences between these disparities vary as a function of one or more of the offset distance D, a Z-range that corresponds to each of the successive columns, and a scan angle α (e.g., as explained above).

Returning to FIG. 44, the transmit and receive ($T_x$-$R_x$) system 4400 may determine that, for a given scan angle α, a receive angle β increases as the Z-range increases (e.g., from $β_1$ at the Z-range of the first object 4410 to $β_2$ at the Z-range of the second object 4412). In one or more of the various embodiments, the transmit and receive ($T_x$-$R_x$) system 4400 may determine that, for a given Z-range, the receive angle β decreases as the scan angle α increases. In some of the various embodiments, the sensor 4406 may perceive the disparity in the images caused by the reflections of the blades as diminishing as light from the blades reflects off objects at greater Z-ranges.

In one or more of the various embodiments, the transmit and receive ($T_x$-$R_x$) system 4400 may speculatively activate each column of the SPAD array sensor 4406. In some embodiments, the transmit and receive ($T_x$-$R_x$) system 4400 may determine, for each of a plurality of potential Z-ranges of a given object, that light of a given blade emitted at a particular time may reflect off the given object and arrive at the SPAD array sensor 4406 at a respective expected arrival time (e.g., based on time-of-flight as explained above). In some embodiments, the transmit and receive ($T_x$-$R_x$) system may also determine, for each of the plurality of potential Z-ranges, which one or more columns of the SPAD array sensor 4406 contains one or more pixels that should capture the light of the given blade emitted at the particular time and reflected off the given object. In some embodiments, the transmit and receive ($T_x$-$R_x$) system 4400 may make one or more of these determinations for each of a plurality of scan angles α. In one or more of the various embodiments, the transmit and receive ($T_x$-$R_x$) system 4400 may speculatively activate a given column of the SPAD array sensor 4406 immediately prior to the expected arrival time for the light of the given blade that one or more pixels of the given column should capture from the reflection off the given object at the potential Z-range that corresponds to the given column. In some of the various embodiments, the transmit and receive ($T_x$-$R_x$) system 4400 may speculatively activate the given column by setting each SPAD pixel in the given column to avalanche as soon as the SPAD pixel captures a sufficient quantity of photons (e.g., as few as one). In some embodiments, the transmit and receive ($T_x$-$R_x$) system 4400 may set the SPAD pixels in the speculatively activated column by briefly connecting a high-voltage reverse biased signal to each SPAD pixel in the speculatively activated column at the same time. For example, the transmit and receive ($T_x$-$R_x$) system 4400 may apply a reverse biased signal that has a voltage that causes the SPAD pixels to reach Geiger mode. In Geiger mode, an avalanche diode in each SPAD pixel may, responsive to capturing the sufficient quantity of photons, output a strong instantaneous signal (e.g., up to 10,000 electrons). The strong instantaneous signal may provide an easy to detect, low latency, low jitter time signal. The signal may have a temporal accuracy in the range of approximately 100 ps.

In one or more of the various embodiments, the transmit and receive ($T_x$-$R_x$) system 4400 may speculatively activate columns in a range of columns (e.g., 100 to 200 columns) that corresponds to a Z-range of interest. In some of the various embodiments, the transmit and receive ($T_x$-$R_x$) system 4400 may emit a plurality of blades in quick succession (e.g., emitting one or more blades prior to capture by the SPAD array sensor of a reflection of a previously emitted blade). In some embodiments, the transmit and receive ($T_x$-$R_x$) system 4400 may emit multiple blades per predicted range of time of flight for a Z-range of interest. For example, the transmit and receive ($T_x$-$R_x$) system 4400 may emit ten blades at the same scan angle $\alpha$, each blade having a duration of 10 ps and spaced 100 ns from an immediately prior emitted blade. The transmit and receive ($T_x$-$R_x$) system 4400 may speculatively sequentially activate each column that corresponds to a Z-range in the Z-range of interest every 100 ns. For this example, a SPAD array sensor that has 200 row sense lines may support up to a 10 Mhz burst output data rate, resulting in a total system peak data rate of 2 billion voxels per second. The transmit and receive ($T_x$-$R_x$) system 4400 may permit employing large SPAD pixels while providing both a small sensor footprint and high accuracy (e.g., via subnanosecond timing in time-of-flight measurements).

In one or more of the various embodiments, the transmit and receive ($T_x$-$R_x$) system 4400 may dynamically adjust one or more of thresholds, emission patterns, column activation controls, or gain. In some of the various embodiments, the transmit and receive ($T_x$-$R_x$) system 4400 may employ one or more of those dynamic adjustments to filter or prioritize one or more data streams (e.g., provide programmable data priority and/or data confidence levels). In some embodiments, the transmit and receive ($T_x$-$R_x$) system 4400 may make one or more of those dynamic adjustments based on one or more settings such as range selection, foveation, object locking, or Z-locking (e.g., as explained above). For example, the transmit and receive ($T_x$-$R_x$) system 4400 may vary gain applied to each individual column based on a duration of activation for the individual column. In some of the various embodiments, the transmit and receive ($T_x$-$R_x$) system 4400 may balance bias of SPAD pixels in a given column with duration of activation for the given column (e.g., gain may be inversely proportional to activation duration: decrease gain for longer activation duration or increase gain for shorter activation duration) to manage a likelihood of one or more SPAD pixels in the given column spontaneously avalanching (e.g., responsive to ambient light) and thereby providing a false detection. For example, the transmit and receive ($T_x$-$R_x$) system 4400 may bias SPAD pixels in the given column at 20 volts when activating the given column for 10 ns. The transmit and receive ($T_x$-$R_x$) system 4400 may decrease the bias from 20 volts when activating the given column for a longer activation duration or may increase the bias from 20 volts when activating the given column for a shorter activation duration. Additionally or alternative, the transmit and receive ($T_x$-$R_x$) system 4400 may adjust gain applied to columns based on a quantity of SPAD pixels in each column. In some embodiments, the transmit and receive ($T_x$-$R_x$) system 4400 may apply a larger gain to columns of a SPAD array sensor that has a high quantity of rows as compared to a smaller gain that the transmit and receive ($T_x$-$R_x$) system 4400 may apply to columns of a SPAD array sensor that has a lower quantity of rows. In one or more of the various embodiments, the transmit and receive ($T_x$-$R_x$) system 4400 may activate each column for 10-50 ns.

In one or more of the various embodiments, the transmit and receive ($T_x$-$R_x$) system 4400 may initiate a subsequent speculative sequential activation prior to conclusion of a prior speculative sequential activation. In some embodiments, the transmit and receive ($T_x$-$R_x$) system 4400 may speculatively activate columns in a plurality of ranges of columns in parallel (e.g., a plurality of ranges that correspond to a plurality of Z-ranges of interest). For example, the transmit and receive ($T_x$-$R_x$) system 4400 may apply distinct ranges of activation times for each of the plurality of ranges of columns.

In one or more of the various embodiments, the transmit and receive ($T_x$-$R_x$) system 4400 may dynamically choreograph the speculative sequential activation. In some of the various embodiments, the transmit and receive ($T_x$-$R_x$) system 4400 may dynamically choreograph the speculative sequential activation based on the scan angle $\alpha$. In some embodiments, the transmit and receive ($T_x$-$R_x$) system 4400 may adjust activation duration for one or more columns in a range of columns that the transmit and receive ($T_x$-$R_x$) system 4400 may sequentially activate. In some embodiments, the transmit and receive ($T_x$-$R_x$) system 4400 may adjust the range of columns. For example, the transmit and receive ($T_x$-$R_x$) system 4400 may determine, for each of a plurality of Z-ranges, one or more of new expected times of flight or new expected disparities for one or more columns. In one or more of the various embodiments, such values could be precalculated. For example, the transmit and receive ($T_x$-$R_x$) system 4400 may make one or more of these determinations during a calibration routine and store one or more results in a fast lookup table (e.g., one or more of the lookup tables explained above).

In one or more of the various embodiments, the transmit and receive ($T_x$-$R_x$) system 4400 may determine that an object that reflects light from a blade may have a flat surface based on a quantity of rows of pixels in an activated column that capture the reflected light (e.g., all rows in the activated column may have a SPAD pixel that captured the reflected light). In some of the various embodiments, the transmit and receive ($T_x$-$R_x$) system 4400 may determine that the object has multiple sloped surfaces based on SPAD pixels in different activated columns capturing the reflected light.

In one or more of the various embodiments, the transmit and receive ($T_x$-$R_x$) system 4400 may, in the case of a direct time-of-flight method, have a Z-resolution that is a function of arrival time of blade pulses. In contrast, the transmit and receive ($T_x$-$R_x$) system 4400 may, in the case of deriving a Z-range via triangulation, have a Z-resolution that is a function of column position (e.g., accuracy of relative displacement, pixel disparity and the X-direction, or the like). In some of the various embodiments, the transmit and receive ($T_x$-$R_x$) system 4400 may determine the Z-range via time of flight. In some embodiments, the transmit and receive ($T_x$-$R_x$) system 4400 may employ additional triangular light path geometry as a spatial-temporal filter to suppress ambient light.

In one or more of the various embodiments, the speculative sequential activation may provide 10-100 times greater performance than capabilities of existing systems by Velodyne™ or Quanergy™ (e.g., systems by Velodyne™ or Quanergy™ that focus on one or more of autonomous vehicular LIDAR or three-dimensional perception domain). In some of the various embodiments, the transmit and receive ($T_x$-$R_x$) system 4400 may operate one or more various asynchronous sensor arrays (e.g., asynchronous camera or twitchy pixels) in place of the SPAD array sensor 4406 while employing the above-explained spatially filtered line scan and time-of-flight detection.

In one or more of the various embodiments, the transmit and receive ($T_x$-$R_x$) system 4400 may emit a given light blade that contains multiple colors. In some of the various embodiments, the transmit and receive ($T_x$-$R_x$) system 4400 may employ parallel or sequential filterless color LIDAR. In some embodiments, the SPAD array sensor 4406 may be sensitive for a plurality of light frequencies (e.g., from NIR through UV). In some embodiments, the transmit and receive ($T_x$-$R_x$) system 4400 may operate in total ambient darkness. For example, by rapidly changing illumination wavelengths of blade pulses (e.g., switching between primary colors), the transmit and receive ($T_x$-$R_x$) system 4400 may determine color and hue of a three-dimensional surface that the transmit and receive ($T_x$-$R_x$) system 4400 scans.

In one or more of the various embodiments, the transmit and receive ($T_x$-$R_x$) system 4400 may, by employing the above-explained sequential active column-gating, reduce ambient light that a given SPAD pixel in an activated column experiences to one millionth of ambient light the SPAD pixel would otherwise experience (e.g., a reduction of 100,000 lux from to 0.1 lux or sunlight interference to moonlight interference). In some of the various embodiments, the transmit and receive ($T_x$-$R_x$) system 4400 may improve eye safety by emitting lower instantaneous power density of the blades as compared to emissions of conventional systems.

In one or more of the various embodiments, the transmit and receive ($T_x$-$R_x$) system 4400 may, as explained above, adjust activation periods of successive columns to match incrementing time-of-flight delays as the Z-range increases and incremental column disparity decreases. In some of the various embodiments, the transmit and receive ($T_x$-$R_x$) system 4400 may, by adjusting the activation periods, ensure detection of reflected light by one or more pixels and instantaneous range measurement along line of sight of the one or more pixels. As explained above, the transmit and receive ($T_x$-$R_x$) system 4400 may, from a single blade pulse, provide a high quantity of instant separate voxel measurements (e.g., 200) within a short time period (e.g., 1 µs) that can be as high as a vertical pixel count in a given column of a sensor. In some embodiments, the transmit and receive ($T_x$-$R_x$) system 4400 may provide a data rate of 200 million voxels per second with a SPAD array (e.g., far superior to expensive LIDAR systems on the market such as those from Velodyne™ or "solid state" LIDAR systems such as those from Quanergy™). In some embodiments, the transmit and receive ($T_x$-$R_x$) system 4400 may set a maximum photon roundtrip time of flight to 1,000 ns or 1 µs, thereby capping observed Z-range to 500 ft. In contrast, in a conventional SPAD detector, only one observation per microsecond may be supported.

In one or more of the various embodiments, the transmit and receive ($T_x$-$R_x$) system 4400 may, while employing time-of-flight measurements of Z-range, have a Z-range resolution that is a function of arrival time of one or more pulses. In contrast, the transmit and receive ($T_x$-$R_x$) system 4400 may, while employing triangulation, have a Z-range resolution that is a function of resolution of column position (e.g., accuracy of relative displacement or pixel disparity in the X-direction). In some of the various embodiments, the transmit and receive ($T_x$-$R_x$) system 4400 may, while employing the above-explained sequential active column-gating with blade pulses, have a Z-range resolution that is a function of one or more of column position. In some embodiments, the transmit and receive ($T_x$-$R_x$) system 4400 may, while employing time-of-flight measurements via the above-explained sequential active column-gating with blade pulses, have a resolution in the horizontal X-direction that is a function of both sharpness of the light blade and accuracy of determining the scanning angle α. For example, the transmit and receive ($T_x$-$R_x$) system 4400 may determine the scan angle α via anticipatory prediction or interpolation ex-post (e.g., motion interpolation) as explained with regard to FIG. 4B of U.S. Pat. No. 8,282,222. In some of the various embodiments, the transmit and receive ($T_x$-$R_x$) system 4400 may, while employing the above-explained sequential active column-gating with blade pulses have a vertical Y-direction resolution that is a function of a quality of SPAD row optics and row resolution of the SPAD sensor 4406. In one or more of the various embodiments, the transmit and receive ($T_x$-$R_x$) system 4400 may employ an activation period of one tenth of a nanosecond (100 ps) for a given column and thereby resolve a long-distance object down to one centimeter.

In one or more of the various embodiments, the transmit and receive ($T_x$-$R_x$) system 4400 may employ each blade as a scan line as explained above. In some of the various embodiments, the transmit and receive ($T_x$-$R_x$) system 4400 may employ the blades to provide sharpness of a sequential pixel scanning system and breadth of a flash LIDAR system as explained above. For example, sequential pixel scanning systems may employ photon pin pricks with one individual pinprick for each individual voxel. Sequential pixel scanning systems require extremely fast scan rates. As another example, flash LIDAR systems may employ no scanner and, instead, may require extremely high instantaneous power sources to ensure a sufficient instantaneous photon count with statistical certainty for each pixel in a sensor array. In contrast to both of these examples, the transmit and receive ($T_x$-$R_x$) system 4400 may emit blade pulses that vertically cover all rows for a given column in the sensor 4406, thereby enabling the transmit and receive ($T_x$-$R_x$) system 4400 to employ a slower scan rate (e.g., 100 Hz for 100 frames per second), scan in a single direction, and employ larger time gaps between pulses while providing a high voxel throughput. In some embodiments, the transmit and receive ($T_x$-$R_x$) system 4400 may emit 2,000 blade pulses laterally spread across a 30 degree field of view in 4 ms while providing an HD lateral voxel resolution at up to 250 frames per second. For example, the transmit and receive ($T_x$-$R_x$) system 4400 may employ 250 lines of vertical resolution to provide a raw voxel count of 125 million voxels per second (e.g., 250 lines×250 frames per second×2,000 blade pulses).

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for measuring a three dimensional range to a target, comprising:
   emitting, by a transmitter, light toward the target;
   receiving, by an aperture, one or more reflections of the light from the target;
   directing, by the aperture, the one or more reflections toward a sensor that comprises a plurality of pixels arranged in one or more rows having a plurality of columns, wherein the sensor is positioned at a location that is offset by a predetermined distance from another location of the transmitter;
   determining, by the one or more processor devices, one or more departure times of the emitted light towards the target;
   determining, by the one or more processor devices, one or more anticipated arrival times of the one or more light reflections on the sensor based on the one or more departure times and the predetermined offset distance;
   sequentially activating, by the one or more processor devices, one or more portions of the plurality of pixels arranged in the one or more rows based on the one or more anticipated arrival times; and
   employing a disparity for a first portion of the one or more rows of pixels that exceeds a disparity threshold to determine, by the one or more processor devices, that the range to the target is a particular distance based on the disparity for the first portion of the one or more rows of pixels, wherein the target's three dimensional range measurement is based on the one or more light reflections detected by the one or more portions of the plurality of pixels.

2. The method of claim 1, further comprising:
   determining, by the one or more processor devices, that the first portion of the one or more rows of pixels contains one or more pixels that indicate capture of the one or more light reflections; and
   determining, by the one or more processor devices, that the range to the target is the particular distance based on the determined first portion of the one or more rows of pixels.

3. The method of claim 1, further comprising
   determining, by the one or more processor devices, the disparity for the first portion of the one or more rows of pixels that indicate capture of the one or more reflections; and
   determining, by the one or more processor devices, that the range to the target is the particular distance based on the determined disparity for the first portion of the one or more pixel rows.

4. The method of claim 1, further comprising:
   determining, by the one or more processor devices, that the first portion of the one or more rows of pixels contains one or more pixels that indicate capture of the one or more reflections;
   determining, by the one or more processor devices, the disparity for the first portion of the one or more rows of pixels; and
   comparing, by the one or more processor devices, the disparity for the first portion of the one or more rows of pixels to the disparity threshold.

5. The method of claim 1, further comprising:
   when the disparity for the first portion of the one or more rows of pixels is below the disparity threshold, determining, by the one or more processor devices, a time of flight for the emitted light; and
   determining, by the one or more processor devices, that the range to the target is the particular distance based on the determined time of flight for the emitted light.

6. The method of claim 1, further comprising:
   when the disparity for the first portion of the one or more rows of pixels is below the disparity threshold, emitting, by the transmitter, one or more bursts of light;
   determining, by the one or more processor devices, one or more times of flight of the one or more bursts of light based on the sensor indicating capture of one or more reflections of the one or more bursts of light; and
   determining, by the one or more processor devices, that the range to the target is the particular distance based on the one or more determined times of flight of the one or more bursts of light.

7. The method of claim 1, further comprising:
   transmitting, by the transmitter, temporally separate bursts of light, wherein each of the bursts includes light of a distinct color as compared to each other burst in the temporally separate bursts of light;
   determining, by the one or more processor devices, for each respective one of the distinct colors, each portion of the one or more rows of pixels that contain one or more pixels that indicate capture of light having one or more of the distinct colors;
   for each respective portion of the one or more pixel rows that contains one or more pixels that indicate capture of light of one or more of the distinct colors, determining, by the one or more processor devices, a respective disparity for the respective portion of the one or more rows of pixels; and determining, by the one or more processor devices, that the range to the target is the particular distance based on the respective disparity for each respective portion of the one or more rows of pixels that contain one or more pixels that indicate capture of light having the one or more distinct colors.

8. A system to measure a three dimensional range to a target, comprising:
a transmitter that emits light toward the target;
an aperture that receives one or more reflections of the light from the target, wherein the aperture directs the one or more reflections toward a sensor;
a sensor that comprises a plurality of pixels arranged in one or more rows having a plurality of columns, wherein the sensor is positioned at a location that is offset by a predetermined distance from another location of the transmitter;
one or more memory devices that store instructions;
one or more processor devices that execute the stored instructions to perform actions, including:
determining one or more departure times of the emitted light towards the target;
determining one or more anticipated arrival times of the one or more light reflections on the sensor based on the one or more departure times and the predetermined offset distance;
sequentially activating one or more portions of the plurality of pixels arranged in the one or more rows based on the one or more anticipated arrival times; and
employing a disparity for a first portion of the one or more rows of pixels that exceeds a disparity threshold to determine that the range to the target is a particular distance based on the disparity for the first portion of the one or more rows of pixels, wherein the target's three dimensional range measurement is based on the one or more light reflections detected by the one or more portions of the plurality of pixels.

9. The system of claim 8, further comprising:
determining that the first portion of the one or more rows of pixels contains one or more pixels that indicate capture of the one or more light reflections; and
determining that the range to the target is the particular distance based on the determined first portion of the one or more rows of pixels.

10. The system of claim 8, further comprising
determining the disparity for the first portion of the one or more rows of pixels that indicate capture of the one or more reflections; and
determining that the range to the target is the particular distance based on the determined disparity for the first portion of the one or more pixel rows.

11. The system of claim 8, further comprising:
determining that the first portion of the one or more rows of pixels contains one or more pixels that indicate capture of the one or more reflections;
determining the disparity for the first portion of the one or more rows of pixels; and
comparing the disparity for the first portion of the one or more rows of pixels to the disparity threshold.

12. The system of claim 8, further comprising:
when the disparity for the first portion of the one or more rows of pixels is below the disparity threshold, determining a time of flight for the emitted light; and
determining that the range to the target is the particular distance based on the determined time of flight for the emitted light.

13. The system of claim 8, further comprising:
when the disparity for the first portion of the one or more rows of pixels is below the disparity threshold, emitting one or more bursts of light;
determining one or more times of flight of the one or more bursts of light based on the sensor indicating capture of one or more reflections of the one or more bursts of light; and
determining that the range to the target is the particular distance based on the one or more determined times of flight of the one or more bursts of light.

14. The system of claim 8, further comprising:
transmitting temporally separate bursts of light, wherein each of the bursts includes light of a distinct color as compared to each other burst in the temporally separate bursts of light;
determining, for each respective one of the distinct colors, each portion of the one or more rows of pixels that contain one or more pixels that indicate capture of light having one or more of the distinct colors;
for each respective portion of the one or more pixel rows that contains one or more pixels that indicate capture of light of one or more of the distinct colors, determining a respective disparity for the respective portion of the one or more rows of pixels; and
determining that the range to the target is the particular distance based on the respective disparity for each respective portion of the one or more rows of pixels that contain one or more pixels that indicate capture of light having the one or more distinct colors.

15. A non-transitory processor readable storage media that includes instructions for measuring a three dimensional range to a target, wherein execution of the instructions by one or more processor devices cause the one or more processor devices to perform actions, comprising:
emitting, by a transmitter, light toward the target;
receiving, by an aperture, one or more reflections of the light from the target;
directing, by the aperture, the one or more reflections toward a sensor that comprises a plurality of pixels arranged in one or more rows having a plurality of columns, wherein the sensor is positioned at a location that is offset by a predetermined distance from another location of the transmitter;
determining, by the one or more processor devices, one or more departure times of the emitted light towards the target;
determining, by the one or more processor devices, one or more anticipated arrival times of the one or more light reflections on the sensor based on the one or more departure times and the predetermined offset distance;
sequentially activating, by the one or more processor devices, one or more portions of the plurality of pixels arranged in the one or more rows based on the one or more anticipated arrival times; and
employing a disparity for a first portion of the one or more rows of pixels that exceeds a disparity threshold to determine, by the one or more processor devices, that the range to the target is a particular distance based on the disparity for the first portion of the one or more rows of pixels, wherein the target's three dimensional range measurement is based on the one or more light reflections detected by the one or more portions of the plurality of pixels.

16. The media of claim 15, further comprising:
determining, by the one or more processor devices, that the first portion of the one or more rows of pixels contains one or more pixels that indicate capture of the one or more light reflections; and determining, by the one or more processor devices, that the range to the target is the particular distance based on the determined first portion of the one or more rows of pixels.

17. The media of claim 15, further comprising determining, by the one or more processor devices, the disparity for the first portion of the one or more rows of pixels that indicate capture of the one or more reflections; and determining, by the one or more processor devices, that the range to the target is the particular distance based on the determined disparity for the first portion of the one or more pixel rows.

18. The media of claim 15, further comprising:

transmitting, by the transmitter, temporally separate bursts of light, wherein each of the bursts includes light of a distinct color as compared to each other burst in the temporally separate bursts of light;

determining, by the one or more processor devices, for each respective one of the distinct colors, each portion of the one or more rows of pixels that contain one or more pixels that indicate capture of light having one or more of the distinct colors;

for each respective portion of the one or more pixel rows that contains one or more pixels that indicate capture of light of one or more of the distinct colors, determining, by the one or more processor devices, a respective disparity for the respective portion of the one or more rows of pixels; and determining, by the one or more processor devices, that the range to the target is the particular distance based on the respective disparity for each respective portion of the one or more rows of pixels that contain one or more pixels that indicate capture of light having the one or more distinct colors.

* * * * *

UNITED STATES PATENT AND TRADEMARK OFFICE
CERTIFICATE OF CORRECTION

PATENT NO. : 9,753,126 B2  
APPLICATION NO. : 15/384227  
DATED : September 5, 2017  
INVENTOR(S) : Smits Page 1 of 5

It is certified that error appears in the above-identified patent and that said Letters Patent is hereby corrected as shown below:

On the Title Page

On Page 2, in item (56), under "OTHER PUBLICATIONS", in Column 2, Line 6, delete "Valv's" and insert -- Valve's --, therefor.

In the Drawings

In Fig. 2, Sheet 2 of 38, delete " 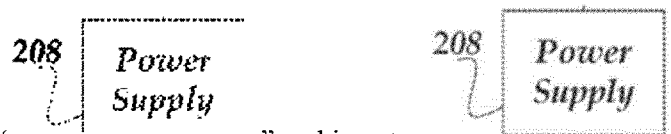 " and insert -- 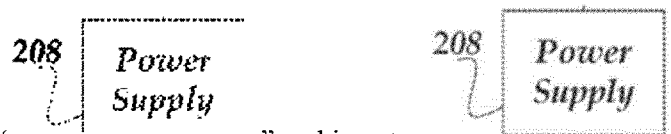 --, therefor.

In Fig. 3, Sheet 3 of 38, delete " 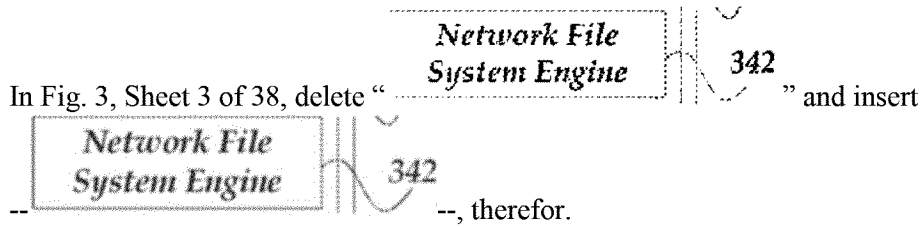 " and insert -- 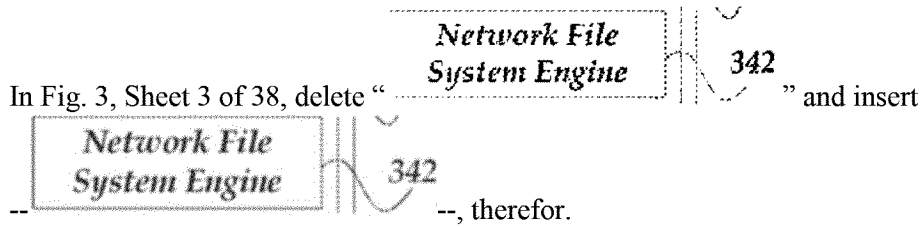 --, therefor.

In Fig. 3, Sheet 3 of 38, delete " 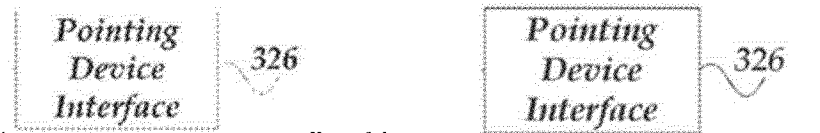 " and insert -- 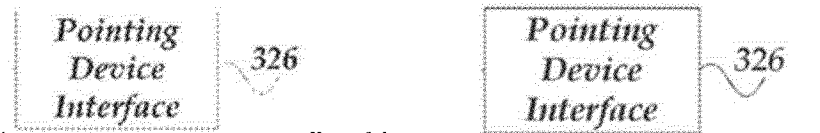 --, therefor.

Signed and Sealed this  
Eleventh Day of June, 2019

Andrei Iancu  
*Director of the United States Patent and Trademark Office*

CERTIFICATE OF CORRECTION (continued)
U.S. Pat. No. 9,753,126 B2

In the Specification

In Column 1, Line 8, delete "Application U.S." and insert -- Application --, therefor.

In Column 1, Line 13, delete "Application U.S." and insert -- Application --, therefor.

In Column 1, Line 18, delete "Application U.S." and insert -- Application --, therefor.

In Column 2, Line 63, delete "FIG. 25 show" and insert -- FIG. 25 shows --, therefor.

In Column 3, Line 53, delete "perspective" and insert -- perspective view --, therefor.

In Column 3, Line 57, delete "perspective" and insert -- perspective view --, therefor.

In Column 5, Line 36, delete "Detector (SPAD)" and insert -- Diode (SPAD) --, therefor.

In Column 8, Line 49, delete "one dimensional-array" and insert -- one-dimensional array --, therefor.

In Column 10, Line 32, delete "Enhanced Data GSM Environment (EDGE)," and insert -- Enhanced Data rate for GSM Evolution (EDGE), --, therefor.

In Column 10, Line 45, delete "session initiated" and insert -- session initiation --, therefor.

In Column 11, Line 58, delete "model for" and insert -- model for Global System for --, therefor.

In Column 11, Lines 60-61, delete "GPRS, EDGE," and insert -- EDGE, --, therefor.

In Column 11, Line 65, delete "(MC)." and insert -- (NIC). --, therefor.

In Column 14, Line 43, delete "browser engine 226" and insert -- browser engine 258 --, therefor.

In Column 14, Line 46, delete "browser engine 226" and insert -- browser engine 258 --, therefor.

In Column 15, Line 50, delete "(MIMS)," and insert -- (MMS), --, therefor.

In Column 16, Line 11, delete "Wi-Fi™ WiMax," and insert -- Wi-Fi™, WiMax, --, therefor.

In Column 19, Lines 29-30, delete "receive system 502" and insert -- receive system 500 --, therefor.

In Column 20, Lines 30-31, delete "system 406" and insert -- system 404 --, therefor.

In Column 20, Line 33, delete "angle E." and insert -- angle $\epsilon$. --, therefor.

In Column 26, Line 26, delete "RBG" and insert -- RGB --, therefor.

In Column 26, Lines 60-61, delete "preselected" and insert -- pre-selected --, therefor.

CERTIFICATE OF CORRECTION (continued)
U.S. Pat. No. 9,753,126 B2

In Column 27, Line 19, delete "latency" and insert -- latency. --, therefor.

In Column 27, Line 52, delete "(c)" and insert -- (ϵ) --, therefor.

In Column 27, Line 65, delete "second sensor 1028." and insert -- second sensor 1010. --, therefor.

In Column 28, Line 37, delete "(e.g., 6)" and insert -- (e.g., ϵ) --, therefor.

In Column 37, Line 39, delete "c and" and insert -- ϵ and --, therefor.

In Column 37, Line 44, delete ""prerotation"" and insert -- "pre-rotation" --, therefor.

In Column 37, Line 56, delete "prerotation" and insert -- pre-rotation --, therefor.

In Column 39, Line 6, delete "Mpixels," and insert -- Megapixels, --, therefor.

In Column 40, Line 37, delete "Fraunhofer™)" and insert -- Fraunhofer™). --, therefor.

In Column 42, Line 21, delete "readouts)" and insert -- readouts --, therefor.

In Column 43, Line 53, delete "SLR" and insert -- DSLR --, therefor.

In Column 44, Line 25, delete "Mega pixel" and insert -- Megapixel --, therefor.

In Column 47, Line 27, delete "at time to" and insert -- at time $t_0$ --, therefor.

In Column 47, Line 34, delete "At t3" and insert -- At $t_3$, --, therefor.

In Column 48, Lines 47-48, delete "fourth photodiode 2712" and insert -- fourth photodiode 2716 --, therefor.

In Column 48, Line 54, delete "fourth photodiode 2712" and insert -- fourth photodiode 2716 --, therefor.

In Column 52, Lines 40-41, delete "precomputed" and insert -- pre-computed --, therefor.

In Column 52, Line 60, delete "preselect" and insert -- pre-select --, therefor.

In Column 54, Line 26, delete "in to" and insert -- into --, therefor.

In Column 54, in Table 2, Line 7, delete "(in ns)" and insert -- (in ns) --, therefor.

In Column 54, in Table 1, Line 4, delete "(in ns)" and insert -- (in ns) --, therefor.

In Column 56, Line 50, delete "pixel"" and insert -- pixel") --, therefor.

CERTIFICATE OF CORRECTION (continued)
U.S. Pat. No. 9,753,126 B2

In Column 57, Line 43, delete "a &Imposition" and insert -- a $d_{min}$ position --, therefor.

In Column 58, Line 55, delete "time is" and insert -- time $t_5$ --, therefor.

In Column 59, Line 15, delete "tracking system 3204" and insert -- tracking system 3200 --, therefor.

In Column 59, Line 17, delete "tracking system 3204" and insert -- tracking system 3200 --, therefor.

In Column 59, Line 55, delete "new a," and insert -- new α, --, therefor.

In Column 61, Line 27, delete "3400 system" and insert -- system 3400 --, therefor.

In Column 61, Line 31, delete "direction cu," and insert -- direction $α_i$, --, therefor.

In Column 62, Line 32, delete "ToF," and insert -- $ToF_i$ --, therefor.

In Column 64, Line 31, delete "SPAR" and insert -- SPAD --, therefor.

In Column 66, Line 39, delete "register 37338" and insert -- register 3738 --, therefor.

In Column 66, Line 65, delete "system 3738 and 3740" and insert -- system 3700 --, therefor.

In Columns 66 & 67, Lines 67 & 1, delete "system 3738 and 3740" and insert -- system 3700 --, therefor.

In Column 67, Line 3, delete "RBG" and insert -- RGB --, therefor.

In Column 67, Line 41, delete "Load Rd values $row_i$ in to" and insert -- Load $R_{xl}$ values $row_i$ into --, therefor.

In Column 67, Line 42, delete "in to" and insert -- into --, therefor.

In Column 69, Line 51, delete "order the" and insert -- order, the --, therefor.

In Column 71, Line 16, delete "time is" and insert -- time $t_5$ --, therefor.

In Column 73, Line 18, delete "Z-range)." and insert -- Z-range. --, therefor.

In Column 75, Line 26, delete "reflection off" and insert -- reflection of --, therefor.

In Column 76, Line 56, delete "reflection off" and insert -- reflection of --, therefor.

In Column 78, Line 36, delete "precalculated." and insert -- pre-calculated. --, therefor.

In the Claims

In Column 82, Line 12, in Claim 3, delete "comprising" and insert -- comprising: --, therefor.

In Column 83, Line 46, in Claim 10, delete "comprising" and insert -- comprising: --, therefor.

In Column 84, Line 65, in Claim 16, delete "The media" and insert -- The non-transitory processor readable storage media --, therefor.

In Column 85, Line 7, in Claim 17, delete "The media of claim 15, further comprising" and insert -- The non-transitory processor readable storage media of claim 15, further comprising: --, therefor.

In Column 85, Line 15, in Claim 18, delete "The media" and insert -- The non-transitory processor readable storage media --, therefor.